United States Patent
Aggoune et al.

(10) Patent No.: US 12,523,491 B2
(45) Date of Patent: Jan. 13, 2026

(54) SYSTEMS AND METHODS FOR VEHICLE CRUISE SPEED RECOMMENDATION

(71) Applicant: BorgWarner US Technologies LLC, Wilmington, DE (US)

(72) Inventors: Karim Aggoune, Auburn Hills, MI (US); Gerard W. Malaczynski, Bloomfield Hills, MI (US); Claude P. Poull, Houdemont (BE)

(73) Assignee: BorgWarner US Technologies LLC, Wilmington, DE (US)

( * ) Notice: Subject to any disclaimer, the term of this patent is extended or adjusted under 35 U.S.C. 154(b) by 236 days.

(21) Appl. No.: 18/342,980

(22) Filed: Jun. 28, 2023

(65) Prior Publication Data

US 2023/0341237 A1    Oct. 26, 2023

Related U.S. Application Data

(63) Continuation of application No. 17/464,084, filed on Sep. 1, 2021, now Pat. No. 11,747,162.

(51) Int. Cl.
*G01C 21/36* (2006.01)
*G01C 21/34* (2006.01)

(52) U.S. Cl.
CPC ..... *G01C 21/3697* (2013.01); *G01C 21/3469* (2013.01); *G01C 21/3492* (2013.01)

(58) Field of Classification Search
CPC ............ G01C 21/3697; G01C 21/3469; G01C 21/3492
See application file for complete search history.

(56) References Cited

U.S. PATENT DOCUMENTS

| 2004/0068359 A1* | 4/2004 | Neiss | G05B 13/048 |
| | | | 180/170 |
| 2011/0270468 A1* | 11/2011 | Kristinsson | G07C 5/008 |
| | | | 701/2 |
| 2018/0037117 A1* | 2/2018 | Koebler | B60K 35/10 |

OTHER PUBLICATIONS

Yu-Chen Lin, "An Eco-Cruising Control Systems Using Nonlinear Predictive Control Approach" Proceedings of the 2016 International Automatic Control Conference, Nov. 2016 (Year: 2016).*

* cited by examiner

*Primary Examiner* — Joan T Goodbody
*Assistant Examiner* — Godfrey Aleksander Maciorowski
(74) *Attorney, Agent, or Firm* — Dickinson Wright PLLC

(57) ABSTRACT

A method for providing a cruising speed recommendation to an operator of a vehicle includes determining a projected route; receiving route characteristic data including route elevation data; determining a sampling resolution; sampling the route elevation data at the sampling resolution to generate sampled route elevation data; determining at least one start of uphill position and at least one start of downhill position; determining at least one cruise speed route segment based at least in part on the at least one start of uphill position and the at least one start of downhill position; determining a corresponding cruising speed for the at least one cruise speed route segment based at least in part on one or more of the route elevation data and the sampled route elevation data; and communicating the corresponding cruising speed for the at least one cruise speed route segment.

18 Claims, 33 Drawing Sheets

SYSTEMS AND METHODS FOR VEHICLE CRUISE SPEED RECOMMENDATION

CROSS-REFERENCE TO RELATED APPLICATION

This U.S. Continuation application claims priority to U.S. Utility application Ser. No. 17/464,084, filed Sep. 1, 2021, which is incorporated herein by reference in its entirety.

GOVERNMENT LICENSE RIGHTS

This invention was made with government support under the DE-AR0000794 contract awarded by United States Department of Energy, Advanced Research Projects Agency (ARPA-E). The government has certain rights in the invention.

TECHNICAL FIELD

This disclosure relates to vehicle propulsion control, and in particular to systems and methods for improving vehicle energy efficiency through providing recommendations regarding vehicle propulsion control and/or vehicle operator behavior.

BACKGROUND

Vehicles, such as cars, trucks, sport utility vehicles, crossovers, mini-vans, or other suitable vehicles, may include various systems for controlling vehicle propulsion. Such systems include cruise control systems, automatic cruise control systems, autonomous vehicle control systems, and the like. Typically, a vehicle propulsion control system controls vehicle propulsion based on a desired speed or motor torque. For example, a cruise control system may receive an input from an operator, such as a set speed. The cruise control system may adjust various aspects of the vehicle to maintain the set speed.

In some instances, the operator may desire to receive speed recommendations for driving the vehicle to improve fuel economy. Typically, such vehicle propulsion systems may not be capable of providing recommended speeds to the operator by selectively determining cruise speeds and segments based on various factors both internal to and external from the vehicle or presenting them in an intuitive manner.

SUMMARY

This disclosure relates generally to systems and methods for providing recommendations to an operator of a vehicle.

An aspect of the disclosed embodiments includes a method for providing a cruising speed recommendation to an operator of a vehicle. The method includes determining a projected route. The method further includes receiving route characteristic data including route elevation data. The method further includes determining a sampling resolution. The method further includes sampling the route elevation data at the sampling resolution to generate sampled route elevation data. The method further includes determining at least one start of uphill position and at least one start of downhill position based at least in part on the sampled route elevation data. The method further includes determining at least one cruise speed route segment based at least in part on the at least one start of uphill position and the at least one start of downhill position. The method further includes determining a corresponding cruising speed for the at least one cruise speed route segment based at least in part on one or more of the route elevation data and the sampled route elevation data. The method further includes communicating the corresponding cruising speed for the at least one cruise speed route segment.

Another aspect of the disclosed embodiments includes an apparatus for providing a cruising speed recommendation to an operator of a vehicle. The apparatus includes a processor and a memory including instructions that, when executed by the processor, cause the processor to determine a projected route. The instructions further cause the processor to receive route characteristic data including route elevation data. The instructions further cause the processor to determine a sampling resolution. The instructions further cause the processor to sample the route elevation data at the sampling resolution to generate sampled route elevation data. The instructions further cause the processor to determine at least one start of uphill position and at least one start of downhill position based at least in part on the sampled route elevation data. The instructions further cause the processor to determine at least one cruise speed route segment based at least in part on the at least one start of uphill position and the at least one start of downhill position. The instructions further cause the processor to determine a corresponding cruising speed for the at least one cruise speed route segment based at least in part on one or more of the route elevation data and the sampled route elevation data. The instructions further cause the processor to communicate the corresponding cruising speed for the at least one cruise speed route segment.

Yet another aspect of the disclosed embodiments includes a non-transitory computer-readable storage medium. The non-transitory computer-readable medium includes executable instructions that, when executed by a processor, facilitate performance of operations including determining a projected route. The operations further include receiving route characteristic data including route elevation data. The operations further include determining a sampling resolution. The operations further include sampling the route elevation data at the sampling resolution to generate sampled route elevation data. The operations further include determining at least one start of uphill position and at least one start of downhill position based at least in part on the sampled route elevation data. The operations further include determining at least one cruise speed route segment based at least in part on the at least one start of uphill position and the at least one start of downhill position. The operations further include determining a corresponding cruising speed for the at least one cruise speed route segment based at least in part on one or more of the route elevation data and the sampled route elevation data. The operations further include communicating the corresponding cruising speed for the at least one cruise speed route segment.

These and other aspects of the present disclosure are provided in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
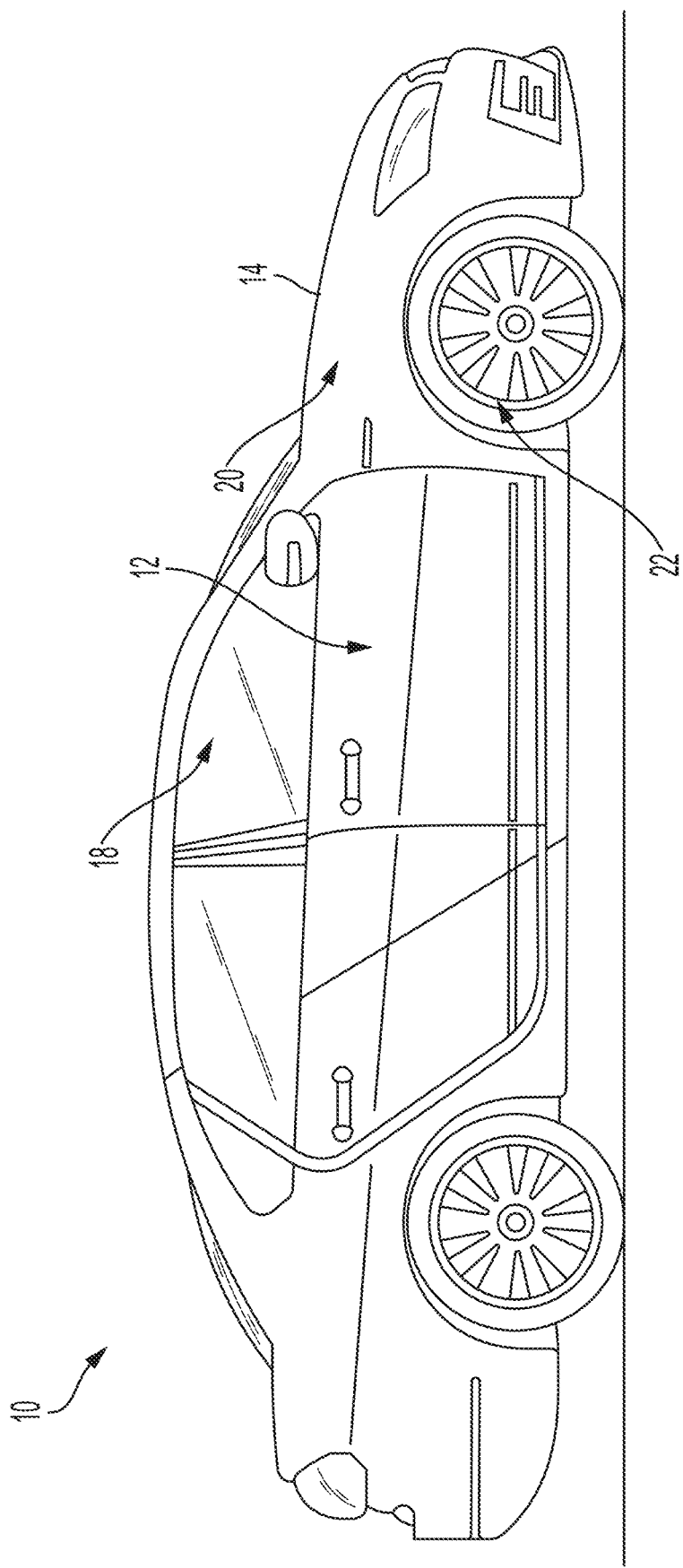
FIG. 1 generally illustrates a vehicle according to the principles of the present disclosure.

FIG. 1 generally illustrates a vehicle 10 according to the principles of the present disclosure. The vehicle 10 may include any suitable vehicle, such as a car, a truck, a sport utility vehicle, a mini-van, a cross-over, any other passenger vehicle, any suitable commercial vehicle, or any other suitable vehicle. While the vehicle 10 is illustrated as a passenger vehicle having wheels and for use on roads, the principles of the present disclosure may apply to other vehicles, such as planes, boats, trains, drones, or other suitable vehicles. The vehicle 10 includes a vehicle body 12 and a hood 14. A portion of the vehicle body 12 defines a passenger compartment 18. Another portion of the vehicle body 12 defines the engine compartment 20. The hood 14 may be moveably attached to a portion of the vehicle body 12, such that the hood 14 provides access to the engine compartment 20 when the hood 14 is in a first or open position and the hood 14 covers the engine compartment 20 when the hood 14 is in a second or closed position.

The passenger compartment 18 may be disposed rearward of the engine compartment 20. The vehicle 10 may include any suitable propulsion system including an internal combustion engine, one or more electric motors (e.g., an electric vehicle), one or more fuel cells, a hybrid (e.g., a hybrid vehicle) propulsion system comprising a combination of an internal combustion engine, one or more electric motors, and/or any other suitable propulsion system. In some embodiments, the vehicle 10 may include a petrol or gasoline fuel engine, such as a spark ignition engine. In some embodiments, the vehicle 10 may include a diesel fuel engine, such as a compression ignition engine. In some embodiments, the vehicle 10 may include a battery electric vehicle (BEV) comprising one or more onboard batteries or battery packs configured to provide energy to one or more electric motors of the propulsion system.

The engine compartment 20 houses and/or encloses at least some components of the propulsion system of the vehicle 10. Additionally, or alternatively, propulsion controls, such as an accelerator actuator (e.g., an accelerator pedal), a brake actuator (e.g., a brake pedal), a steering wheel, and other such components may be disposed in the passenger compartment 18 of the vehicle 10. The propulsion controls may be actuated or controlled by an operator of the vehicle 10 and may be directly connected to corresponding components of the propulsion system, such as a throttle, a brake, a vehicle axle, a vehicle transmission, and the like, respectively. In some embodiments, the propulsion controls may communicate signals to a vehicle computer (e.g., drive by wire) which in turn may control the corresponding propulsion component of the propulsion system.

In some embodiments, the vehicle 10 includes a transmission in communication with a crankshaft via a flywheel or clutch or fluid coupling. In some embodiments, the transmission includes a manual transmission. In some embodiments, the transmission includes an automatic transmission. The vehicle 10 may include one or more pistons, in the case of an internal combustion engine or a hybrid vehicle, which cooperatively operate with the crankshaft to generate force which may be translated through the transmission to one or more axles which turns wheels 22. When the vehicle 10 includes one or more electric motors, a vehicle battery and/or fuel cell provides energy to the electric motors to turn the wheels 22. In cases where the vehicle 10 includes a vehicle battery to provide energy to the one or more electric motors, when the battery is depleted, it may be connected to an electric grid (e.g., using a wall socket) to recharge the battery cells. Additionally, or alternatively, the vehicle 10 may employ regenerative braking which uses the one or more electric motors of the vehicle 10 as a generator to convert kinetic energy lost due to decelerating back into stored energy in the battery.

The vehicle 10 may include automatic vehicle propulsion systems, such as a cruise control, an adaptive cruise control, automatic braking control, other automatic vehicle propulsion systems, or a combination thereof. The vehicle 10 may be an autonomous or semi-autonomous vehicle, or other suitable type of vehicle. The vehicle 10 may include additional or fewer features than those generally illustrated and/or disclosed herein.

Figure 2:
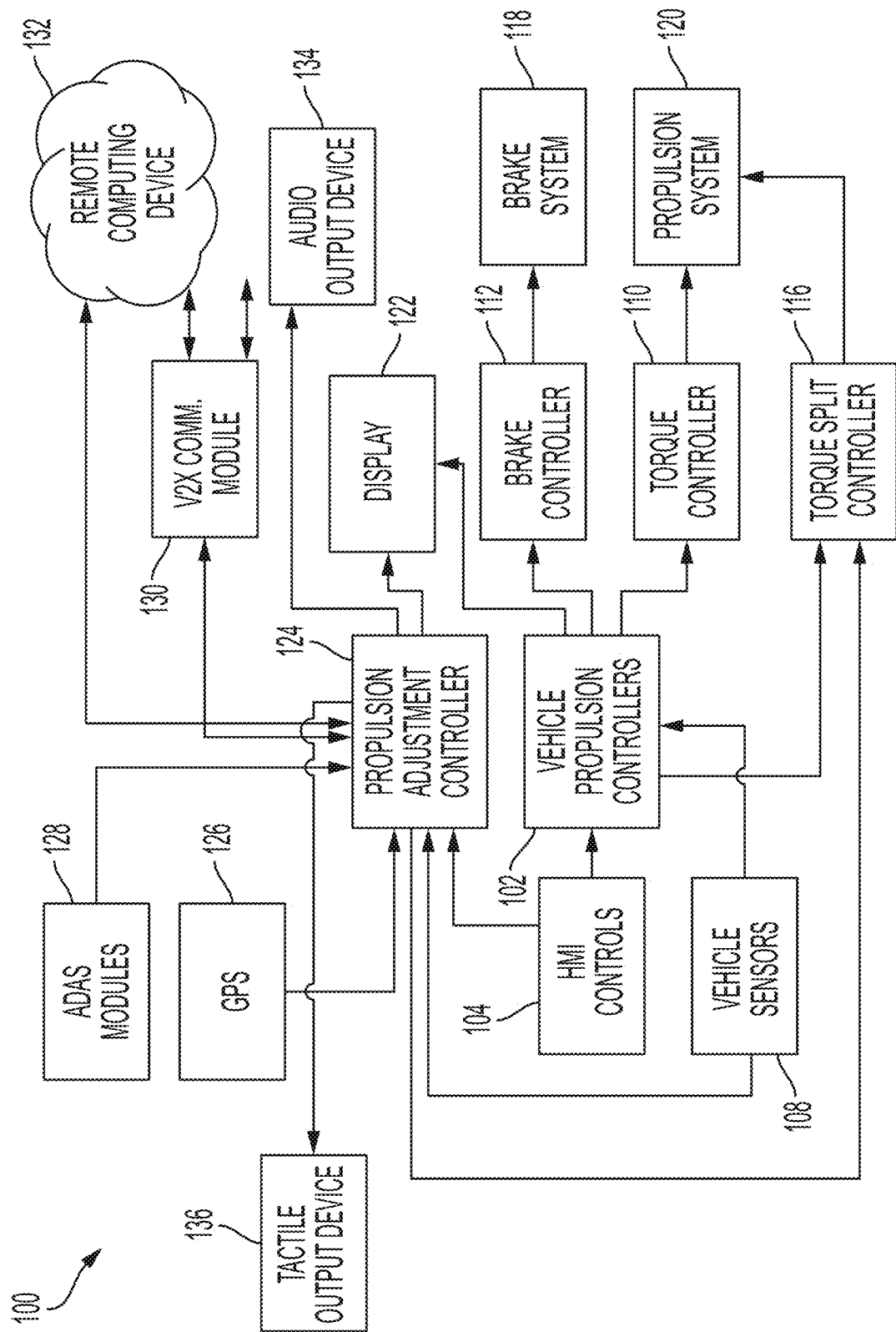
FIG. 2 generally illustrates a block diagram of a vehicle propulsion control system according to the principles of the present disclosure.

FIG. 2 generally illustrates a block diagram of a vehicle propulsion control system 100 according to the principles of the present disclosure. The system 100 may be disposed within a vehicle, such as the vehicle 10. The system 100 may be configured to selectively control propulsion of the vehicle 10 and, in some embodiments, the system 100 may be configured to determine profiles for a target vehicle speed and/or a target vehicle torque split based on various input information (e.g., route information, vehicle characteristic information, traffic information, other suitable information, or a combination thereof). The profiles of the target vehicle speed and/or the target vehicle torque split correspond to a vehicle speed at which the vehicle 10 achieves an optimum energy consumption efficiency with respect to a portion of a route being traversed by the vehicle 10.

In some embodiments, the system 100 may include a vehicle propulsion controller (VPC) 102, human machine interface (HMI) controls 104, vehicle sensors 108, a torque controller 110, a brake controller 112, a torque split controller 116, a brake system 118, a propulsion system 120, and a display 122. In some embodiment, the display 122 may include a portion of a dash or console of the vehicle 10, a navigation display of the vehicle 10, or other suitable displays of the vehicle 10. In some embodiments, the display 122 may be disposed on a computing device, such as a mobile computing device used by the operator. In some embodiments, the system 100 may include a propulsion adjustment controller (PAC) 124, a global position system (GPS) antenna 126 (referred to hereinafter as GPS 126) in communication with a mapping characteristics module (not shown), advanced driver (operator) assistance system (ADAS) modules 128, and a vehicle to other systems (V2X) communication module 130. The V2X communication module 130 may be configured to communication with other vehicles, other infrastructure (e.g., such as traffic infrastructure, mobile computing devices, and/or other suitable infrastructure), a remote computing device (e.g., the remote computing device 132), other suitable systems, or a combination thereof. As will be described, the system 100 may be in communication with one or more remote computing devices 132. In some embodiments, at least some of the components of the system 100 may be disposed in a propulsion control module (PCM) or other onboard vehicle computing device. For example, at least the PAC 124 and the VPC 102 may be disposed within the PCM. In some embodiments, the system 100 may be at least partially disposed within the PCM while other components of the system 100 may be disposed on a standalone computing device having a memory that stores instructions that when executed by a processor cause the processor to carry out the operations of the components. For example, the PAC 124 may be disposed on a memory and executed by a processor. It should be understood that the system 100 may include any combination of computing devices, either disposed locally in the vehicle 10 and/or disposed remotely, as will be described.

In some embodiments, the system 100 further includes an additional output device 134. The additional output device 134 can include non-display outputs such as audio devices. Such audio devices can include speakers, chimes, or other audio devices. The additional output device 134 can include vibration motors, such as those mounted in vehicle seats In some embodiments, the VPC 102 may include an automatic vehicle propulsion system. For example, the VPC 102 may include a cruise control mechanism, an adaptive cruise control mechanism, an automatic braking system, other suitable automatic vehicle propulsion system, or a combination thereof. Additionally, or alternatively, the VPC 102 may include or be a portion of an autonomous vehicle system that controls all or a portion of vehicle propulsion, steering, braking, safety, route management, other autonomous features, or a combination thereof. It should be understood that, while only limited components of the system 100 are illustrated, the system 100 may include additional autonomous components or other suitable components.

The VPC 102 may be in communication with one or more human to machine interfaces (HMI) 104. The HMI controls 104 may include any suitable HMI. For example, the HMI controls 104 may include a plurality of switches disposed on a steering wheel of the vehicle 10, on the dash or console of the vehicle 10, or any other suitable location on the vehicle 10. In some embodiments, the HMI controls 104 may be disposed on a mobile computing device, such as a smart phone, tablet, laptop computer, or other suitable mobile computing device. In some embodiments, the operator of the vehicle 10 may interface with the HMI controls 104 to use the VPC 102 to control vehicle propulsion and/or other features of the VPC 102. For example, the operator may actuate an HMI switch of the HMI controls 104 disposed on the steering wheel of the vehicle 10. The HMI controls 104 may communicate a signal to the VPC 102. The signal may indicate a desired vehicle speed selected by the operator. The VPC 102 generates a torque demand corresponding to the desired vehicle speed and communicates the torque demand to a torque controller 110. The torque controller 110 may be in communication with the propulsion system 120 and/or other vehicle propulsion systems of the vehicle 10. The torque controller 110 selectively controls the propulsion system 120 and/or the other vehicle propulsion systems using the torque demand to achieve the desired vehicle speed. The operator may increase or decrease the desired vehicle speed by actuating additional switches of the HMI controls 104. The VPC 102 may adjust the torque demand to achieve the increase or decrease in the desired vehicle speed.

The VPC 102 may continuously adjust the torque demand in order to maintain the desired vehicle speed. For example, the VPC 102 may be in communication with the vehicle sensors 108. The vehicle sensors 108 may include cameras, speed sensors, proximity sensors, other suitable sensors as will be described, or a combination thereof. The VPC 102 may receive a signal from the vehicle sensors 108 that indicates a current vehicle speed. The VPC 102 may adjust the torque demand to adjust the vehicle speed when the signal indicates that the current vehicle speed may be different from the desired vehicle speed. For example, the vehicle 10 may traverse an incline that causes the vehicle 10 to reduce current vehicle speed (e.g., because the torque demand applied by the torque controller 110 may be insufficient to maintain vehicle speed while on the incline). The VPC 102 may increase the torque demand in order adjust the current vehicle speed, thereby achieving the desired vehicle speed.

In some embodiments, such as when the VPC 102 includes an adaptive cruise control mechanism, the VPC 102 may adjust the torque demand based on the proximity of a lead vehicle (e.g., a vehicle immediately in front of the vehicle 10). For example, the VPC 102 may receive information from the vehicle sensors 108 indicating the presence of a lead vehicle. The information may be captured by the vehicle sensors 108 using cameras, proximity sensors, radar, the V2X communication module 130, other suitable sensors or input devices, or a combination thereof. The VPC 102 may determine whether to maintain the desired vehicle speed or increase or decrease the torque demand in order to increase or decrease the current vehicle speed. For example, the operator may indicate, using the HMI controls 104, to maintain pace with the lead vehicle while keeping a safe stopping distance between the vehicle 10 and the lead vehicle. The VPC 102 may selectively increase the torque demand if the lead vehicle is traveling faster than the vehicle 10 and may selectively decrease the torque demand if the lead vehicle is traveling slower relative to the vehicle 10.

The VPC 102 may bring the vehicle 10 to a complete stop when the lead vehicle comes to a complete stop. For example, the VPC 102 may be in communication with the brake controller 112 to send a plurality of signals over a period indicating to the brake controller 112 to control vehicle braking (e.g., the VPC 102 may bring the vehicle to a stop over a period so as not to suddenly stop the vehicle, however, in the case of a sudden stop of the lead vehicle, the VPC 102 brings the vehicle 10 to a sudden stop to avoid collision with the lead vehicle). The brake controller 112 may be in communication with the brake system 118. The brake system 118 may include a plurality of brake components that may be actuated in response to the brake controller 112 implementing braking procedures based on the plurality of signals from the VPC 102. In some embodiments, the VPC 102 may implement engine braking through a regenerative braking system by adjusting the torque demand to allow the vehicle 10 to come to a stop without use of the brake system 118 or the VPC 102 may use a combination of regenerative braking and the brake system 118 to bring the vehicle 10 to a complete stop. In order to resume vehicle propulsion control, the operator indicates to resume vehicle propulsion control using the HMI controls 104 (e.g., the VPC 102 may not be configured to resume vehicle propulsion control without interaction from the operator). In some embodiments, the vehicle 10 may include a higher level of automation including a higher level of propulsion control, as described, and may include suitable controls for bringing the vehicle 10 to a complete stop without interaction with the operator of the vehicle 10.

In some embodiments, the VPC 102 may determine a torque split in order to utilize an internal combustion engine and an electric motor of the vehicle 10 (e.g., in the case where the vehicle 10 is a hybrid vehicle). It should be understood that while only an internal combustion engine and an electric motor are described, the vehicle 10 may include any hybrid combination of any suitable vehicle engines and motors. The torque split indicates a portion of the torque demand to be applied to the internal combustion engine and a portion of the torque demand to be applied to the electric motor. For example, the electric motor may be used for vehicle propulsion when the torque demand is below a threshold. However, when the torque demand is above the threshold (e.g., such as the case when the vehicle 10 is on a steep incline) the internal combustion engine may provide at least a portion of vehicle propulsion in order to assist the electric motor. The VPC 102 communicates the torque split to the torque split controller 116. The torque split controller 116 may be in communication with the propulsion system 120 to apply the torque split.

In some embodiments, the VPC 102 includes a plurality of safety controls. For example, the VPC 102 may determine whether to increase or decrease the torque demand, thereby increasing or decreasing the desired vehicle speed or current vehicle speed, based on input from the safety controls. The safety controls may receive input from the vehicle sensors 108. For example, the safety controls may receive proximity sensor information, camera information, other information, or a combination thereof and may generate a safety signal that indicates to the VPC 102 to perform one or more safety operations. For example, in the case of a lead vehicle coming to a sudden stop, the safety controls may generate a safety signal, based on proximity information from the vehicle sensors 108, indicating to the VPC 102 to immediately bring the vehicle 10 to a complete stop. In some embodiments, the VPC 102 may determine whether to apply the desired vehicle speed set by the operator using the HMI controls 104 based on the signal from the safety controls. For example, the operator may increase the desired vehicle speed which may bring the vehicle 10 closer to the lead vehicle (e.g., the vehicle 10 would travel faster than the lead vehicle if the desired vehicle speed were achieved). The VPC 102 may determine not to apply the desired vehicle speed, and instead may provide an indication to the display 122 indicating to the operator that increasing the desired vehicle speed may be unsafe or the VPC 102 may ignore the increase in the desired vehicle speed. In some embodiments, the VPC 102 may be in communication with a transmission controller module (TCM). The VPC 102 may receive information from the TCM (e.g., an automatically selected gear) and may determine and/or adjust the total torque demand based on the information received from the TCM.

As described, the system 100 includes a PAC 124. The PAC 124 may be configured to determine a profile for a target vehicle speed based on, at least, route information of a route being traversed by the vehicle 10, vehicle parameters of the vehicle 10, information about other vehicles proximate to the vehicle 10, traffic information, weather information, the current vehicle speed, the desired vehicle speed, other information, or a combination thereof. As will be described, the PAC 124 may determine the profile for the target vehicle speed based on an energy consumption profile of the vehicle 10. The energy consumption profile may be generated using the information described above and may indicate an optimum energy consumption of the vehicle 10 for various route characteristics, such as road grades, curvatures, traffic, speed limits, stop signs, traffic signals, other route characteristics, or a combination thereof.

The PAC 124 receives route characteristics (e.g., road grade characteristics, route distance, and route directions), vehicle parameters, traffic characteristics, weather characteristics, vehicle to vehicle parameters, other information or characteristics, or a combination thereof. In some embodiments, the PAC 124 receives at least some of the route characteristics from a mapping characteristics module based on location information from the GPS 126. The mapping characteristics module disposed within the vehicle 10 (e.g., within the system 100) or may be disposed on a remote computing device, such as the remote computing device 132. When the mapping characteristics module is disposed on the remote computing device 132, the GPS 126 may capture various global positioning signals from various global positioning satellites or other mechanisms. The GPS 126 may communicate the captured signals to the mapping characteristics module. The mapping characteristics module may generate the route characteristics based on the signals received from the GPS 126 and communicate the route characteristics to the PAC 124. For example, the PAC 124 may receive a route distance, route directions, road grade information of the route, other route characteristics, or a combination thereof. In some embodiments, the PAC 124 may receive traffic signal location information, traffic stop sign location information, posted speed limit information, lane shift information, other route characteristics or information, or a combination thereof, from the mapping characteristics module based on location information from the GPS 126.

The PAC 124 may receive further vehicle parameters from the vehicle sensors 108. For example, the vehicle sensors 108 may include an energy level sensor (e.g., a fuel level sensor or a battery charge sensor), an oil sensor, a speed sensor, a weight sensor, other suitable sensors, or a combination thereof. The PAC 124 may receive an energy level of the vehicle 10, a current weight of the vehicle 10, an oil condition of the vehicle 10, tire inflation information of the vehicle 10, a current vehicle speed, engine temperature information, other suitable vehicle parameters of the vehicle 10, or a combination thereof from the vehicle sensors 108. In some embodiments, the vehicle sensors 108 may include weather sensors, such as, a precipitation sensor or moisture sensor, a barometric pressure sensor, an ambient temperature sensor, other suitable sensors, or a combination thereof. The PAC 124 may receive current weather information, such as precipitation information, barometric pressure information, ambient temperature information, other suitable weather information, or a combination thereof, from the vehicle sensors 108.

The PAC 124 may receive at least some of the route characteristics from the ADAS modules 128. The ADAS modules 128 may assist the operator of the vehicle 10 to improve vehicle safety and road safety. The ADAS modules 128 may be configured to automate and/or adapt and enhance vehicle systems for safety and better driving. The ADAS modules 128 may be configured to alert the operator of the vehicle 10 of upcoming traffic conditions or disabled vehicles and/or to alert the vehicle 10 of a vehicle proximate to the vehicle 10 in order to avoid collisions and accidents. Further, the ADAS modules 128 may autonomously avoid collisions by implementing safeguards and taking over control of the vehicle 10, such as, by automatic lighting, initiating adaptive cruise control (e.g., via the VPC 102) and collision avoidance (e.g., by controlling a trajectory of the vehicle 10 or bringing the vehicle 10 to a complete stop either using the VPC 102 or directly using the brake controller 112). The PAC 124 may receive information, such as traffic characteristics, vehicle proximity information, disabled vehicle information, other suitable information, or a combination thereof, from the ADAS modules 128.

The PAC 124 may receive, at least, some of the route characteristics from the V2X module communication 130. The V2X communication module 130 may be configured to communicate with other systems proximate or remotely located from the vehicle 10, as described, to obtain and share information, such as, traffic information, vehicle speed information, construction information, other information, or a combination thereof. The PAC 124 may receive other vehicle speed information, other vehicle location information, other traffic information, construction information, other suitable information, or a combination thereof, from the V2X communication module 130.

The PAC 124 may receive, at least, some of the route characteristics from the remote computing device 132. For example, the PAC 124 may receive further information regarding route distance, route directions, road grade information of the route, traffic information, construction information, other vehicle location information, other vehicle speed information, vehicle maintenance information of the vehicle 10, other route characteristics, or a combination thereof, from the remote computing device 132. Additionally, or alternatively, the PAC 124 may receive vehicle parameters from the remote computing device 132, such as, a make and model of the vehicle 10, manufacturer provided energy consumption efficiency of the vehicle 10, a weight of the vehicle 10, other vehicle parameters, or a combination thereof. In some embodiments, the PAC 124 may receive traffic signal location information, traffic stop sign location information, posted speed limit information, lane shift information, other route characteristics or information, or a combination thereof, from the remote computing device 132. The remote computing device 132 may include any suitable computing device or devices, such as a cloud computing device or system, a remotely located server or servers, a remotely or proximately located mobile computing device or application server that provides information to a mobile computing device, other suitable remote computing devices, or a combination thereof. The remote computing device 132 may be located remotely from the vehicle 10, such as in a datacenter or other suitable location. In some embodiments, the remote computing device 132 may be located within the vehicle 10 (e.g., a mobile computing device used by the operator of the vehicle 10).

In some embodiments, the PAC 124 may receive traffic signal information, such as traffic signal phase and timing (SPaT) from a smart algorithm used by a traffic data provider. The SPaT information may indicate when traffic signals are changing and/or the timing of traffic signals.

The PAC 124 may receive route characteristics and/or vehicle parameters from the operator of the vehicle 10. For example, the operator may interact with an interface of the PAC 124, such as using the display 122 or using a mobile computing device, to provide vehicle parameters of the vehicle 10, such as, vehicle weight, vehicle make and model, vehicle age, vehicle maintenance information, vehicle identification number, a number of passengers, load information (e.g., an amount of luggage or other load information), other vehicle parameters, or a combination thereof. Additionally, or alternatively, the operator may provide route characteristics, such as a route map, route distance, other route characteristics, or a combination thereof, to the PAC 124. In some embodiments, the PAC 124 learns behavior of the operator of the vehicle 10. For example, the PAC 124 monitors the operator's vehicle speed relative to posted speed limits or whether the operator implements a vehicle speed recommendation, as will be described, provided by the PAC 124.

In some embodiments, the PAC 124 may learn traffic patterns for known routes traversed by the vehicle 10. For example, the PAC 124 may track traffic conditions while the vehicle 10 traverses one or more routes on a routine or regular basis. The PAC 124 may determine traffic patterns for the routes based on the monitored traffic conditions. In some embodiments, the PAC 124 receives traffic patterns for a route the vehicle 10 is traversing from the remote computing device 132, or from the mapping characteristics module based on the signals from the GPS 126, as described.

It should be understood that the PAC 124 may receive any characteristics or information associated with routes, traffic, signage and signals, other vehicles, vehicle parameters of the vehicle 10, any other suitable characteristics or information, including those described or not described here, from any of the components described or not described herein. Additionally, or alternatively, the PAC 124 may be configured to learn any suitable characteristics or information described or not described herein.

In some embodiments, the PAC 124 may be configured to control propulsion of the vehicle 10. The PAC 124 may be an integrated component of the VPC 102, or may be an overlay component that communicates with or interfaces with the VPC 102 and/or other components of the vehicle 10. Additionally, or alternatively, the PAC 124 may be disposed on a mobile computing device, such as a smart phone that uses, at least, some of the information described above, to present the operator of the vehicle 10 with a recommended vehicle speed. In some embodiments, the VPC 102 may include an adaptive cruise control mechanism. As described, the adaptive cruise control mechanism may be configured to maintain the desired vehicle speed provided by the operator of the vehicle 10 using the HMI controls 104, and the adaptive cruise control mechanism may be configured to maintain a safe distance between the vehicle 10 and a lead vehicle. Further, the adaptive cruise control mechanism may be configured to bring the vehicle 10 to a complete stop in response to the lead vehicle coming to a complete stop. As described, the adaptive cruise control mechanism may not be capable of restarting vehicle propulsion without interaction from the operator of the vehicle 10. Additionally, the adaptive cruise control mechanism may be incapable of bringing the vehicle 10 to a complete stop in the absence of a lead vehicle. Accordingly, the VPC 102 (e.g., the adaptive cruise control mechanism) may not be able to take advantage of energy efficient vehicle propulsion control (e.g., such as a coasting to a stop in response to a determination that vehicle 10 may be approaching a stop sign). The PAC 124 may be configured to determine a target vehicle propulsion profile, which may include one or more target vehicle speeds and one or more target torque splits, based on an energy consumption profile for the vehicle 10. The PAC 124 may determine a target torque demand based on profiles of a target vehicle speed and/or a target torque split.

In some embodiments, the PAC 124 determines the vehicle energy consumption profile using the information described above. For example, the PAC 124 may determine the vehicle consumption profile using a vehicle weight, manufacturer provided vehicle energy efficiency, historical data corresponding to the vehicle 10 or similar vehicles indicating energy consumption of the vehicle 10 or similar vehicles while traversing portions of a particular route or specific road grades, or other suitable route or road information, other suitable vehicle parameters, or a combination thereof. The vehicle energy consumption profile may indicate that the vehicle 10 consumes a specified amount of energy (e.g., within a tolerance range) while operating at a specific vehicle speed (within a tolerance) while traversing routes having particular road, traffic, and other conditions. For example, the energy consumption of the vehicle 10 may be greater when the vehicle 10 is on an incline and may be less when the vehicle 10 is coasting to a stop. In some embodiments, the PAC 124 receives or retrieves a vehicle energy profile for the vehicle 10 determined remotely from the vehicle 10, such as by the remote computing device 132.

The PAC 124 may be configured to use the vehicle energy consumption profile and various route characteristics to determine the profiles for the target vehicle speed and/or target torque split for a portion of a route being traversed by the vehicle 10. For example, the PAC 124 may determine that the vehicle 10 is approaching a particular variation in grade over the portion of the route being traversed by the vehicle 10. The PAC 124 uses the vehicle energy consumption profile to identify a vehicle speed (within a threshold range of the desired vehicle speed provided by the operator to the VPC 102) and/or a torque split having an optimum energy consumption for the grade variation of the portion of the route being traversed by the vehicle. In some embodiments, the PAC 124 may determine the vehicle speed and torque split using historical energy consumption for a known route, such as a route previously traversed by the vehicle 10 or similar vehicles. The PAC 124 determines a target torque demand from the identified vehicle speed and determines a target torque split from the identified torque split. It should be understood that the PAC 124 continuously monitors the various characteristics received, as described, and continues to generate profiles for target vehicle speeds and/or target torque splits, such that, the vehicle 10 maintains an optimum or improved energy consumption while maintaining operator and/or passenger comfort (e.g., by avoiding sudden, unnecessary changes in vehicle speed).

In some embodiments, the PAC 124 may be configured to determine when the vehicle 10 should coast to achieve optimum or improved energy consumption of the vehicle 10. For example, the PAC 124 may use known traffic conditions, as described, to determine when the vehicle 10 should coast. Additionally, or alternatively, the PAC 124 may learn traffic conditions, as described, and may determine whether the vehicle 10 should coast in areas along a route known to typically have traffic based, for example, on time of day. In some embodiments, the PAC 124 may use SPaT information to determine when the vehicle 10 should coast in response to change traffic signals. Additionally, or alternatively, the PAC 124 may determine to increase the target vehicle speed associated with the profile for the target vehicle speed (e.g., within the posted speed limit) in order to increase a likelihood that the vehicle 10 will arrive at a traffic signal while the traffic signal indicates to proceed, which may allow the vehicle 10 to avoid having to stop at traffic signals, based on traffic single timing.

In some embodiments, the PAC 124 may be configured to calculate a coast function and/or a road load function (see the Equation (1)) to identify particular vehicle parameters using velocity dependent resistance force. Parameters of the road load function include, vehicle parameters, such as vehicle mass or weight, vehicle rolling friction, vehicle drag coefficient, other vehicle parameters, or a combination thereof, which may be received by the PAC 124, as described. These parameters can then be updated using a coast self-learning function, such that the PAC 124 identifies or requests a coast sequence, (e.g., from historical information and/or from the remote computing device 132) and calculates the coast function result. The PAC 124 may calculate the coast function when requested by the operator of the vehicle 10 who would be prompted to perform a particular learning maneuver by the PAC 124, or could be learned in the background.

Equation (1) Velocity dependent resistive forces: F=wind, tires, bearings, and other forces plus acceleration dependent inertial forces plus grade dependent gravitational forces:

$$F=(A+(B*v)+(C*v^2))+((1+\text{drive axle \%}+\text{non-drive axle \%})*(\text{Test Mass}*\text{acceleration}))+(\text{Test Mass}*g*\sin(\arctan(\text{grade \%})))$$

Where A represents the resistive force that is constant and may not vary with velocity (e.g., bearings, seals, tires, etc.), B represents the resistive force that varies linearly with velocity (e.g., drive train, differential, etc.), and C represents the resistive force that varies with the square of velocity (e.g., wind, tire deformation, etc.)

As described, the PAC 124 may control or interface with the VPC 102 and/or interface with the operator of the vehicle 10 in order to achieve the target vehicle speed and/or target torque split profiles, which may result in optimum or improved energy consumption efficiency of the vehicle 10. Additionally, or alternatively, the PAC 124 may control or interface with the VPC 102 in order to bring the vehicle 10 to a complete stop in response to the vehicle 10 approaching a stop sign, traffic signal, traffic, disabled vehicle, or other suitable conditions. The PAC 124 may also control or interface with the VPC 102 in order to resume vehicle propulsion after the vehicle 10 has come to a complete stop.

In some embodiments, the PAC 124 may control or interface with the VPC 102 using virtual inputs in order to achieve the target vehicle speed and/or target torque split profiles. As described, the VPC 102 may receive a desired vehicle speed from the operator of the vehicle 10 using the HMI controls 104. Virtual inputs as described herein may include inputs generated by the PAC 124 or other suitable component disposed within the vehicle 10 or remotely located from the vehicle 10 that cause allow the PAC 124 or other suitable component to control aspects of the vehicle 10 according to one or more control targets or other targets, such as those described herein. Additionally, or alternatively, the VPC 102 (e.g., when the VPC 102 includes an adaptive cruise control mechanism) may adjust the desired vehicle speed in response to a lead vehicle's speed.

In some embodiments, the PAC 124 initializes the VPC 102 using the desired speed provided by the operator of the vehicle 10 the first time the operator of the vehicle 10 engages the VPC 102 during a key cycle. The PAC 124 may then provide the virtual inputs to the VPC 102 in order to control vehicle speed to achieve optimum or improved energy consumption efficiency of the vehicle 10. In some embodiments, the PAC 124 may generate a virtual input that includes a virtual HMI signal that, when received by the VPC 102, may cause the VPC 102 to be enabled, be disabled, and/or to set or adjust the current vehicle speed. The PAC 124 generates the virtual HMI signal based on target vehicle speed profile. The PAC 124 may be in communication with and/or interfaces with the HMI controls 104. The PAC 124 substitutes HMI signals provided by the operator of the vehicle 10 with the virtual HMI signal generated by the PAC 124. The VPC 102, as described, includes a plurality of safety controls. The VPC 102 then applies the target vehicle speed associated with the target vehicle speed profile indicated by the virtual HMI signal, in the same manner the VPC 102 applies a desired vehicle speed provided by the operator using the HMI controls 104, as described. The VPC 102 may determine whether to apply the target vehicle speed and/or the target torque split indicated by the virtual HMI signals based on the safety controls.

In some embodiments, the PAC 124 generates a virtual input that includes a virtual lead car in order to control the VPC 102 to bring the vehicle 10 to a complete stop in the absence of an actual lead car. For example, the PAC 124 may bring the vehicle 10 to a stop as the vehicle 10 approaches a stop sign, a traffic signal, traffic, a disabled vehicle, or other suitable stopping conditions that the vehicle 10 may encounter, as described. The PAC 124 substitutes information received by the VPC 102 from the vehicle sensors 108 (e.g., information the VPC 102 uses to detect an actual lead car) with virtual information, signals, and/or inputs corresponding to the virtual lead car.

The VPC 102 detects the presence of the virtual lead car and performs operations associated with following a lead car (e.g., maintain a safe distance between the vehicle 10 and the lead car, keeping pace with the lead car, and bringing the vehicle to a stop in response to the lead car being within an object range of the vehicle 10 and coming to a complete stop). The PAC 124 may then control a virtual speed of the virtual lead car based on the target vehicle speed profile. The VPC 102 may then adjust the current vehicle speed of the vehicle 10 to follow the virtual lead car. In this manner, the PAC 124 may achieve the target vehicle speed profile of the vehicle 10 to provide optimum or improved energy consumption efficiency of the vehicle 10. While the PAC 124 may be controlling the VPC 102 using the virtual inputs described, the vehicle sensors 108, such as cameras, radar, proximity sensors, and the like, continue to provide information to the VPC 102, such that, while the VPC 102 may be applying or following the virtual inputs provided by the PAC 124, the VPC 102 may continue to detect actual vehicles or objects in front of the vehicle 10. The safety controls of the VPC 102 may be configured to override the VPC 102, including the virtual inputs provided by the PAC 124, to safely bring the vehicle 10 to a complete stop or increase or decrease vehicle speed in response to the information from the vehicle sensors 108

In some embodiments, the PAC 124 may be in direct communication with the VPC 102 and the torque split controller 116 to provide recommended target torque demands and target torque splits to the VPC 102 and the torque split controller 116, respectively, to achieve an optimum or improved energy consumption efficiency of the vehicle 10. For example, the VPC 102 may be configured to receive HMI signals (e.g., as described), to follow a lead vehicle based on information from the vehicle sensors 108 (e.g., as described), and to receive a recommended target vehicle speed signal from the PAC 124. The VPC 102 may determine whether to apply the target vehicle speed indicated by the recommended target vehicle speed signal, for example, based on the operator input, the detection of a lead vehicle, and/or the safety controls of the VPC 102.

The torque split controller 116 may be configured to receive a recommended torque split signal from the VPC 102 based on the operator input, as described, and may be configured to receive a recommended target torque split signal from the PAC 124. It should be understood that the PAC 124 may communicate the recommended target torque split signal to the VPC 102, which then may communicate the recommended target torque split signal and/or the recommended torque demand signal (e.g., generated by the VPC 102) to the torque split controller 116. The torque split controller 116 determines whether to apply the target torque split indicated by the recommended target toque split signal based on a comparison to the torque split indicated by the recommended torque split signal provided by the VPC 102 and/or based on an existing propulsion state of the vehicle 10 (e.g., including diagnostic conditions).

In some embodiments, the PAC 124 may communicate with the display 122 to provide an indicator to the operator that the vehicle speed may be changing in order to improve energy consumption efficiency of the vehicle 10. For example, the PAC 124 may use the display 122 to illustrate an energy efficiency symbol that indicates to the operator of the vehicle 10 that the vehicle speed may be changing in order to improve energy consumption efficiency of the vehicle 10.

In some embodiments, as described, the VPC 102 may not include an adaptive cruise control system and may include a basic cruise control system. Additionally, or alternatively, the operator of the vehicle 10 may not engage the VPC 102 in order to control propulsion of the vehicle 10 (e.g., the operator of the vehicle 10 may control propulsion manually). Accordingly, the PAC 124 may be configured to provide a recommendation to the operator indicating a target vehicle speed of a target vehicle speed profile. The recommendation may be provided to the operator of the vehicle 10 using one or more integrated displays of the vehicle 10, such as the display 122 which may include a portion of a dash or console of the vehicle 10, a navigation display of the vehicle 10, or other suitable integrated displays of the vehicle 10. In some embodiments, the recommendation may be provided to the operator of the vehicle 10 using a mobile computing device within the vehicle 10. The recommendation may include a symbol or textual information that indicates to the operator of the vehicle 10 to increase or decrease vehicle speed. Additionally, or alternatively, the recommendation can include a coast recommendation that may be displayed for a calabratable amount of time and may then be withdrawn in response to the operator of the vehicle 10 ignoring the recommendation. The recommendation can include information indicating that the recommendation may be in response to a change in speed limit, a stop sign being approached by the vehicle 10, traffic signal timing, and status, or other information. The information may be visually displayed and may decay as the vehicle 10 recommendation becomes obsolete.

The operator of the vehicle 10 may determine to honor the recommendation and change the vehicle speed accordingly, or the operator may choose to ignore the recommendation. The PAC 124 may be configured to monitor drive action in response to the recommendation to determine whether the operator of the vehicle 10 honored the recommendation or ignored the recommendation. The PAC 124 may determine whether to adjust recommendations based on the monitored operator action. For example, the PAC 124 may determine not to recommend coasting in response to the operator ignoring a threshold number of coasting recommendations. Additionally, or alternatively, the PAC 124 may determine, using the monitored operator action and the route traversed by the vehicle 10, whether the operator of the vehicle 10 honors the recommendation at certain portions of the route and ignores the recommendations at other portions of the route. The PAC 124 may selectively provide the recommendations to the operator of the vehicle 10 based on the monitored operator action and the vehicle route. Additionally, or alternatively, the PAC 124 may monitor the operator action in response to the recommendation based on traffic patterns, stop signs, traffic signals, and the like. The PAC 124 may selectively determine whether to provide the operator of the vehicle 10 the recommendations based on the monitored operator action in response to traffic patterns, stop signs, traffic signals, and the like.

In some embodiments, the PAC 124 and/or the VPC 102 may perform the methods described herein. However, the methods described herein as performed by the PAC 124 and/or the VPC 102 may not be meant to be limiting, and any type of software executed on a controller can perform the methods described herein without departing from the scope of this disclosure. For example, a controller, such as a processor executing software within a computing device onboard the vehicle 10, can perform the methods described herein.

In some embodiments, the system 100 may include additional, fewer, or other components, than those described with respect to and illustrated in FIG. 2. In some embodiments, the system 100 may perform more or fewer functions than those described above.

As described, vehicles, such as cars, trucks, sport utility vehicles, cross-overs, mini-vans, or other suitable vehicles, may include various automatic vehicle propulsion control systems that may provide a level of automation for the vehicle. For example, a vehicle may include cruise control, adaptive cruise control, automatic braking, a fully autonomous vehicle control system, or any suitable vehicle propulsion control system or a combination thereof. Typically, systems such as cruise control and adaptive cruise control receive input from an operator that indicates a desired vehicle speed. For the purposes of this disclosure, an operator may include a human driver (proximate to or remote from the vehicle), an automated system (proximate to or remote from the vehicle), or a combination thereof. In the case of a fully autonomous vehicle, the autonomous vehicle control systems may determine a vehicle speed based on posted speed limits and a variety of safety systems and protocols. The automatic vehicle propulsion control systems typically interact with various vehicle components, such as a throttle, brake system, and the like, to achieve the desired speed.

While autonomous vehicles may be able to bring the vehicle to a complete stop, cruise control systems are typically capable of maintaining the desired vehicle speed by adjusting a torque demand provided to various vehicle components without being capable of bringing the vehicle to a complete stop without operator interaction. Additionally, or alternatively, adaptive cruise control systems are typically capable of maintaining the desired vehicle speed and adjusting the vehicle speed to maintain a safe distance from a lead vehicle (e.g., a vehicle immediately in front of the vehicle operating the automatic vehicle propulsion control system). However, cruise control and adaptive cruise control systems may not be capable of bringing the vehicle to a complete stop, as may be the case with cruise control, or the system may not be capable of bringing the vehicle to a complete stop in the absence of a lead vehicle, as may be the case with adaptive cruise control. Further, such systems typically do not continue vehicle propulsion without further input from the operator, such as the operator actuating a resume switch, after the vehicle has been brought to a full stop. In addition to the above, the automatic vehicle propulsion control systems described may not be capable of controlling vehicle propulsion in order to achieve a desired energy consumption (e.g., fuel, battery, and the like) efficiency. Accordingly, systems and methods, such as those disclosed herein, that provide vehicle propulsion control in order to achieve an optimum energy consumption may be desirable.

In addition or alternatively to the above, while systems may exist to provide a coasting speed recommendation to an operator, such systems may not be capable of selectively determining the coast speed based on various factors. Examples of such factors include vehicle position data, vehicle geography, vehicle characteristics, and subsequent speed change events. For example, projected route information may be valuable in determining a coasting speed, especially with regards to an elevation of the route being traversed by the vehicle 10. A stop event may occur past the top of a hill, and coasting without taking into account a minimum acceptable speed at the top of the hill could result in driver discomfort (e.g., being on a 45 mile per hour road, but losing so much speed coasting up the hill that the vehicle is only going 10 miles per hour at the peak of the hill). A stop event may occur shortly after a speed reduction event (e.g., a stop sign occurring 100 feet beyond a speed limit reduction to 25 miles per hour). Calculating when to coast for the speed limit change may result in inefficiencies where the following stop sign is not taken into account. It may instead be more efficient to coast down to the stop sign while ignoring the speed limit change, as 25 miles per hour 100 feet before the stop sign may be substantially higher than the desired residual speed for the stop sign. For example, it may be more efficient to coast down to 15 miles per hour 50 feet prior to the stop sign than, say, 20 miles per hour 50 feet prior to the stop sign. However, in this example, coasting down to 25 miles per hour at 100 feet prior to the stop sign may result in coasting down to only 20 miles per hour 50 feet prior to the stop sign, requiring more fuel usage and more braking than if the coasting was targeting 15 miles per hour at 50 feet prior to the stop sign. Accordingly, systems and methods, such as those disclosed herein, that provide coasting recommendations in order to achieve an optimum energy consumption may be desirable.

In addition or alternatively to the above, while systems may exist to provide travel speed recommendations, such systems may not provide segmented, efficient cruise recommendations that avoid discomfort and distraction for the operator. For example, some systems may determine a single efficient cruise speed for a trip, but that single efficient cruise speed may be relatively less efficient than a larger number of cruise speeds associated with uphill and downhill segments. As another example some systems may provide constant speed updates, regularly changing speed may be distracting to a driver and reduce energy efficiency through repeated accelerations and decelerations. Accordingly, systems and methods, such as those disclosed herein, that provide cruising speed recommendations in order to achieve an optimum energy consumption while minimizing operator distraction and discomfort may be desirable.

In addition or alternatively to the above, some systems may exist for providing recommended energy efficient operations to an operator of a vehicle. However, such systems may be distracting or present the recommendations in a non-intuitive manner. Accordingly, systems and methods, such as those disclosed herein, that provide energy efficiency recommendations in an intuitive, low-distraction manner in order to achieve an optimum energy consumption.

As described, typical vehicle propulsion control and recommendation systems may only allow for limited coasting capabilities. However, there may be opportunities, while the vehicle traverses a route, to allow the vehicle to coast to, for example, improve energy efficiency. However, there may be opportunities, while a vehicle traverses a route to allow a vehicle to coast in order to, for example, improve energy efficiency. Various challenges exist in providing coasting features. For example, it may be difficult to determine a start of coasting distance and corresponding pre-coasting vehicle speed under the assumption of a known desired speed at the target (e.g., a stop, or speed limit reduction). Further, rolling (e.g., coasting) the vehicle 10 all the way to the stop (e.g., such as at a stop sign with a speed target of zero) may cause discomfort to the operator or discomfort to other vehicles following the operator.

To address this, a target speed (i.e., a residual speed, a speed to reach prior to a speed change event, for instance the speed to coast down to prior to braking for a stop sign) for a stop sign may be approximately 15 mph to be reached at a target position (residual position, the position from which the operator would begin coasting) 30 feet before the stop sign. The target speed and/or target position may be a selectable choice of an operator. The target speed and/or target position may be determined based on past driver behavior and responsiveness to coasting recommendations.

Coasting is a movement of the vehicle resulting from an embedded kinetic energy of the vehicle and a lack of the propulsion being provided by the powertrain. Vehicle movement during coasting is further affected by various forces acting on the vehicle (e.g., aerodynamic drag forces), and is based on the velocity and aerodynamic characteristics of a specific vehicle, gravity forces (based on the road elevation profile (road grade [%]), and mass associated with the vehicle (e.g., vehicle dry mass, mass of gasoline, mass associated with occupants of the vehicle, vehicle load associated with cargo and the like), gear/engine friction forces, wind forces, road curvature friction forces, rolling friction forces, and/or other forces.

For any known vehicle identification number (VIN) the information on aerodynamic drag coefficients (represented by A, B, & C), vehicle mass, and engine characteristic may be available via various remotely located computing devices, such as "cloud" computing devices, Environmental Protection Agency (EPA) databases, and the like. Additionally, or alternatively, a road grade and/or road characteristics between any start point and target point (stop sign/stop light, speed limit, traffic, and the like) may be accessible via global positioning system (GPS) detailed map meta-data, other suitable sources, and the like. Vehicle characteristics and other factors, like driver behavior, can be determined with a dedicated learning algorithm based on a difference between a predicted target speed and actual speed at the target location found in previous coasting recommendations.

An equation can be formulated using fundamental kinetic energy conversion-to-work equation over the incremental distance $\Delta S$ at a point i on the road as the change in the kinetic energy of the vehicle is proportional to the change in the vehicle's velocity induced by all forces, $\Sigma F(i)$, contributing to the vehicle's slow down (negative acceleration) when coasting:

$$\Delta Ek = \tfrac{1}{2} \cdot mass \cdot \Delta V2 = \Sigma F(i) \times \Delta S \qquad \text{Equation (2)}$$

The estimate of the total force slowing down the vehicle can be used to calculate an instant negative acceleration:

$$accel(i) = \Sigma F(i)/mass \qquad \text{Equation (3)}$$

Vehicle velocity at an earlier point i−1, i.e., $Vx(i-1)$ located at distance $\Delta S$ from point i, if velocity at point i, $Vx(i)$, can be found:

$$Vx(i-1) = sqrt\{[Vx(i)]2 + 2 \cdot accel(i) \cdot \Delta S\} \qquad \text{Equation (4)}$$

Where $\Delta S$ represents the change in distance between two consecutive road grade readings.

The grade reading at every point i can be determined by interpolation of grade data received from a GPS to fit either a constant or a position-varying distance step $\Delta S$.

Using the iteration technique and starting at the desired target velocity at a desired target location (e.g., at or prior to the stop sign or speed limit) a processor can calculate the "velocity envelope" backwards along the travel path to a maximum desired speed (usually the speed limit on the section of the road being considered).

Figure 4A:
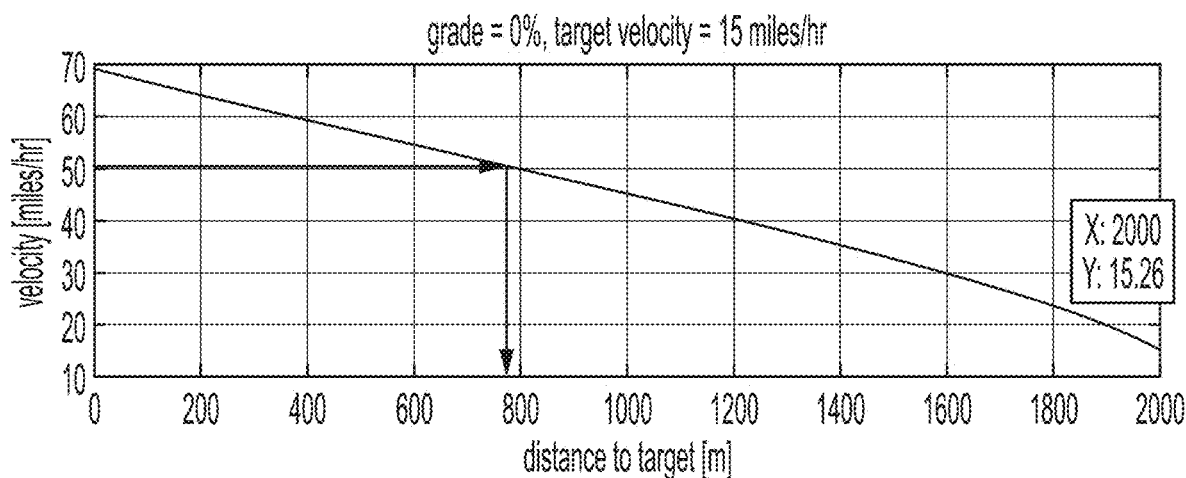
FIGS. 4A-4B generally illustrate velocity envelopes according to the principles of the present disclosure.

For a flat or substantially flat surface (e.g., surface or road grade being at or near 0%), a velocity envelope may look like that illustrated in FIG. 4A, which illustrates a velocity envelope calculated for a specific vehicle (specific mass, aerodynamic definition, and engine/gear friction). The velocity envelope may be calculated assuming the target vehicle speed to be 15.26 mph (start of iteration). Arrows 402 point to an example of pre-coasting velocity of the vehicle at approximately 50 mph, such that the processor may identify the start of coasting to be at the distance to the target approximately equal to be 2000 m−780 m=1220 m (or 780 m down the road if calculation of the velocity envelope is available at the distance of 2000 m from the target).

Typically, surfaces traversed by the vehicle 10 may deviate from a substantially flat surface. The velocity envelope (illustrated in FIG. 4A) becomes modulated by an uneven road grade due to the varying gravity component of the total force ΣF(i). An example of uneven grade road profile and resultant "velocity envelope" is illustrated in FIG. 4B using a target velocity equal to 14.78 mph (starting point for the iteration).

Figure 4B:
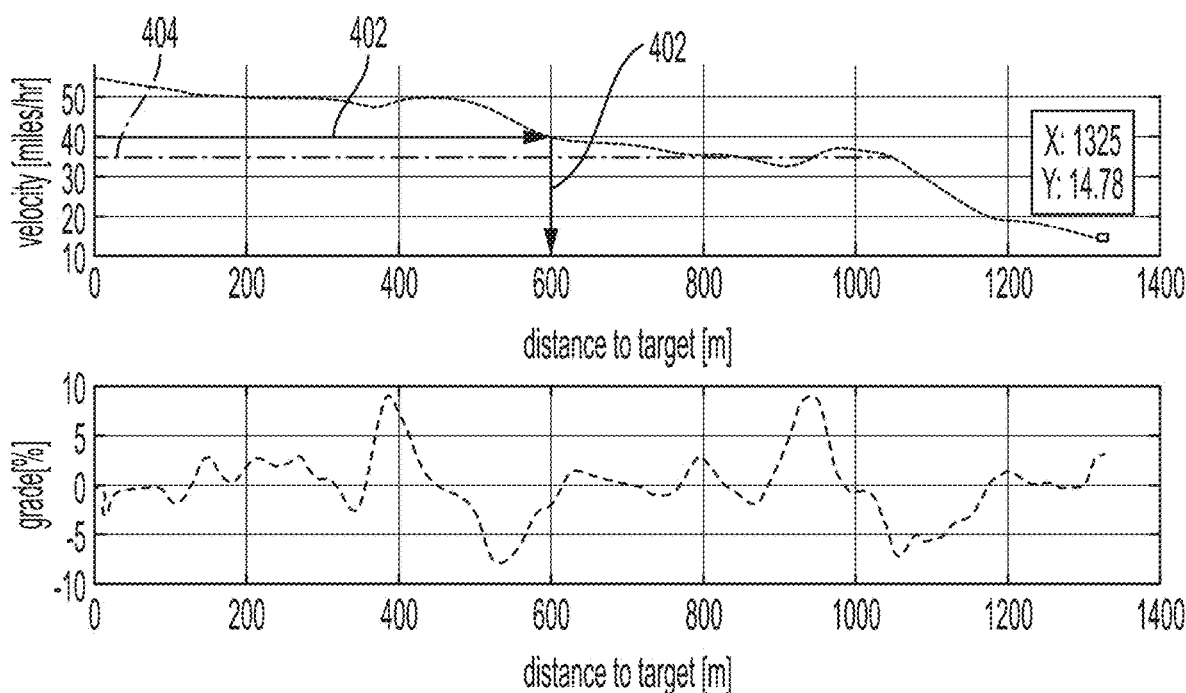

FIG. 4B illustrates a velocity envelope calculated for a specific vehicle (specific mass, aerodynamic definition, and engine/gear friction). The example illustrates uneven road grade depicted together with the result of "envelope" calculations. The envelope may be calculated assuming the target vehicle speed to be 14.78 mph and may be limited to maximum of 55 mph as it might be performed in city traffic where speed limit may be 55 mph or lower. Arrows 402 illustrate an example of the pre-coasting velocity of the vehicle equal to 40 mph which translates to a suggestion of a start of coasting at a distance (target distance) to the stop event approximately equal to 1325 m−600 m=725 m (or 600 m down the road if calculation of the "velocity envelope" may be available at the distance of 1325 m from the target).

The dot-dash line 404 in FIG. 4B (wherein the assumption may be that the vehicle cruises at the speed of 35 mph) indicates that, in some cases, the coasting velocity may occasionally exceed initial cruising velocity (steep downslope), or fall below the target velocity (steep uphill). This may result in an inappropriate low speed not acceptable to an operator, and should be handled by an additional upfront-generated velocity envelope with the aim to deliver reasonable coasting advice at the machine-human interface.

Figure 5A:
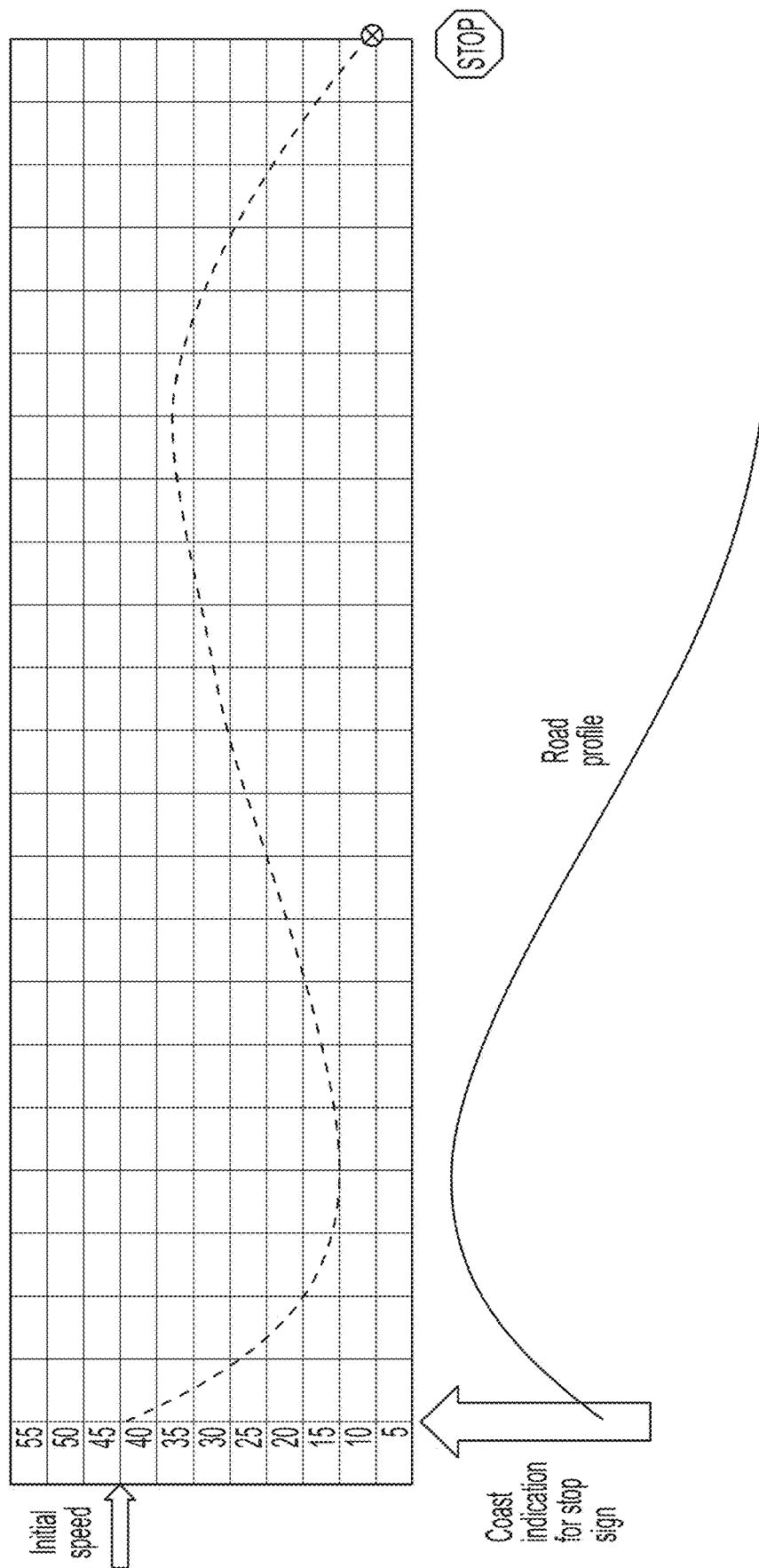
FIGS. 5A-5B generally illustrate velocity envelopes according to the principles of the present disclosure.

FIG. 5A illustrates an example where, without a minimum (i.e., lower) speed envelope, the corresponding coast recommendation would place the coast point before a downhill segment, which would result in very low speed at the top of the hill.

Figure 5B:
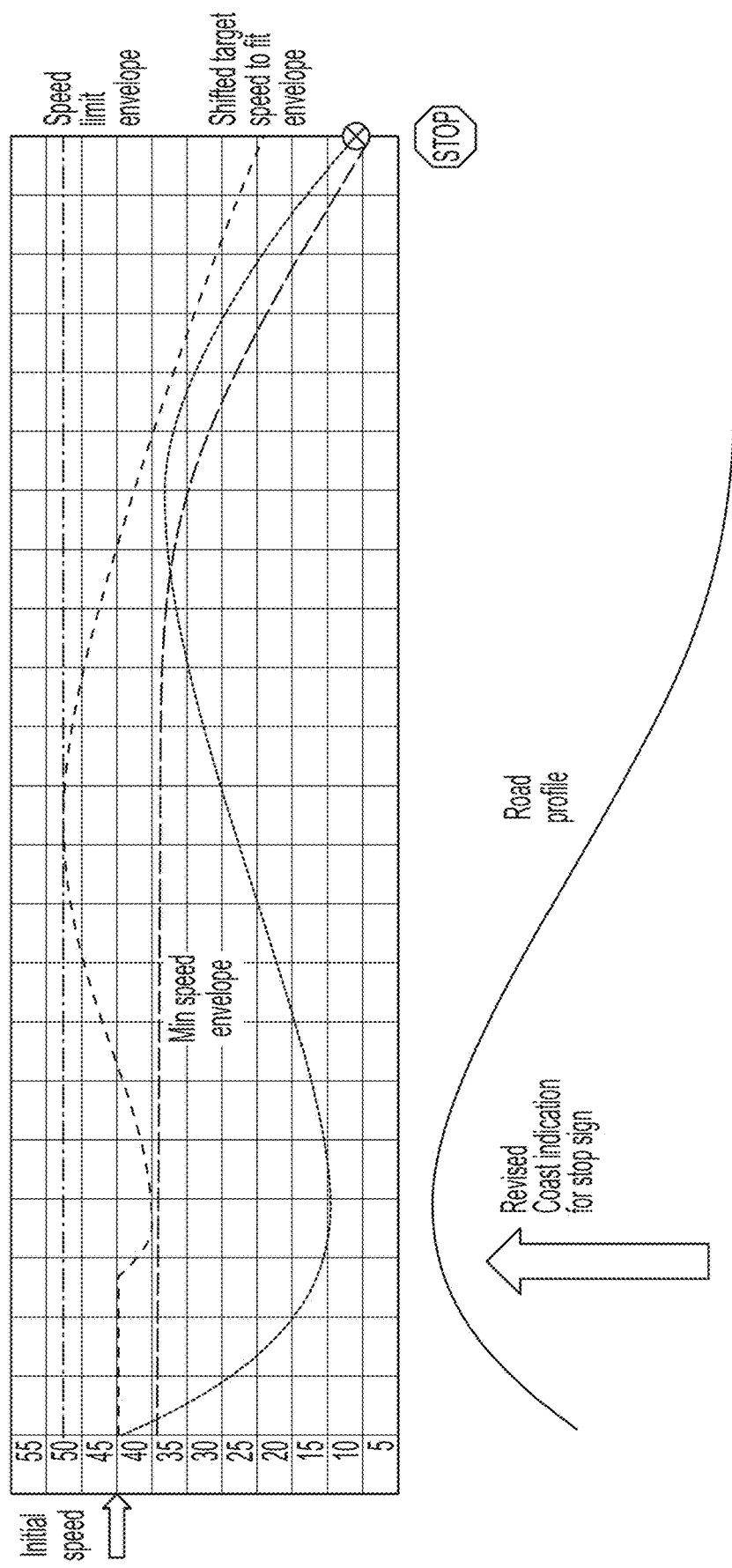

FIG. 5B illustrates that introducing a minimum speed envelope based on a percentage of the current speed limit or typical average driving speeds contained in the map metadata, together with a minimum deceleration limit before reaching e.g. a stop-sign, will delay the coast indication, keeping a realistic speed profile and having limited impact on the fuel economy.

Minimum speed envelope parameters may be dependent on the selected driving profile. For example: a normal driving profile may have a 5% economy target (e.g., energy economy target or range extension), minimum speed at 80% of the speed limit, and minimum deceleration of 1 m/s2; an Eco driving profile has a 10% economy target, minimum speed at 70% of the speed limit, and minimum deceleration of 0.5 m/s2; and an Eco+ driving profile has a 15% economy target, minimum speed of 60% of the speed limit, and a minimum deceleration of 0.25 m/s2.

Figure 6:
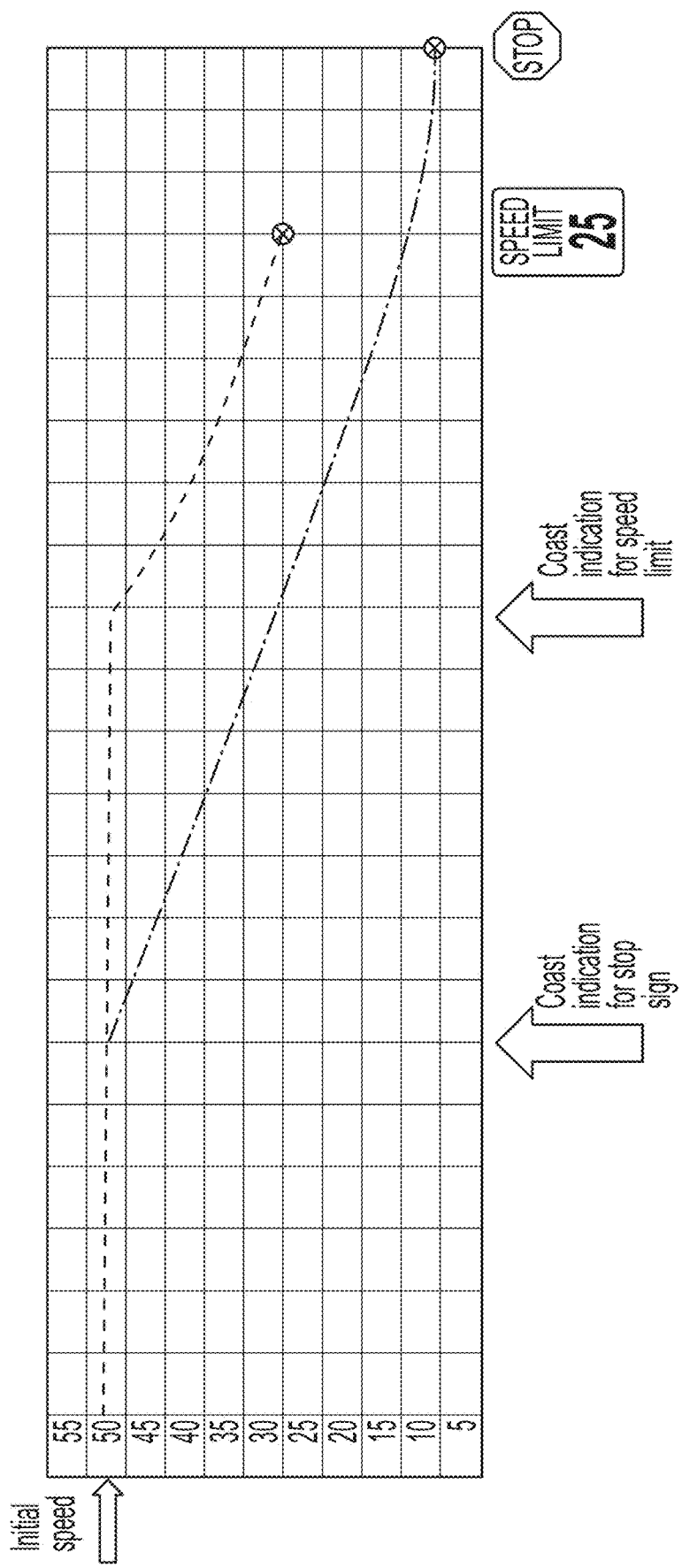
FIG. 6 generally illustrates velocity envelopes according to the principles of the present disclosure.

FIG. 6 illustrates an example of event shadowing. In FIG. 6, there are two speed reduction events, a speed limit reduction and a following stop sign. In the illustrated case, the car drives at 48 mph, the system determines a 25 mph speed limit as next event with a target speed off 25 mph and issues the coast indication at the blue arrow. The stop event may be shadowed by the speed limit event. Had it taken into account the stop sign a bit further, it could have given the coast indication sooner to provide additional fuel savings.

In some embodiments of the present disclosure, significant fuel savings may be possible through optimization of the coast phase durations with zero fuel burn. The system may have an advantage over a human operator as it knows precise road topography, distance to deceleration events (stop, traffic light, speed limit decrease) beyond visual range, and can accurately predict deceleration and stop distance based on knowledge of vehicle road-load parameters. The system can prioritize subsequent events to maximize fuel saving and takes into account realistic minimum speeds. The algorithm may rely on existing vehicle sensors augmented by a location based navigation database.

In some embodiments the system 100 may be configured to receive vehicle position data. For example, the PAC 124 may receive the vehicle position data from GPS 126. For example, the vehicle position data may be received by the PAC from the remote computing device 132.

The system 100 may be configured to receive vehicle characteristic data. For example, the PAC 124 may retrieve vehicle characteristic data from the remote computing device 132. In some embodiments, the vehicle characteristic data may include vehicle aerodynamics. In some embodiments, the vehicle characteristic data may include vehicle mass. In some embodiments, the vehicle characteristic data may include vehicle fuel consumption profiles. In some embodiments, the vehicle fuel consumption profiles may be based on one or more Environmental Protection Agency (EPA) fuel economy tests. In some embodiments, the vehicle fuel consumption profiles may be based off of a historical analysis of past vehicle fuel consumption.

The system 100 may be configured to receive planned route data. For example, the PAC 124 may receive the planned route data from the remote computing device 132, on which a planned route has been generated. The planned route data may be received by way of the network interface 312. In some embodiments, the planned route data may be received from navigational software operating on one or more components of the system.

The system 100 may be configured to determine a projected route based at least in part on the vehicle position data. In some embodiments, determining the projected route may be based at least in part on the planned route data. For example, the PAC 124 may receive the planned route data and determine that the projected route is the planned route as based on the planned route data. In some embodiments, determining the projected route may be based at least in part on the vehicle position data. In some embodiments, determining the projected route may be based at least in part on historical analysis of operator travel. For example, if an operator has driven the same route at the same time of day on many occasions, the projected route may be determined based on the assumption that the user may be taking the same route.

The system 100 may be configured to receive route characteristic data. For example, the PAC 124 may receive route characteristic data from the remote computing device. In some embodiments, the route characteristic data includes elevation data. In some embodiments, the route characteristic data includes signage information (e.g., location of stop signs, timing of stop lights, etc.). In some embodiments, the route elevation data may include the elevation at multiple points along the projected route. In some embodiments, the route characteristic data may further include road curvature data. Examples of road curvature data may include one or more of curvature of the road along the length of the road and curvature of the road across the road (i.e., the extent to which the road may be crowned or sloped). In some embodiments, the route characteristic data may further include road surface condition data. Examples of road surface condition data may include coefficients of friction, road rolling resistance contribution, existence of known potholes, and recent icy conditions. In some embodiments, the route characteristic data further includes weather data. Examples of weather data may include whether it rained recently, whether it snowed recently, and whether fog may be impeding visual identification of other vehicles. In some embodiments, the route characteristic data further includes speed limit data. In some embodiments, the route characteristic data further includes traffic data.

The system 100 may be configured to determine a first speed change position and a first speed change target speed based at least in part on the projected route. For example, the PAC 124 may determine the first speed change position and the first speed change target speed. In some embodiments, determining the first speed change target speed may be based at least in part on the route characteristic data. For example, the signage information may be used to identify a stop sign or stoplight ahead. As another example, the speed limit information may be used to identify a speed reduction ahead. In some embodiments, determining the first speed change target speed may be based at least in part on the traffic data. For example, the traffic data may be used to identify a backup ahead. In some embodiments, determining the first speed change position may be based at least in part on the route characteristic data.

The system 100 may be configured to determine a second speed change position and a second speed change target speed based at least in part on the projected route. For example, the PAC 124 may determine the second speed change position and the second speed change target speed. In some embodiments, determining the second speed change target speed may be based at least in part on the route characteristic data. For example, the signage information may be used to identify a stop sign or stoplight ahead. As another example, the speed limit information may be used to identify a speed reduction ahead. In some embodiments, determining the first speed change target speed may be based at least in part on the traffic data. For example, the traffic data may be used to identify a backup ahead. In some embodiments, determining the first speed change position may be based at least in part on the route characteristic data.

The system 100 may be configured to determine a first residual speed and a first residual speed position based at least in part on the first speed change position and the first speed change target speed. For example, the first residual speed and first residual speed location may be determined by the PAC 124 by calculating based on a maximum desired braking deceleration to a selected percentage of the speed limit from the first speed change position and the first speed change target speed. In some embodiments, determining the target speed profile may be based at least in part on the traffic data. For example, the traffic may be moving too fast to allow for a low first residual speed.

The system 100 may be configured to determine a second residual speed and a second residual speed position based at least in part on the second speed change position and the second speed change target speed. For example, the second residual speed and second residual speed location may be determined by the PAC 124 calculating based on a maximum desired braking deceleration to a selected percentage of the speed limit from the second speed change position and the second speed change target speed. In some embodiments, determining the target speed profile may be based at least in part on the traffic data. For example, the traffic may be moving too fast to allow for a low first residual speed.

The system 100 may be configured to determine a first lower speed tolerance (i.e., a speed below which the vehicle should not coast below; this speed may be adjusted lower as the first residual speed position draws closer). In some embodiments, the first lower speed tolerance may be retrieved by the PAC 124 from a storage device or received from the remote computing device 132. In some embodiments, the first lower speed tolerance may be determined based on speed limit information.

The system 100 may be configured to determine a second lower speed tolerance (i.e., a speed below which the vehicle should not coast below; this speed may be adjusted lower as the first residual speed position draws closer). In some embodiments, the second lower speed tolerance may be retrieved by the PAC 124 from a storage device. In some embodiments, the second lower speed tolerance may be determined based on speed limit information.

The system 100 may be configured to determine a first lower speed envelope based at least in part on the first residual speed. For example, the PAC 124 may determine the first lower speed envelope. For example, the first lower speed envelope may not pass below the first residual speed. In some embodiments, determining the first lower speed envelope may be further based on the first lower speed tolerance. For example, the first lower speed envelope may not drop below the first lower speed tolerance.

The system 100 may be configured to determine a second lower speed envelope based at least in part on the second residual speed and a second lower speed tolerance. The PAC 124 may determine the lower speed envelope. For example, the second lower speed envelope may not pass below the second residual speed. In some embodiments, determining the second lower speed envelope may be further based on the second lower speed tolerance. For example, the second lower speed envelope may not drop below the second lower speed tolerance.

The system 100 may be configured to determine an overall lower speed envelope based at least in part on the first residual speed. For example, PAC 124 may determine the overall lower speed envelope. In some embodiments, determining the overall lower speed envelope may be further based on the second lower speed envelope such that the overall lower speed envelope is the lesser of the second lower speed envelope and the second lower speed envelope.

The system 100 may be configured to determine an upper speed tolerance based at least in part on the speed limit information. For example, the PAC 124 may determine the upper speed tolerance based on the speed limit information. For example, in some embodiments, the upper speed tolerance may not exceed the speed limit, or may not exceed the speed limit plus a fixed or percentage value over the speed limit.

The system 100 may be configured to determine an upper speed envelope. For example, the PAC 124 may determine the upper speed envelope. In some embodiments, determining the upper speed envelope may be based at least in part on the speed limit information. In some embodiments, the upper speed envelope may be based at least in part on the upper speed tolerance.

The system 100 may be configured to determine a target speed profile based at least in part on the first residual speed, the first residual speed position, the overall lower speed envelope, and the upper speed envelope. For example, the PAC 124 may determine the target speed profile. In some embodiments, the target speed profile lies above the overall lower speed envelope and below the upper speed envelope. In some embodiments, determining the target speed profile may be further based on the vehicle characteristic data. For example, the target speed profile may change in view of vehicle weight, aerodynamics, etc.

The system 100 may be configured to determine a coast start point based at least in part on the target speed profile. For example, the PAC 124 may calculate the coast start point by selecting the point on the target speed profile where the current speed intersects the target speed profile and the target speed profile may not pass above the upper speed envelope or below the overall lower speed envelope.

The system 100 may be configured to communicate the coast start point to the operator of the vehicle. For example, the PAC 124 may send a signal to cause an audio variety of additional output device 134 to produce an audible signal indicating to start coasting now (e.g., an audible "coast now" or a chime). In some embodiments, the PAC 124 may send a signal to cause the display 122 to present a visual indicator (e.g., a written message such as "coast now" or an image of a foot being lifted off of an accelerator).

Further to the above, there are substantial cost and environmental pressures to develop solutions leading to more energy efficient vehicles. This is being achieved in part by continuous improvements to the power train system, but may also be delivered by "conscious" driving (i.e., enhanced, more energy efficient driving). Enhanced, more energy efficient driving may be achieved by providing the operator with information pertaining to the projected vehicle's energy efficiency along the planned driving path, as well as recommendations regarding cruising speed.

More energy-efficient driving may be aided through usage of a tablet or smartphone equipped with a GPS receiver and containing detailed road meta-data. Energy economy may be based on vehicle characteristics of an individual vehicle (e.g., aerodynamics, mass, fuel consumption and/or energy consumption characterized by the specific, standardized EPA tests that can be accessed (via the "cloud") if the vehicle VIN number is known). The tablet or smartphone may then be able to provide recommendations to the driver, offering opportunities for fuel economy improvement to vehicles already on the road. Similarly, vehicles may be able to provide such recommendations based on similar fuel economy information.

Significant fuel economy improvements may be achieved during highway cruising by operating the vehicle at speeds near optimum powertrain efficiency. This information can be computed by an algorithm on the smart device by utilizing map meta-data (i.e., route characteristics) such as road grade, curvature and speed limits and knowledge about the powertrain characteristics such as specific energy consumption, gear ratio, mass and aerodynamic drag obtained from a vehicle database.

When cruising at a constant speed, the kinetic energy of the vehicle may be maintained by providing propulsion to counter-balance kinetic energy loss resulting from the following forces: the aerodynamic drag force (which is based on velocity and aerodynamic characteristic of a specific vehicle dependent), gravity force based on the road profile (road grade roD and vehicle mass, combined gear/engine friction forces, and other forces (e.g., wind, friction from road curvature, rolling friction, etc.).

According to the disclosed embodiments, the energy used by the propulsion system as adjusted by the energy conversion factor and efficiency of the powertrain provides the force needed to maintain constant vehicle velocity regardless of velocity-dependent friction losses and road profile-defined gravity forces. A challenge is to provide an acceptable approximation of fuel consumption by the vehicle at variety of vehicle speeds and engine/battery loads.

The estimate of energy consumption vs. velocity of a vehicle along the road with constantly changing road grade is valuable information allowing for calculation of fuel saving at any velocity in reference to the fuel consumption when the vehicle is driven at the speed limit. Energy efficiency data for any combination of vehicle's speed and road grade can be obtained using a look-up graph, such as that depicted in FIG. 8.

Figure 8:
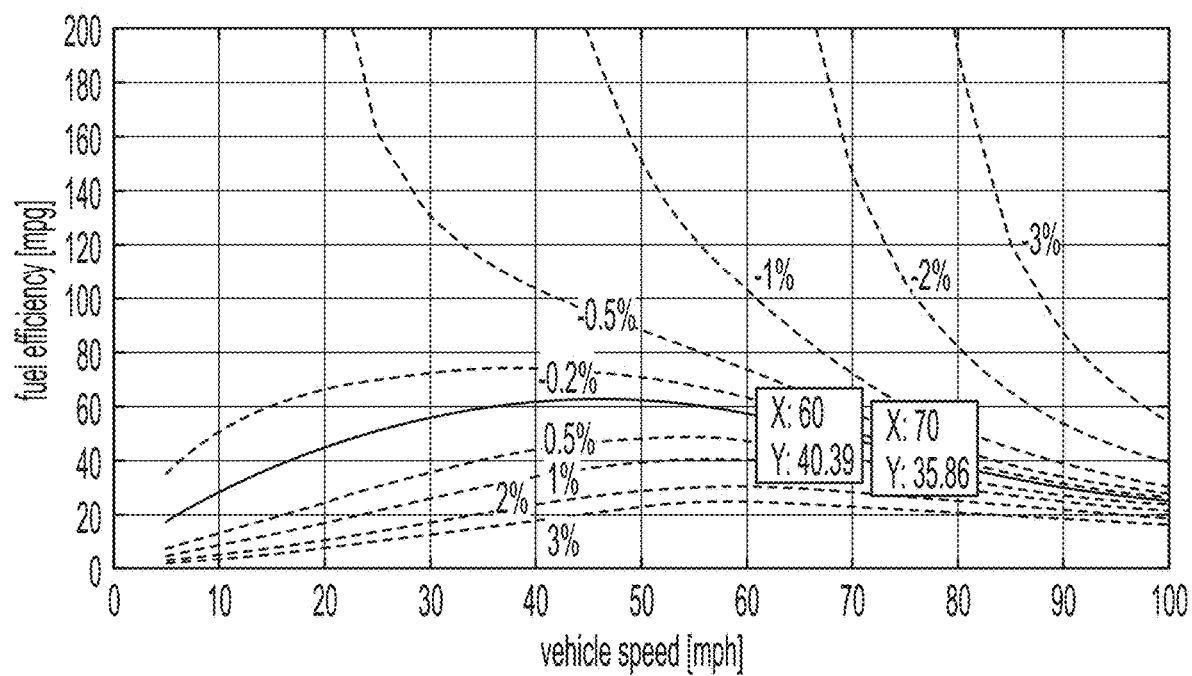
FIG. 8 generally illustrates a grade-speed lookup graph according to the principles of the present disclosure.

FIG. 8 shows an example of energy efficiency characteristics of a vehicle, depicted for variety of road grades. As indicated in FIG. 8, driving a given on a 1% incline delivers 35.86 mpg when cruising at 70 mph, and 40.39 mpg when cruising at the speed of 60 mph.

As shown in FIG. 8, driving this specific vehicle along the road with constant incline of 1% at cruising speed of 60 mph instead of 70 mph, delivers the saving of the fuel: 40.39-36.66=3.73 mpg, or approximately 10%.

It is worthwhile to note that some steep falling road slopes do not have any representation in FIG. 8, as gravity alone delivers the force necessary to propel the vehicle forward. Of course, such negative road grades deliver fuel savings; the algorithm, instead of calculating fuel saving, will deliver a recommendation to coast.

A vehicle-specific family of characteristics can be either OEM-provided, or in the case of aftermarket application, estimates can be generated using the technique described herein.

Ultimately, the algorithm may allow the driver to sacrifice some fraction of the total travel time to save a specific amount (or percentage) of the fuel.

Frequent changes in recommended speed where the road profile frequently changes may not be practical, and may be distracting for the driver. Such a scenario may not be desired even if the commanded change in velocity is executed automatically, as the frequent accelerations and decelerations not only create discomfort but result in extra fuel consumption being ignored by a theoretical model that assumes quasi-constant (cruising) velocity. In short, some type of the road profile pattern recognition technique is highly desirable to establish a compromise between instant change in fuel consumption in response to instant change in the road grade, and a grand average approach, where instant grade would be replaced with the average road grade calculated as a ratio of the difference between elevations of end and starting point, divided by the distance between start and the target.

An example of the technique which might be used to divide the traveling distance into sections with constant cruising speed is given below. It may be arbitrarily assumed that changing the speed (to maintain constant desired fuel saving) over distances shorter than 1000 m may not be practical due to distraction and too frequent acceleration, which may be counter-productive from the perspective of fuel saving.

The common sense suggests that, generally, long uphill sections should be separated (different sections) from long downhills, and that the flat, or nearly flat long load sections, should be separated from both long downhill and long uphill sections. Also, since the gravity compensates for additional engine-generated propulsion force, without any calculations one may predict that rolling downhill with higher speed (within the speed limit) will be always advised, and consequently, an initiation of acceleration should be performed on a downhill slope rather than at the crest.

Figure 9A:
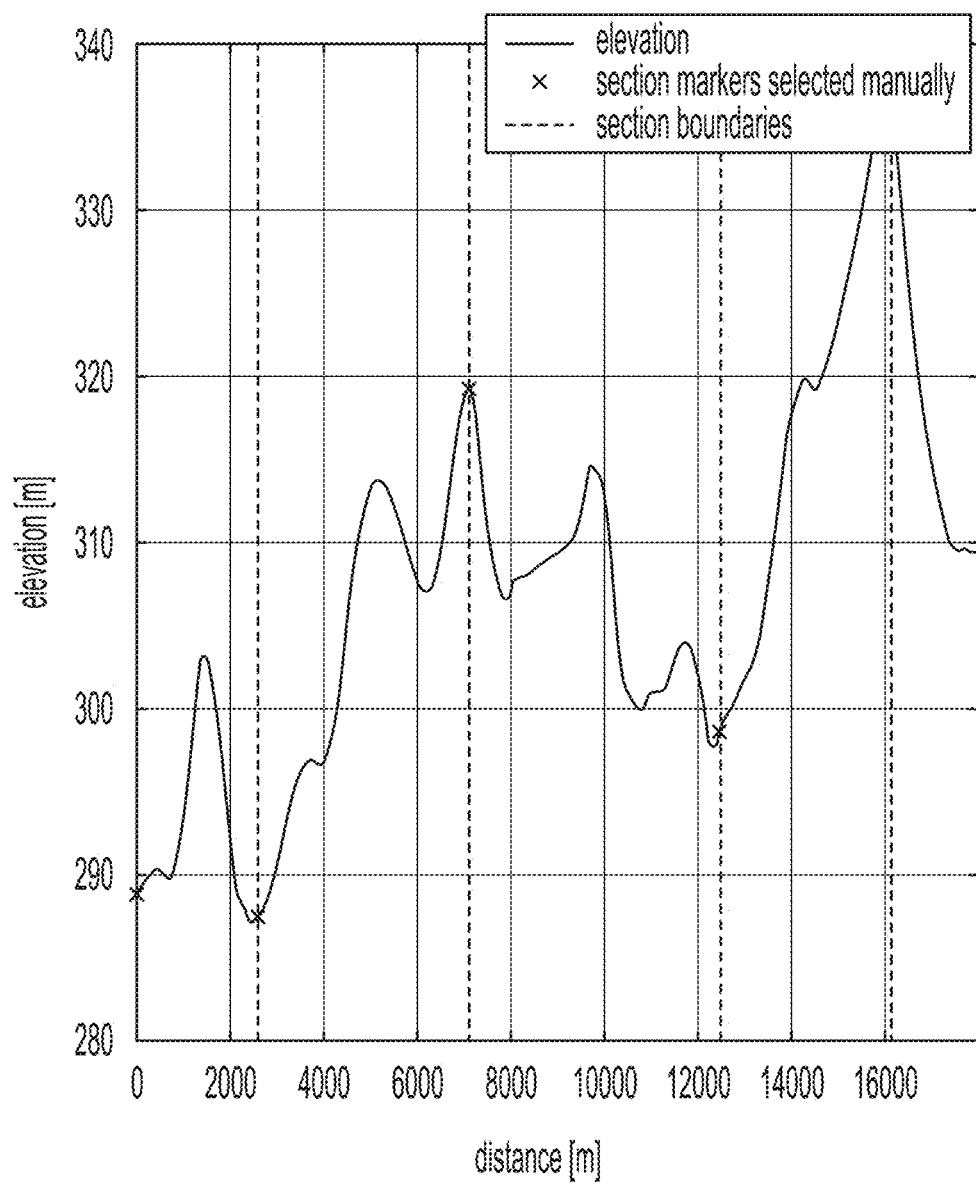
FIGS. 9A-9B generally illustrate routes segmented according to the principles of the present disclosure.
Figure 9B:
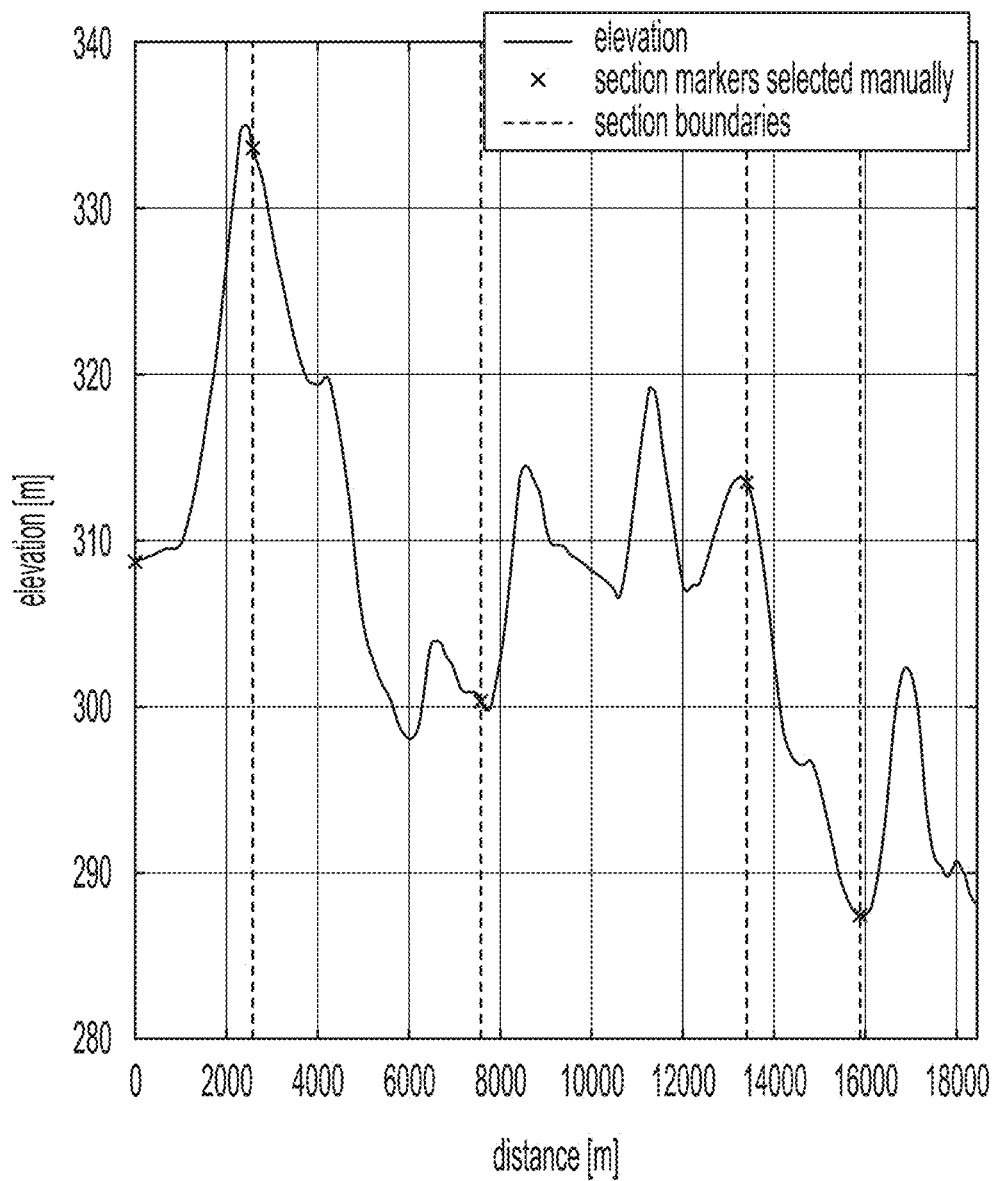

The above listed observations may lead to an initial "pattern recognition algorithm" (i.e., "driver's common-sense choice"), which is illustrated in FIGS. 9A and 9B, and which can be disputed—and possibly improved—by referencing "a wiser" choice. The marked sections of constant cruising velocity were selected arbitrarily using a fuzzy defined common-sense approach. The FIGS. 9A and 9B represent nearly 18 km section of the freeway covered twice, in opposite directions. Consequently, the distance and elevation differential of both distances are almost identical, however the boundaries of individual sections may not coincide on the way out and back.

Figure 10A:
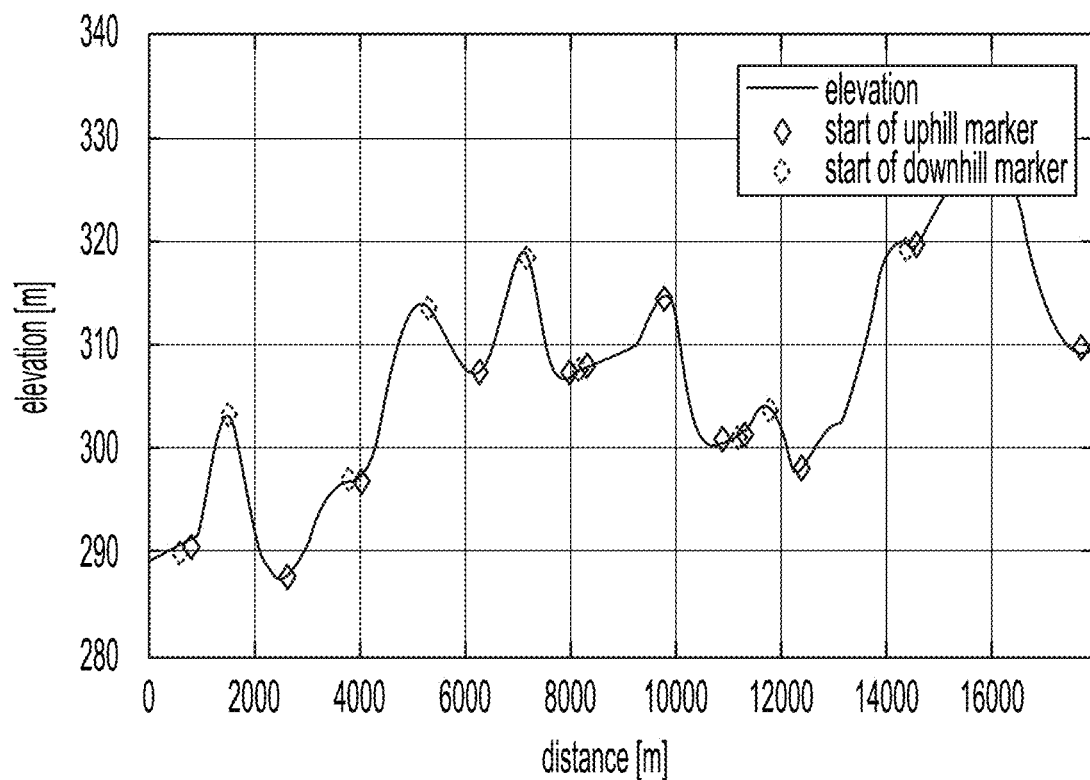
FIGS. 10A-10B generally illustrate various vehicle routes according to the principles of the present disclosure.
Figure 10B:
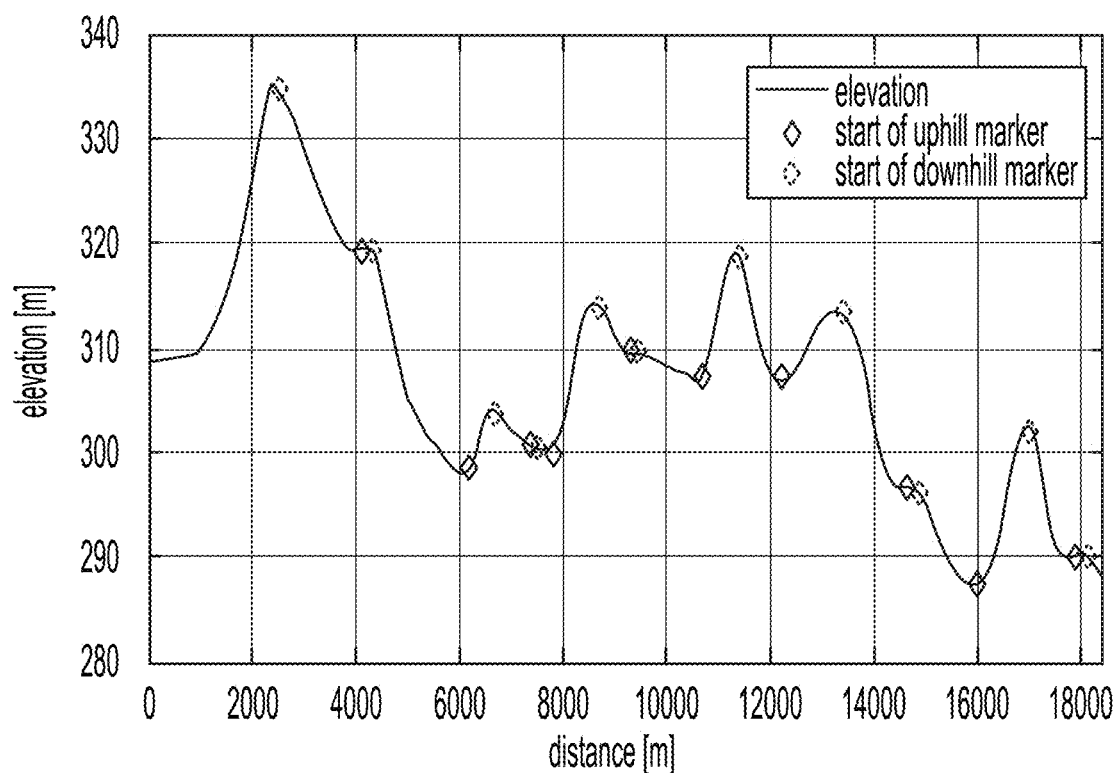

The logic of "machine-based" pattern recognition technique seeks efficient finding of major road crests, and formulates criteria allowing to ignore some local "road bumps." The initial intense filtering of the GPS-provided road elevation signal combined with re-sampling (for the illustration of the approach, elevation signal may be re-sampled at 100 m distances) still delivers too many crests for the "smooth" operation of the cruising algorithm. Therefore, subsequently, the crests and valleys were identified independently by calculating the elevation differential. Results are depicted in FIGS. 10A and 10B, where local maxima and minima of the elevation trace are marked.

All starts of the downslopes were intentionally pushed downhill by the arbitrarily selected distance equal to 100 m. The best selection for this "start of the downhill" distance delay can be verified theoretically for individual type of vehicles using engine/vehicle models (e.g., GT Power). Over-reaction to road grade changes may be detrimental for the algorithm, as too frequent changes in the vehicle speed results with undesired fuel consumption. Theoretical modeling of this effect may deliver "context optimal" distances for minimum distance over which saving resulted from moderate speed prevails over losses from necessity of engaging acceleration.

To illustrate the idea of that compromise, and to demonstrate that this can be done with even a very crude logic, it may be assumed that the travel distance between commands requesting a change in a current cruising velocity may not be shorter than 1000 m. This, together with the removal of clusters representing short-distance-spaced conversions of valleys into crests and vice-versa, led to the results presented in FIGS. 11A and 11B, which illustrate, step by step, a pattern recognition filtering technique.

Figure 11A:
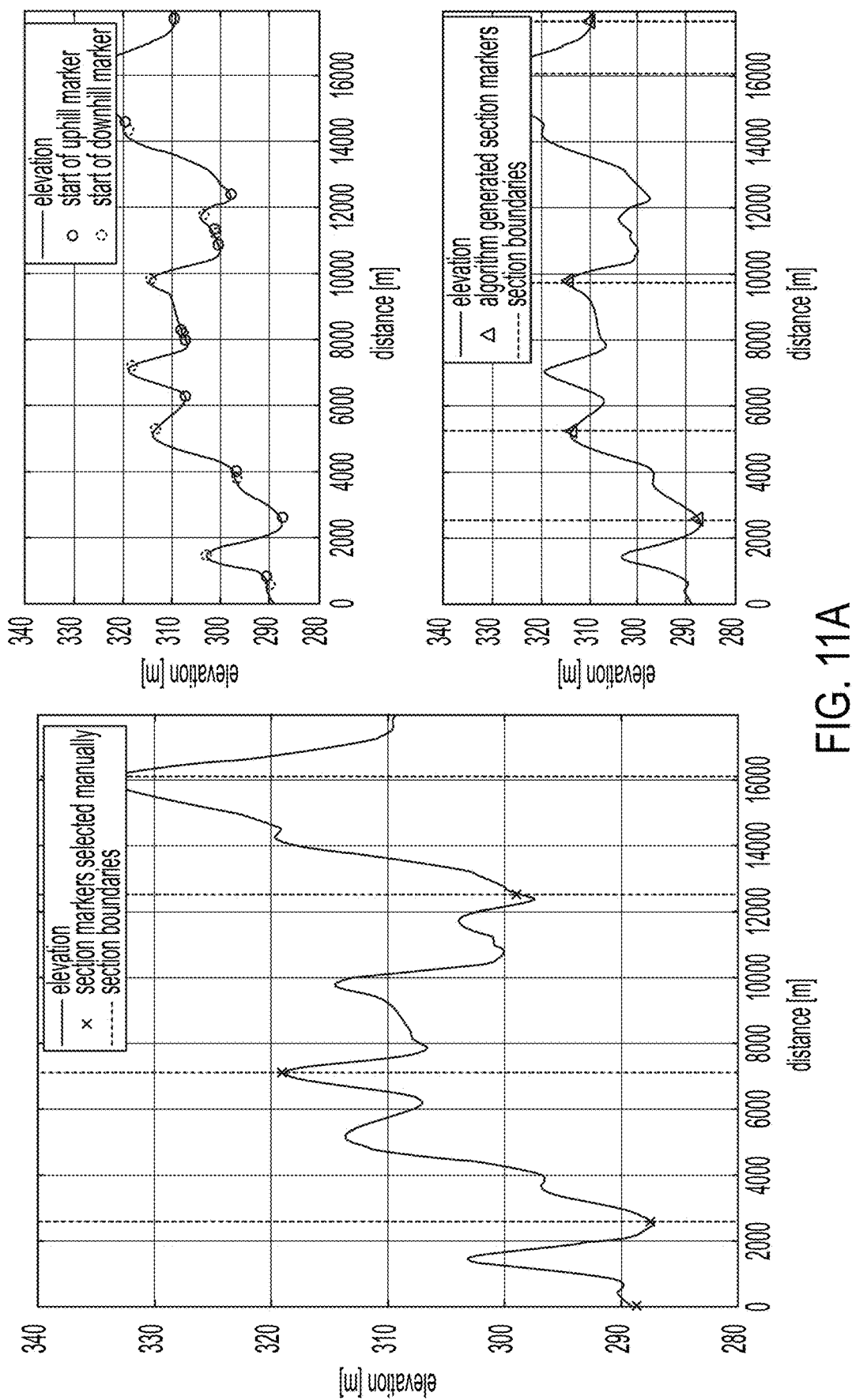
FIGS. 11A-11B generally illustrate route segmented according to the principles of the present disclosure.

FIG. 11A shows the sectioning technique illustrated on the sample of the road profile covering the distance of approximately 18 km. The graph on the left is identical to FIG. 9A, and the upper graph at the right is identical to FIG. 10A, both assembled for convenience to compare to the results of an "automated pattern recognition technique," the results of which are illustrated at the right bottom.

Figure 11B:
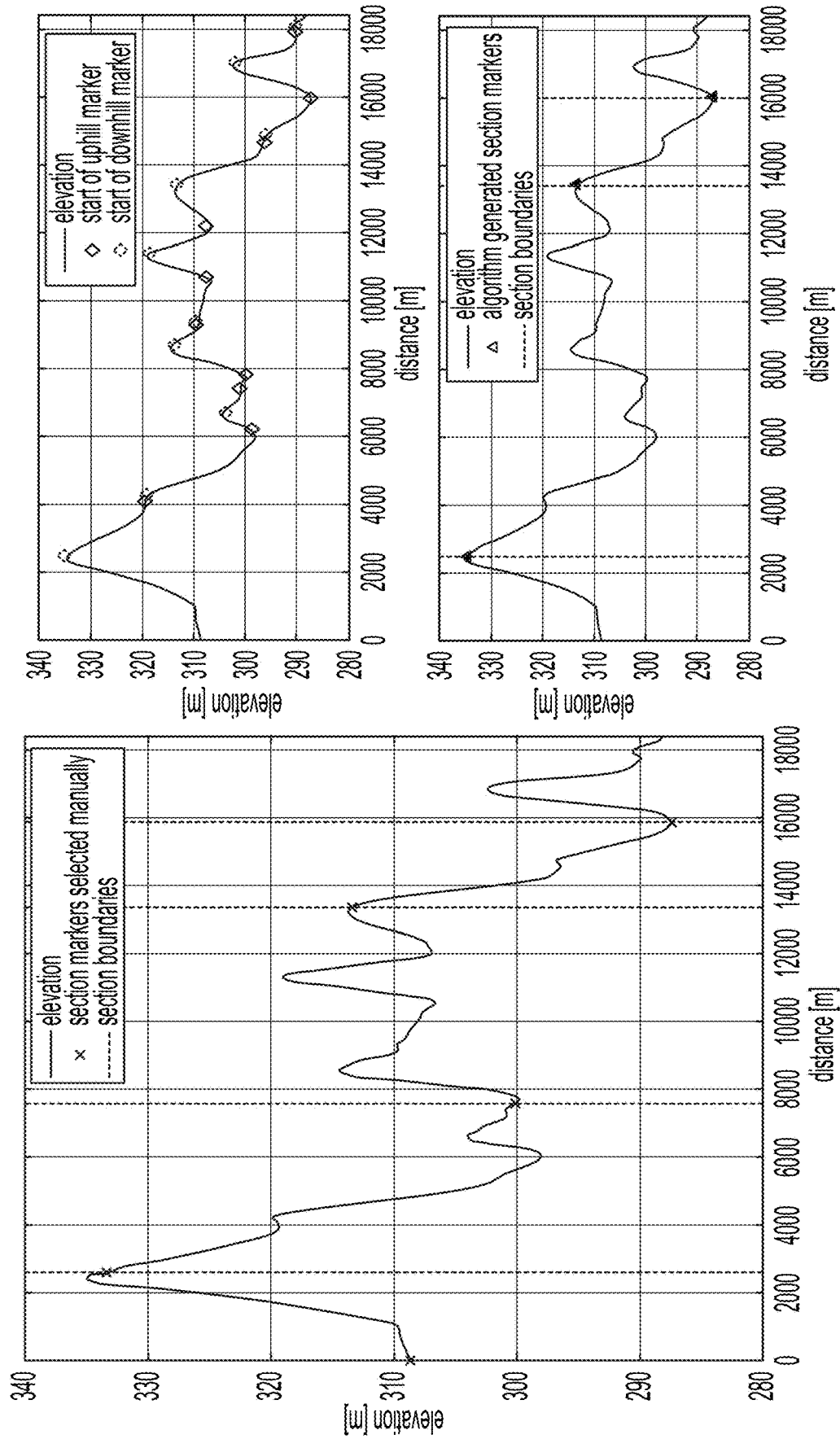

FIG. 11B shows the sectioning technique illustrated on the sample of the road profile covering distance of approx. 18 km. The graph on the left is identical to FIG. 9B, and the upper graph at the right is identical to FIG. 10B, both assembled for convenience to compare to the results of an "automated pattern recognition technique," the results of which are illustrated at the right bottom.

Figure 12:
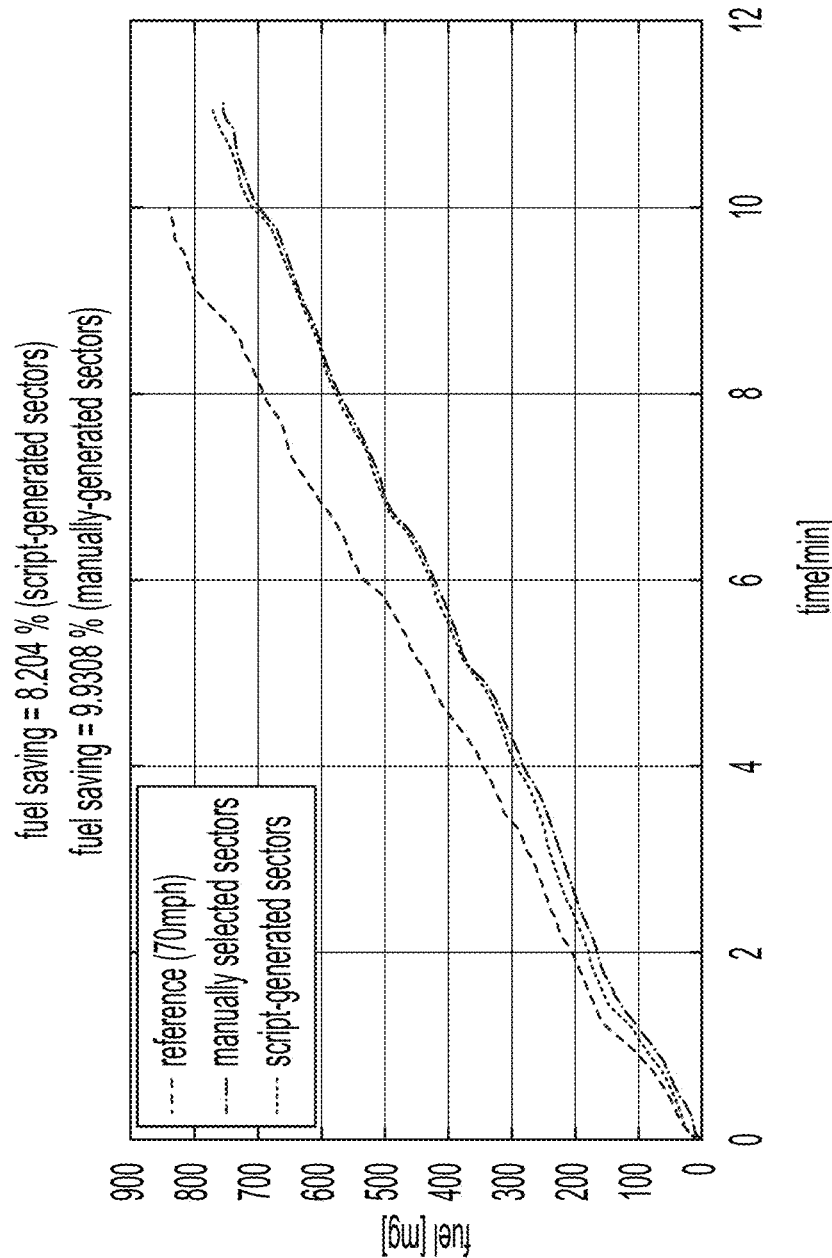
FIG. 12 generally illustrates a comparison of fuel economies according to the principles of the present disclosure.

Despite some discrepancies in selection of constant cruising sectors, both algorithms, when validated in practice, delivered surprisingly almost identical results. FIG. 12 illustrates cumulative fuel consumption on the road section B represented in FIG. 11B is given below together with the result representing reference drive with the speed limit 70 mph, with the reference being the upper line, the script-generated sectors being the middle line, and the manually selected sectors being the lower line.

In some embodiments, the system 100 may be configured to receive vehicle position data. For example, the PAC may receive the vehicle position data may from GPS 126. In some embodiments, the PAC 124 may receive the vehicle position data from the remote computing device 132.

The system 100 may be configured to receive planned route data. In some embodiments, the planned route data may be received from navigational software. For example, the PAC 124 may receive the planned route data from the remote computing device 132, on which a planned route has been generated.

The system 100 may be configured to determine a projected route. In some embodiments, determining the projected route may be based at least in part on the planned route data. For example, determining the projected route may be as simple as receiving the planned route. In some embodiments, determining the projected route may be based at least in part on the vehicle position data. For example, if the vehicle 10 is on a highway with little of interest for at least 30 kilometers, the PAC may determine that the projected route is continuing on the highway for 30 kilometers. In some embodiments, determining the projected route may be based at least in part on historical analysis of user travel. For example, if a user has driven the same route at the same time of day on many occasions, the projected route may be determined based on the assumption that the user is taking the same route.

The system 100 may be configured to receive route characteristic data including at least route elevation data. For example, the PAC 124 may receive the route characteristic data from a storage device. In some embodiments, the route elevation data may include the elevation at multiple points along the projected route. In some embodiments, the route characteristic data may further include road curvature data. In some embodiments, the route characteristic data may further include signage data. Examples of road curvature data may include one or more of curvature of the road along the length of the road and curvature of the road across the road (i.e., the extent to which the road is crowned or sloped). In some embodiments, the route characteristic data may further include road surface condition data. Examples of road surface condition data may include coefficients of friction, road rolling resistance contribution, existence of known potholes, and recent icy conditions. In some embodiments, the route characteristic data further includes weather data. Examples of weather data may include whether it rained recently, whether it snowed recently, and whether fog is impeding visual identification of other vehicles. In some embodiments, the route characteristic data further includes speed limit data. In some embodiments, the route characteristic data further includes traffic data.

The system 100 may be configured to receive vehicle characteristic data. For example, the PAC 124 may receive vehicle characteristic data from the remote computing device 132 or a storage device. In some embodiments, the vehicle characteristic data may include vehicle aerodynamics. In some embodiments, the vehicle characteristic data may include vehicle mass. In some embodiments, the vehicle characteristic data may include vehicle fuel consumption profiles. In some embodiments, the vehicle fuel consumption profiles may be based on Environmental Protection Agency (EPA) fuel economy test. In some embodiments, the vehicle fuel consumption profiles may be based off of a historical analysis of past vehicle fuel consumption.

The system 100 may be configured to determine a sampling resolution. For example, the PAC 124 may determine the sampling resolution based on a value received from a storage device. In some embodiments, determining the sampling resolution may be based at least in part on the vehicle characteristic data.

The system 100 may be configured to sample the route elevation data at the sampling resolution to generate sampled route elevation data. For example, the PAC 124 may sample the route elevation data every 100 m to produce the sampled route elevation data.

The system 100 may be configured to receive a fuel savings target. For example, the operator of the vehicle may enter a desired fuel savings target (e.g., 5%, 10%, etc.) via the HMI controls 104, which the PAC 124 subsequently receives. In some embodiments, determining the fuel savings target may include retrieving a value (e.g., 100 m) from a storage device.

The system 100 may be configured to determine a start of uphill delay. In some embodiments, determining the start of uphill delay may be based at least in part on the vehicle characteristic data. In some embodiments, determining the start of uphill delay may include retrieving a value (e.g., 100 m) from a storage device.

The system 100 may be configured to determine a start of downhill delay. In some embodiments, determining the start of uphill delay may be based at least in part on the vehicle characteristic data. In some embodiments, the PAC 124 may determine the start of downhill delay by retrieving a value (e.g., 100 m) from a storage device.

The system 100 may be configured to determine at least one start of uphill position and at least one start of downhill position based at least in part on the sampled route elevation data. In some embodiments, the at least one start of uphill position may be two start of uphill positions, three start of uphill positions, four start of uphill positions, five start of uphill positions, or more. In some embodiments, the at least one start of downhill position may be two start of downhill positions, three start of downhill positions, four start of downhill positions, five start of downhill positions, or more. For example, the PAC 124 may determine the at least one start of uphill position and the at least one start of downhill position by analyzing the sampled route elevation data and comparing elevations of different points to determine local crests and valleys. In some embodiments, determining the at least one start of uphill position and the at least one start of downhill position is performed through automated pattern recognition. In some embodiments, the at least one start of start of uphill position may be adjusted forward along the projected route by a distance equal to the start of uphill delay (e.g., 100 m). In some embodiments, the at least one start of start of uphill positions may be adjusted forward along the projected route by a distance equal to the start of uphill delay (e.g., 100 m).

The system 100 may be configured to determine a minimum speed change distance. In some embodiments, determining the start of uphill delay may be based at least in part on the vehicle characteristic data. In some embodiments, determining the start of uphill delay may include the PAC 124 receiving a value (e.g., 1000 m) from a storage device. In some embodiments, the minimum speed change distance may be based on vehicle characteristic data.

The system 100 may be configured to determine at least one cruise speed route segment based at least in part on the at least one start of uphill position and the at least one start of downhill position. In some embodiments, the at least one cruise speed route segment may be two cruise speed route segments, three cruise speed route segments, four cruise speed route segments, five cruise speed route segments, or more. For example, the PAC 124 may determine the at least one cruise speed route segment by starting at one start of downhill position and ending at one start of uphill position. In some embodiments, determining the at least one cruise speed route segment may be further based on the minimum speed change distance. For example, the at least one cruise speed route segment may be limited to be at least 1000 m. Requiring the at least one cruise speed route segment to the minimum speed change distance may increase the likelihood of operator compliance and reduce fuel costs by avoiding regular acceleration.

The system 100 may be configured to determine a corresponding cruising speed for the at least one cruise speed route segment based at least in part on one or more of the route elevation data and the sampled route elevation data. In embodiments where there are more than one cruise speed route segments, more corresponding cruising speeds may be determined. For example, the PAC 124 may determine that, for a generally downhill cruise speed route segment, the corresponding cruising speed is 65 miles per hour, while for a generally uphill cruise speed route segment, the corresponding cruising speed is 60 miles per hour. In some embodiments, determining the corresponding cruising speed for the at least one cruise speed route segment may be further based on the vehicle characteristic data. In some embodiments, determining the corresponding cruising speed for the at least one cruise speed route segment may be further based on the fuel savings target. For example, with a fuel savings target of 5%, the corresponding cruising speed for an exemplary cruise speed route segment may be 65 miles per hour, while with a fuel savings target of 10%, the corresponding cruising speed for the exemplary cruise speed route segment may be 60 miles per hour. In some embodiments, determining the corresponding cruising speed for the at least one cruise speed route segment may be further based on the road curvature data. For example, if there is a curve in a cruise speed route segment that would be unsafe to navigate at 70 miles per hour but safe to navigate at 65 miles per hour, and the corresponding cruising speed would otherwise be 70 miles per hour, the corresponding cruising speed could be set to 65 miles per hour. In some embodiments, determining the corresponding cruising speed for the at least one cruise speed route segment is further based on the road surface condition data. For example, if there is a set of potholes in a cruise speed route segment that would be unsafe to navigate at 70 miles per hour but safe to navigate at 60 miles per hour, and the corresponding cruising speed would otherwise be 70 miles per hour, the corresponding cruising speed could be set to 60 miles per hour. In some embodiments, determining the corresponding cruising speed for the at least one cruise speed route segment may be further based on the weather data. For example, if there is fog that limits visibility and the cruise speed route segment would be unsafe to navigate at 70 miles per hour but safe to navigate at 55 miles per hour, and the corresponding cruising speed would otherwise be 70 miles per hour, the corresponding cruising speed could be set to 55 miles per hour. In some embodiments, determining the corresponding cruising speed for the at least one cruise speed route segment may be further based on the speed limit data. For example, if the speed limit is 55 miles per hour and the corresponding cruising speed would otherwise be 65 miles per hour, the corresponding cruising speed could be set to 55 miles per hour. In some embodiments, determining the corresponding cruising speed for the at least one cruise speed route segment may be further based on the traffic data. For example, if traffic is moving at 65 miles per hour and the corresponding cruising speed would otherwise be 70 miles per hour, the corresponding cruising speed could be set to 65 miles per hour.

The system 100 may be configured to communicate the corresponding cruising speed for the at least one cruise speed route segment. For example, in embodiments where the system 100 includes an audio variety of the additional output device 134, the PAC 124 may send a signal to cause an audio variety of the additional output device 134 to produce an audible signal suggesting that the operator change the cruise control to the corresponding cruising speed (e.g., an audible "coast at 67 miles per hour"). In embodiments where the system includes the display 122, the PAC 124 may send a signal to cause the display to present a visual indicator (e.g., a written message such as "coast at 67 miles per hour").

A challenge for presenting recommendations to an operator is to do so in a manner that is intuitive and presents a minimal amount of distraction. Thus, an exemplary intelligent driving application (application) may be designed to provide recommendations in an intuitive manner while minimizing distractions and function on a vehicle or in a stand-alone environment (i.e. on a smart-device, such as a smartphone or smart tablet). The application utilizes the device's computing resources, onboard localization, and wireless communication hardware to fulfill an fuel economy optimizing task.

Figure 14:
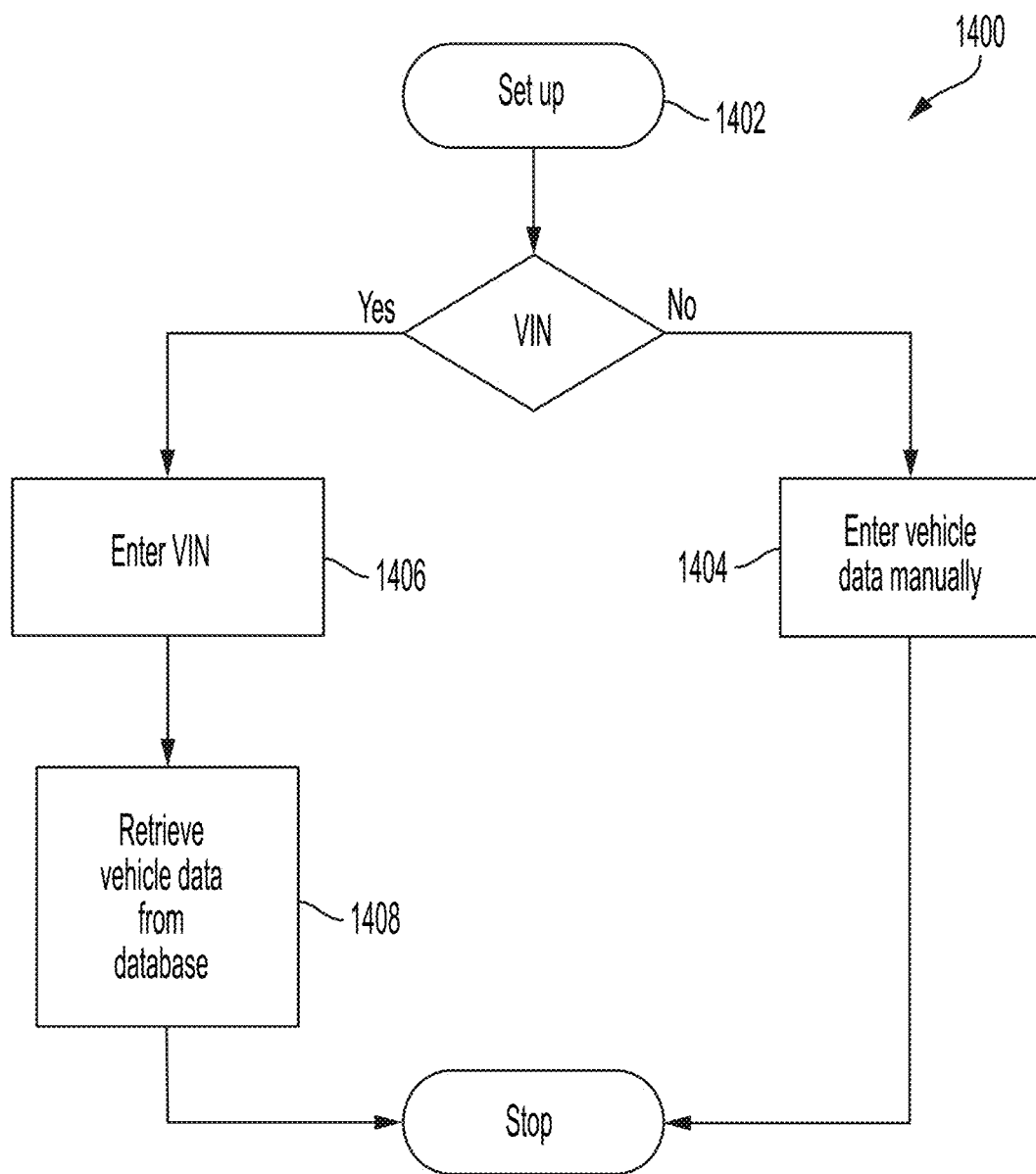
FIG. 14 generally illustrates methods for providing recommendations to the operator according to the principles of the present disclosure.

A method 1400 for using the application (at 1402), is illustrated in FIG. 14, in which a user may introduce vehicle characteristics of their vehicle (mass, drag coefficients, engine and gearbox parameters, etc.) either manually (at 1404) or by entering the vehicle's VIN number (at 1406), which the device may use to download detailed vehicle characteristics from a public or proprietary database using a cellular or WI-FI connection (at 1408). Vehicle characteristics may include (but are not limited to): empty mass, drag coefficients, EPA standardized fuel consumption, gearbox ratios.

Figure 15:
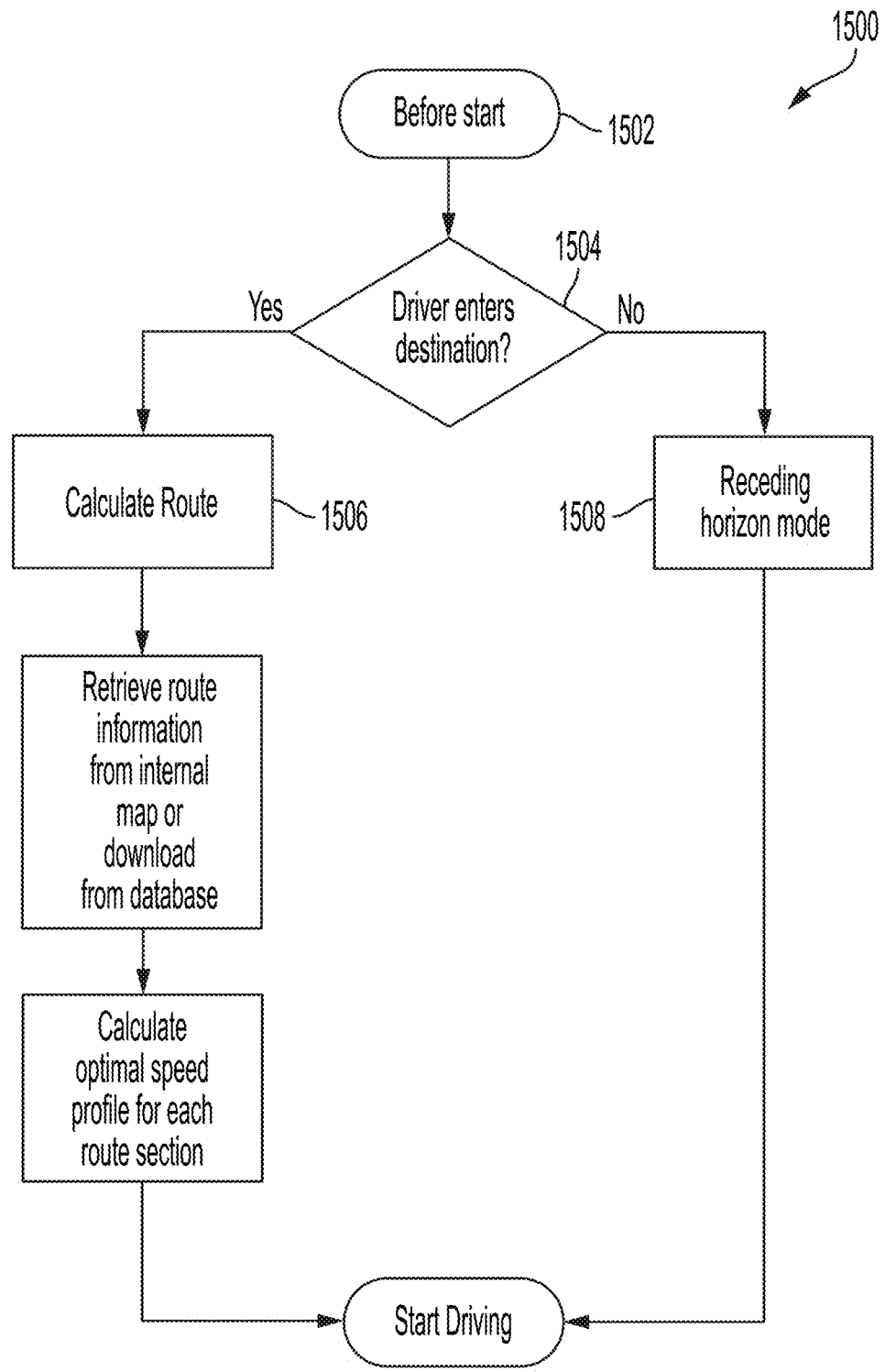
FIG. 15 generally illustrates a method for providing recommendations to the operator according to the principles of the present disclosure.

As illustrated in FIG. 15, a further method 1500 for using the application is presented (at 1502), in which the operator may or may not enter their destination (at 1504). In cases where a destination is entered, the application may determine a corresponding route, depending on available traffic and/or road profile information (at 1506). In case no destination is entered, the application may compute recommendations on the most probable short-term path the vehicle is likely to take (receding horizon) (at 1508). The application may receive information pertaining to the surrounding road characteristics, for example through a resident map and/or by real-time downloading map and traffic information as desired. Road characteristics may include (but are not limited to): speed limits, signalization (stop signs, traffic lights, etc.), road slope (grade), curvature radius, etc.

Real-time traffic light information, if available through cellular network in the future, can augment the optimization by modulating the recommended speed in order to achieve a "green wave" effect (i.e., to avoid having to brake and accelerate for traffic lights, instead timing them such that the vehicle 10 goes through traffic lights without needing to decelerate).

The application may be aware of the vehicle position, speed, and direction in real-time through its on-board GNSS equipment (e.g., GPS; as used herein, GPS is inclusive of any GNSS equipment), potentially augmented by sensor data from embedded accelerometers and/or gyroscopes and/or compasses. The position may also be corrected by using map information (i.e., map-matching). In case the GNSS signal is lost or intermittent, the application may extrapolate the information until absolute position is returned.

The application may also communicate with the vehicle via an optional OBD-adapter, to retrieve vehicle real-time information like speed, load, temperatures, battery state of change, and injected fuel quantities to augment the optimization parameters.

The application may also have self-learning algorithms to adjust preloaded parameters, such as actual current vehicle mass, actual road load coefficients, and actual fuel consumption.

If the destination is known, the application may pre-calculate the corresponding speed along the route and retrieve and display the recommendations based on the current position and speed of the vehicle on the route. These recommendations may be scaled and formatted according to human-machine interface principles described within the application.

This technique may allow for improved optimization, especially if the vehicle has a hybrid or electric powertrain, as advance knowledge of energy recuperation potential can assist with optimizing battery state-of-charge over the complete route.

If a destination is unknown, the application may calculate the optimum speed over a certain look-ahead distance by identifying the most probable path. The application may also calculate an optimum speed to a following intersection.

The application may also collect multiple geolocation parameters and upload them into cloud storage via cellular or WI-FI connection for future use and/or statistical purposes.

The collected parameters could, for example, be used to build operator profiles, fuel consumption maps, speed profiles, etc. through data analytics methods.

The collected and processed information could also be accessed by the application to further optimize the recommendations, for example for consumption based route selection criteria, real-world speed profile knowledge, etc.

Figure 16:
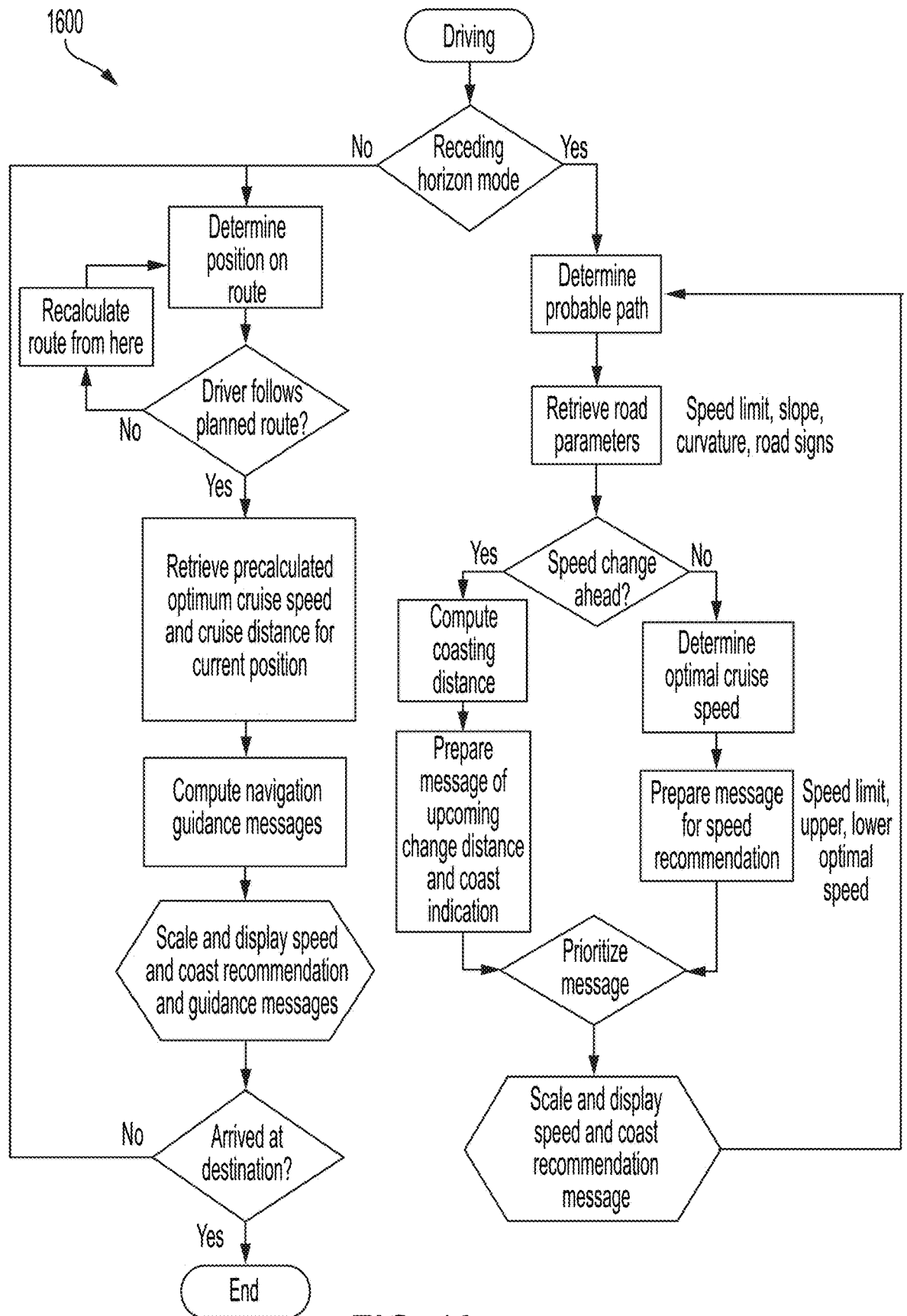
FIG. 16 generally illustrates a method for providing recommendations to the operator according to the principles of the present disclosure.

An example of a method 1600 for using the application is illustrated in FIG. 16.

It may be desirable that a system provide a visual driving speed follow several principles. It may be desirable that the system not require active user input during driving.

It may be desirable that all basic configuration be done before driving and limited to the minimum (e.g. vehicle selection in case several vehicles are used). If the application can receive advance knowledge of the operator's intended route, inputting the destination before starting the trip is recommended (i.e., as done in common navigation apps).

It may be desirable that the system provide driving recommendations that are "safe" (i.e., safe to follow) and avoid giving instructions that the operator may subconsciously follow and that may lead to a dangerous situation (e.g., "accelerate" or "break"). Other instructions like "coast now" or "slow down" recommend reducing the vehicle's speed in a soft manner and are thus less likely to cause unsafe situations.

It may be desirable that the driving recommendations be unambiguous. The instruction should clearly indicate what the operator should do (e.g. coast, maintain the speed, etc.) without need for interpretation. This is especially true for speed recommendations where it may be desirable that the user is always aware if they are in the recommended speed range.

It may be desirable that the system avoid presenting textual information. To be intuitive, it may be desirable that the visual interface not include written text except as necessary: e.g. current speed limit.

It may be desirable that the system prioritize relevant information such that the most relevant information takes precedence over lower priority indications (e.g. "speed limit exceeded" has priority over a recommended cruise speed indication).

It may be desirable that the system include tolerance and smoothness in its function. It may be desirable that, except for binary indications (e.g. coast), the visual display should show a tolerance band that may be updated smoothly (without discontinuities) to allow the operator to follow the recommendation.

The system may communicate with the user (operator) through one or more channels, including a visual display and an acoustic output. The visual display may be based on a mobile device's screen. The mobile device may be placed on a mount that places it preferably in the operator's field of vision without obstructing view of traffic. It may be desirable that the mobile device be in the operator's near peripheral vision.

In some embodiments, color coding may reflect standard traffic light schemes (green-yellow-red) for clear message interpretation. Additional colors may indicate special recommendations. For binary events and immediate warnings, an acoustic message may be more appropriate to capture the user's attention and minimize visual distraction. Generally, the acoustic signal may also be coupled to a visual clue. The acoustic message can either be an appropriate and intuitive sound (e.g. bell sound for speed warning) or a synthetic voice message in the user's preferred language. It may be desirable that the application relay messages through the vehicles hands-free system to improve readability. Acoustic messages may be limited to the minimum to avoid distraction and annoyance and may be configurable to be disabled.

FIGS. 17A-17H show various configurations of a display zone 1700 presented on a display for providing a visual driving speed recommendation to an operator of a vehicle. A first indicator 1702 indicates a current speed and is located centrally within the display zone. An example of the first indicator 1702 is a vertical blue line. A first pattern 1704 indicates a corresponding energy efficient speed. In the context of this disclosure, a speed may include a speed range. As discussed within this disclosure, a pattern may be a solid color. An example of the first pattern 1704 is solid green. Other patterns may be non-color patterns, which can provide utility to operators who are colorblind. For example, the patterns could be stripes, X's, O's, +'s, etc. A second pattern 1706 indicates a higher corresponding less energy efficient speed. An example of the second pattern 1706 is solid yellow. A first pattern range 1708 is located between the first pattern 1704 and the second pattern 1706 and indicates a transition range between the corresponding energy efficient speed and the higher corresponding less energy efficient speed. An example of the first pattern range 1708 would be a range that smoothly transitions from green to yellow with no substantial discontinuities. For the purposes of this disclosure, indicators, such as the first indicator, are not considered to be discontinuities in the smooth transition. An example of a pattern range involving symbols would be a pattern where O's "fade into" X's or where O's grow smaller and X's grow larger between two zones of pure O's and pure X's. A third pattern 1709 indicates an impractically low speed. An example of the third pattern 1709 is solid black. A second pattern range 1710 indicates a transition range between the impractically low speed and the corresponding energy efficient speed. An example of the second pattern range 1710 would be a range that smoothly transitions from black to green with no substantial discontinuities. A second indicator 1712 indicates an upper speed limit. An example of the second indicator 1712 is a vertical red line. A third indicator (not shown) may indicate a lower speed limit (i.e., on many interstate highways, 45 miles per hour is the lower speed limit). The lower speed limit may be a vertical line. A fourth pattern 1714 indicates an overspeed tolerance speed (i.e., a speed higher than the speed limit that functions as an upper bound for speed). An example of the fourth pattern 1714 is solid red. A third pattern range 1716 indicates a transition range between the higher corresponding less energy efficient speed and the overspeed tolerance speed. An example of the third pattern range 1716 would be a range that smoothly transitions from yellow to red with no substantial discontinuities. In some embodiments, a fifth pattern 1718 indicates a coasting speed, in which a vehicle will coast at about the same speed without gaining or losing speed. An example of the fifth pattern 1718 would be solid white. In some embodiments, a sixth 1720 pattern indicates a sub-coast speed (i.e., a speed in which the operator would be accelerating due to gravity or actively braking to maintain that speed). An example of the sixth pattern would be solid blue. A fourth pattern range 1722 indicates a transition range between the sub-coast speed and the coasting speed. An example of the third pattern range 1716 would be a range that smoothly transitions from blue to white with no substantial discontinuities.

Figure 17A:
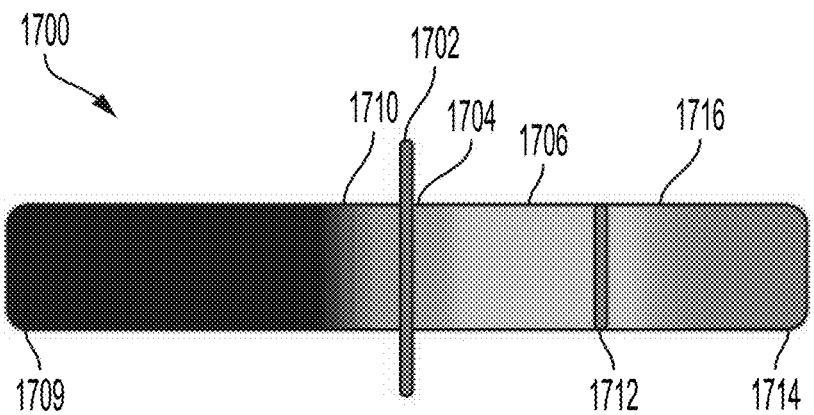
FIGS. 17A-H generally illustrate various configurations of a display zone according to the principles of the present disclosure.

FIG. 17A illustrates the display zone 1700 in a configuration where the first indicator 1702 corresponding to the current speed lies within the first pattern 1704 corresponding to the corresponding energy efficient speed. The operator of the vehicle can observe that they are in the desired speed range.

Figure 17B:
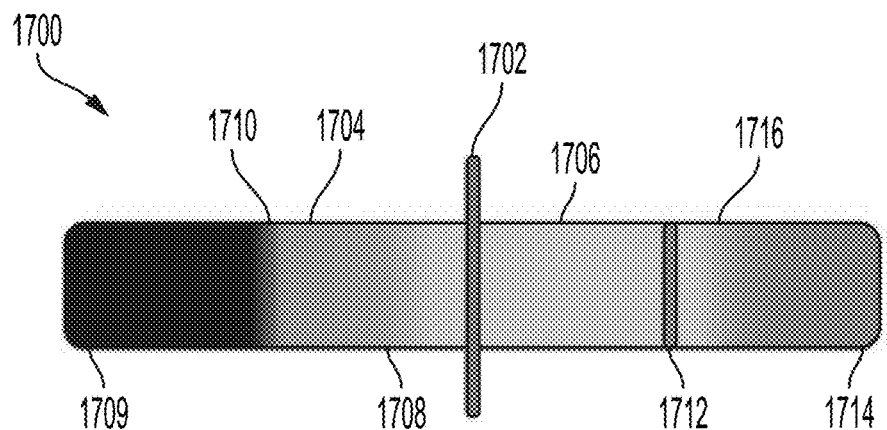

FIG. 17B illustrates the display zone 1700 in a configuration where the first indicator 1702 corresponding to the current speed lies within the second pattern 1706 corresponding to the higher corresponding less energy efficient speed. The operator of the vehicle can observe that their speed is higher than the desired speed range.

Figure 17C:
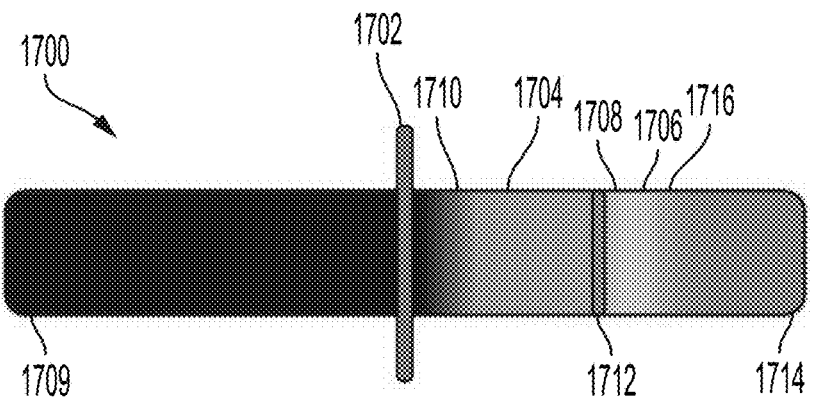

FIG. 17C illustrates the display zone 1700 in a configuration where the first indicator 1702 corresponding to the current speed lies within the third pattern 1709 corresponding to an impractically low speed. The operator of the vehicle can observe that their speed is lower than the desired speed range.

Figure 17D:
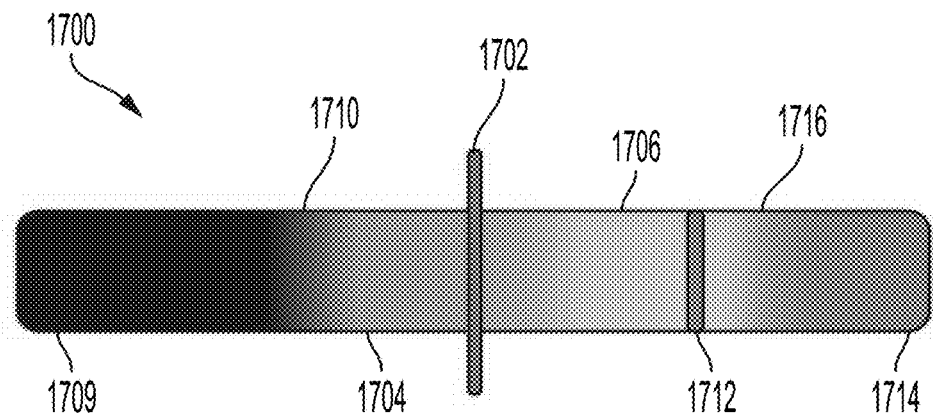

FIG. 17D illustrates the display zone 1700 in a configuration where the vehicle is traveling on flat ground. The first indicator 1702 corresponding to the current speed lies within the first pattern 1704 corresponding to the corresponding energy efficient speed, and the operator of the vehicle can observe that they are in the desired speed range.

Figure 17E:
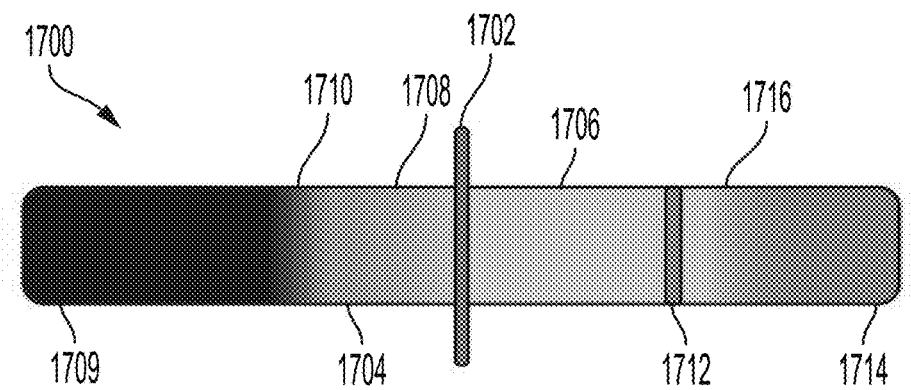

FIG. 17E illustrates the display zone 1700 in a configuration where the vehicle is traveling uphill. The first pattern 1704, second pattern 1706, and third pattern 1709 have shifted to the left in response to the vehicle traveling uphill. The first indicator 1702 corresponding to the current speed lies within the second pattern 1706 corresponding to the higher corresponding less energy efficient speed, and the operator of the vehicle can observe that their speed is higher than the desired speed range.

Figure 17F:
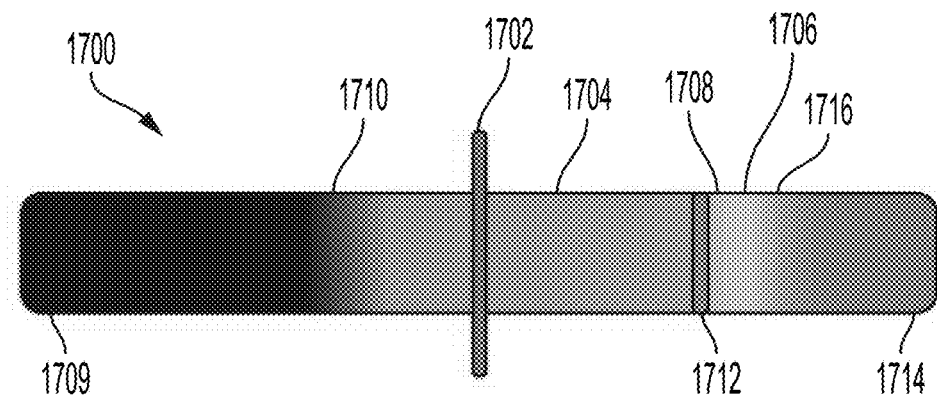

FIG. 17F illustrates the display zone 1700 in a configuration where the vehicle is traveling downhill. The first pattern 1704, second pattern 1706, and third pattern 1709 have shifted to the right in response to the vehicle traveling downhill. The first indicator 1702 corresponding to the current speed lies within the third pattern 1709 corresponding to an impractically low speed, and the operator of the vehicle can observe that their speed is lower than the desired speed range.

Figure 17G:
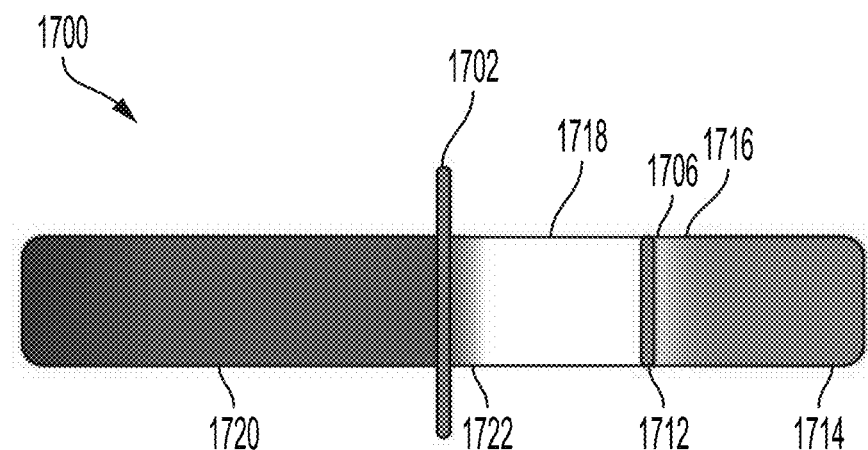

FIG. 17G illustrates the display zone 1700 in a configuration where the vehicle is coasting downhill, such that there is no corresponding energy efficient speed to adjust the vehicle to, as any increase would require fuel that is not necessary and potentially push the vehicle over the speed limit.

Figure 17H:
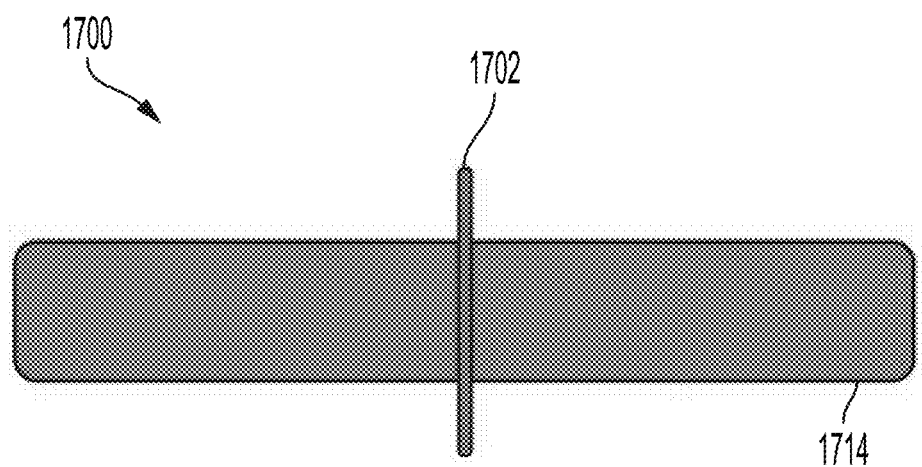

FIG. 17H illustrates the display zone 1700 in a configuration where the current speed of the vehicle has met or exceeded the overspeed tolerance speed, and the display zone 1700 has changed to match the fourth pattern 1714. The operator of the vehicle can easily observe that they are speeding.

The system 100 may be configured to determining a current speed. In some embodiments, the PAC 124 may receive the current speed from the vehicle sensors 108. In some embodiments, the PAC 124 may calculate the current speed based on the vehicle position data obtained by the GPS 126.

The system 100 may be configured to determine a corresponding energy efficient speed. In some embodiments, the corresponding energy efficient speed may be based at least in part on vehicle characteristics data (e.g., vehicle mass, fuel consumption profiles, etc.) In some embodiments, the corresponding energy efficient speed may be based at least in part on route characteristic data (elevation, road curvature, road surface information, weather, speed limit, etc.). For example, the PAC 124 may receive vehicle characteristic data and route characteristic data and determine the corresponding energy efficient speed.

The system 100 may be configured to determine a higher corresponding less energy efficient speed. In some embodiments, the higher corresponding less energy efficient speed is determined based on the speed limit. For example, the PAC 124 may receive speed limit information from the remote computing device 132 and determine that the higher corresponding less energy efficient speed is equal to the speed limit.

The system 100 may be configured to determine a first transition range between the corresponding energy efficient speed and the higher corresponding less energy efficient speed. The PAC 124 may determine this by comparing the corresponding energy efficient speed and the higher corresponding less energy efficient speed.

The system 100 may be configured to display, on a display, a display zone. For example, the PAC 124 may transmit a signal to the display 122 to cause the display 122 to show the display zone and its contents. In some embodiments, the display zone may include a first indicator corresponding to the current speed. In some embodiments, the first indicator is a vertical line. In some embodiments, the first indicator is at a fixed position within the display zone. In some embodiments, the fixed position is located centrally within the display zone. In some embodiments, the first indicator may be an arrow. In some embodiments, the display zone may include a first pattern corresponding to the corresponding energy efficient speed. In some embodiments, the first pattern is green. In some embodiments, the display zone may include a second pattern different from the first pattern and corresponding to the higher corresponding less energy efficient speed. In some embodiments, the second pattern is yellow. In some embodiments. In some embodiments, the display zone may include a first pattern range therebetween corresponding to the first transition range. In some embodiments, patterns of the first pattern range are in a range between the first pattern and the second pattern and the first pattern range provides no substantial discontinuities between the first pattern and the second pattern.

The system 100 may be configured to determine an impractically low speed range. In some embodiments, the PAC 124 may determine the impractically low speed range based on speed limit information (e.g., a given percentage of the speed limit or flat speed value below the speed limit).

The system 100 may be configured to determine a second transition range between the impractically low speed and the corresponding energy efficient speed. The PAC 124 may determine the second transition range by comparing the impractically low speed and the corresponding energy efficient speed.

The system 100 may be configured to present, in the display zone, a third pattern different from the first pattern and corresponding to the impractically low speed. In some embodiments, the third pattern is black. For example, the PAC 124 may send a signal to the display 122 to display the third pattern.

The system 100 may be configured to present, in the display zone a second pattern range disposed between the third pattern and the first pattern and corresponding to the second transition range. For example, the PAC 124 may send a signal to the display 122 to cause the display 122 to display the second pattern range. In some embodiments, patterns of the second pattern range are in a range between the first pattern and the third pattern and the first pattern range provides no substantial discontinuities between the first pattern and the third pattern.

The system 100 may be configured to determine an upper speed limit. For example, the PAC 124 may determine the upper speed limit. In some embodiments, the upper speed limit may be based on speed limit information (i.e., the speed limit for that part of the route is the upper speed limit).

The system 100 may be configured to present, in the display zone, a second indicator corresponding to the upper speed limit. For example, the PAC 124 may send a signal to display 122 to display the second indicator. In some embodiments, the second indicator is a vertical line.

The system 100 may be configured to determine a lower speed limit. For example, the PAC 124 may determine the lower speed limit. In some embodiments, the lower speed limit may be based on speed limit information. For example, many highways in the United States have a minimum speed limit of 45 miles per hour.

The system 100 may be configured to present, in the display zone, a third indicator corresponding to the lower speed limit. For example, the PAC 124 may send a signal to the display 122 to display the third indicator. In some embodiments, the third indicator is a vertical line.

The system 100 may be configured to determine an overspeed tolerance speed. For example, the PAC 124 may determine the overspeed tolerance speed by multiplying the speed limit or the upper speed limit by a factor (e.g., multiplying the speed limit by 1.1) or adding a set value to the speed limit (e.g., 5 miles per hour).

The system 100 may be configured to determine a third transition range between the overspeed tolerance speed and the higher corresponding less energy efficient speed. For example, the PAC 124 may determine the third transition range by comparing the overspeed tolerance speed and the higher corresponding less energy efficient speed.

The system 100 may be configured to present, in the display zone, a fourth pattern different from the second pattern and corresponding to the overspeed tolerance speed. For example, the PAC 124 may send a signal to the display 122 to display the fourth pattern. In some embodiments, the fourth pattern is red.

The system 100 may be configured to present, in the display zone, a third pattern range disposed between the second pattern and the fourth pattern and corresponding to the third transition range. For example, the PAC 124 may send a signal to the display 122 to display the third pattern range. In some embodiments, the patterns of the third pattern range are in a range between the second pattern and the fourth pattern, and the third pattern range provides no substantial discontinuities between the second pattern and the fourth pattern.

Figure 3:
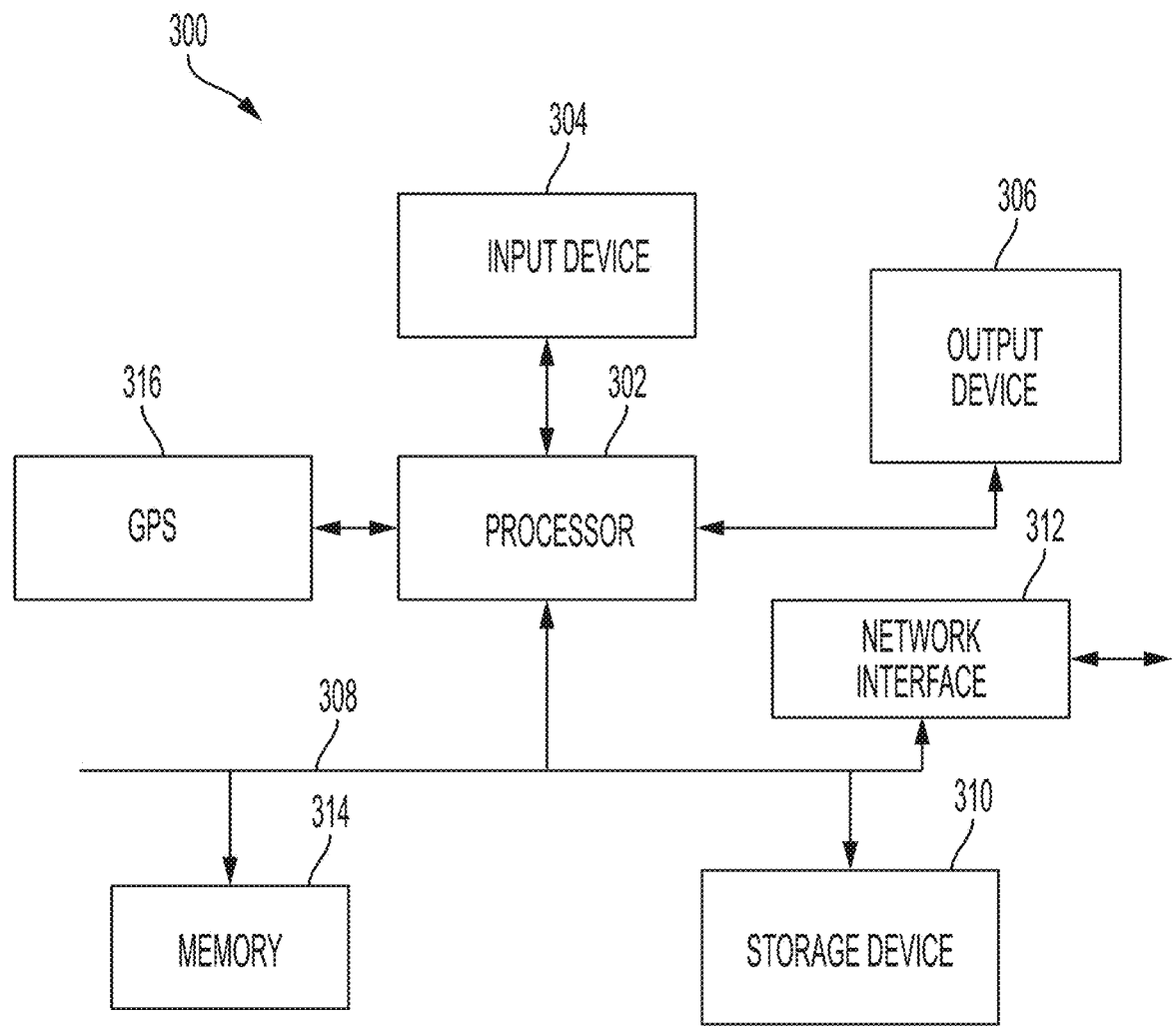
FIG. 3 generally illustrates a block diagram of a computing device according to the principles of the present disclosure.

FIG. 3 generally illustrates a computing device 300 according to the principles of the present disclosure. The computing device 300 may be configured to perform various operations and methods. The computing device 300 may include a processor 302 configured to control the overall operation of computing device 300 and a memory 314 containing instructions that, when executed by the processor 302, cause the processor to perform a variety of operations. It should be understood that the processor 302 (e.g., and/or any processors described herein) may include any suitable processor, including those described herein. The memory 314 may include Random Access Memory (RAM), a Read-Only Memory (ROM), or a combination thereof. In some embodiments, either or both of a storage device 310 and the memory 314 may include flash memory, semiconductor (solid state) memory or the like. Either or both of the storage device 310 and the memory 314 may include Random Access Memory (RAM), a Read-Only Memory (ROM), or a combination thereof. The memory 314 may store programs, utilities, or processes to be executed in by the processor 302. The memory 314 may provide volatile data storage, and stores instructions related to the operation of the computing device.

The computing device 300 may also include a user input device 304 that may be configured to receive input from a user of the computing device 300 and to communicate signals representing the input received from the user to the processor 302. For example, the user input device 304 may include a button, keypad, dial, touch screen, audio input interface, visual/image capture input interface, input in the form of sensor data, etc.

The computing device 300 may include an output device 306 (e.g., a display screen, speaker, or any other suitable output device) that may be controlled by the processor 302 to present information to the user. A data bus 308 may be configured to facilitate data transfer between at least a storage device 310 and the processor 302. The computing device 300 may also include a network interface 312 configured to couple or connect the computing device 300 to various other computing devices or network devices via a network connection, such as a wired or wireless connection. In some embodiments, the network interface 312 includes a wireless transceiver.

The storage device 310 may include a single disk or a plurality of disks (e.g., hard drives), one or more solid-state drives, one or more hybrid hard drives, and the like. The storage device 310 may include a storage management module that manages one or more partitions within the storage device 310.

In some embodiments, the computing device 300 may be in the vehicle 10. In some embodiments, the computing device 300 may be proximate to the vehicle 10. In some embodiments, the computing device 300 may be remote from the vehicle 10. In some embodiments, the computing device 300 may be in the vehicle. In some embodiments, instructions are stored on memory 314, that, when executed by the processor 302, cause the processor to perform the steps of the methods described herein.

In some embodiments, the computing device 300 may include additional, fewer, or other components, than those described with respect to and illustrated in FIG. 3. In some embodiments, the computing device 300 may perform more or fewer functions than those described above.

In some embodiments the computing device 300 may be configured to receive vehicle position data. For example, the processor 302 may receive the vehicle position data from GPS 316. For example, the vehicle position data may be received by the PAC from via the network interface 312.

The computing device 300 may be configured to receive vehicle characteristic data. For example, the processor 302 may retrieve vehicle characteristic data from the storage device 310. In some embodiments, the vehicle characteristic data may include vehicle aerodynamics. In some embodiments, the vehicle characteristic data may include vehicle mass. In some embodiments, the vehicle characteristic data may include vehicle fuel consumption profiles. In some embodiments, the vehicle fuel consumption profiles may be based on one or more Environmental Protection Agency (EPA) fuel economy tests. In some embodiments, the vehicle fuel consumption profiles may be based off of a historical analysis of past vehicle fuel consumption.

The computing device 300 may be configured to receive planned route data. For example, the processor 302 may receive the planned route data from the network interface 312, on which a planned route has been generated. In some embodiments, the planned route data may be received from navigational software operating on the processor 302.

The computing device 300 may be configured to determine a projected route based at least in part on the vehicle position data. In some embodiments, determining the projected route may be based at least in part on the planned route data. For example, the processor 302 may receive the planned route data and determine that the projected route is the planned route as based on the planned route data. In some embodiments, determining the projected route may be based at least in part on the vehicle position data. In some embodiments, determining the projected route may be based at least in part on historical analysis of operator travel. For example, if an operator has driven the same route at the same time of day on many occasions, the projected route may be determined based on the assumption that the user may be taking the same route.

The computing device 300 may be configured to receive route characteristic data. For example, the processor 302 may receive route characteristic data from the remote computing device. In some embodiments, the route characteristic data includes elevation data. In some embodiments, the route characteristic data includes signage information (e.g., location of stop signs, timing of stop lights, etc.). In some embodiments, the route elevation data may include the elevation at multiple points along the projected route. In some embodiments, the route characteristic data may further include road curvature data. Examples of road curvature data may include one or more of curvature of the road along the length of the road and curvature of the road across the road (i.e., the extent to which the road may be crowned or sloped). In some embodiments, the route characteristic data may further include road surface condition data. Examples of road surface condition data may include coefficients of friction, road rolling resistance contribution, existence of known potholes, and recent icy conditions. In some embodiments, the route characteristic data further includes weather data. Examples of weather data may include whether it rained recently, whether it snowed recently, and whether fog may be impeding visual identification of other vehicles. In some embodiments, the route characteristic data further includes speed limit data. In some embodiments, the route characteristic data further includes traffic data.

The computing device 300 may be configured to determine a first speed change position and a first speed change target speed based at least in part on the projected route. For example, the processor 302 may determine the first speed change position and the first speed change target speed. In some embodiments, determining the first speed change target speed may be based at least in part on the route characteristic data. For example, the signage information may be used to identify a stop sign or stoplight ahead. As another example, the speed limit information may be used to identify a speed reduction ahead. In some embodiments, determining the first speed change target speed may be based at least in part on the traffic data. For example, the traffic data may be used to identify a backup ahead. In some embodiments, determining the first speed change position may be based at least in part on the route characteristic data.

The computing device 300 may be configured to determine a second speed change position and a second speed change target speed based at least in part on the projected route. For example, the processor 302 may determine the second speed change position and the second speed change target speed. In some embodiments, determining the second speed change target speed may be based at least in part on the route characteristic data. For example, the signage information may be used to identify a stop sign or stoplight ahead. As another example, the speed limit information may be used to identify a speed reduction ahead. In some embodiments, determining the first speed change target speed may be based at least in part on the traffic data. For example, the traffic data may be used to identify a backup ahead. In some embodiments, determining the first speed change position may be based at least in part on the route characteristic data.

The computing device 300 may be configured to determine a first residual speed and a first residual speed position based at least in part on the first speed change position and the first speed change target speed. For example, the first residual speed and first residual speed location may be determined by the processor 302 by calculating based on a maximum desired braking deceleration to a selected percentage of the speed limit from the first speed change position and the first speed change target speed. In some embodiments, determining the target speed profile may be based at least in part on the traffic data. For example, the traffic may be moving too fast to allow for a low first residual speed.

The computing device 300 may be configured to determine a second residual speed and a second residual speed position based at least in part on the second speed change position and the second speed change target speed. For example, the second residual speed and second residual speed location may be determined by the processor 302 calculating based on a maximum desired braking deceleration to a selected percentage of the speed limit from the second speed change position and the second speed change target speed. In some embodiments, determining the target speed profile may be based at least in part on the traffic data. For example, the traffic may be moving too fast to allow for a low first residual speed.

The computing device 300 may be configured to determine a first lower speed tolerance (i.e., a speed below which the vehicle should not coast below; this speed may be adjusted lower as the first residual speed position draws closer). In some embodiments, the first lower speed tolerance may be retrieved by the processor 302 from the storage device 310 or received via the network interface 312. In some embodiments, the first lower speed tolerance may be determined based on speed limit information.

The computing device 300 may be configured to determine a second lower speed tolerance (i.e., a speed below which the vehicle should not coast below; this speed may be adjusted lower as the first residual speed position draws closer). In some embodiments, the second lower speed tolerance may be retrieved by the processor 302 from the storage device 310. In some embodiments, the second lower speed tolerance may be determined based on speed limit information.

The computing device 300 may be configured to determine a first lower speed envelope based at least in part on the first residual speed. For example, the processor 302 may determine the first lower speed envelope. For example, the first lower speed envelope may not pass below the first residual speed. In some embodiments, determining the first lower speed envelope may be further based on the first lower speed tolerance. For example, the first lower speed envelope may not drop below the first lower speed tolerance.

The computing device 300 may be configured to determine a second lower speed envelope based at least in part on the second residual speed and a second lower speed tolerance. The processor 302 may determine the lower speed envelope. For example, the second lower speed envelope may not pass below the second residual speed. In some embodiments, determining the second lower speed envelope may be further based on the second lower speed tolerance. For example, the second lower speed envelope may not drop below the second lower speed tolerance.

The computing device 300 may be configured to determine an overall lower speed envelope based at least in part on the first residual speed. For example, processor 302 may determine the overall lower speed envelope. In some embodiments, determining the overall lower speed envelope may be further based on the second lower speed envelope such that the overall lower speed envelope is the lesser of the second lower speed envelope and the second lower speed envelope.

The computing device 300 may be configured to determine an upper speed tolerance based at least in part on the speed limit information. For example, the processor 302 may determine the upper speed tolerance based on the speed limit information. For example, in some embodiments, the upper speed tolerance may not exceed the speed limit, or may not exceed the speed limit plus a fixed or percentage value over the speed limit.

The computing device 300 may be configured to determine an upper speed envelope. For example, the processor 302 may determine the upper speed envelope. In some embodiments, determining the upper speed envelope may be based at least in part on the speed limit information. In some embodiments, the upper speed envelope may be based at least in part on the upper speed tolerance.

The computing device 300 may be configured to determine a target speed profile based at least in part on the first residual speed, the first residual speed position, the overall lower speed envelope, and the upper speed envelope. For example, the processor 302 may determine the target speed profile. In some embodiments, the target speed profile lies above the overall lower speed envelope and below the upper speed envelope. In some embodiments, determining the target speed profile may be further based on the vehicle characteristic data. For example, the target speed profile may change in view of vehicle weight, aerodynamics, etc.

The computing device 300 may be configured to determine a coast start point based at least in part on the target speed profile. For example, the processor 302 may calculate the coast start point by selecting the point on the target speed profile where the current speed intersects the target speed profile and the target speed profile does not pass above the upper speed envelope or below the overall lower speed envelope.

The computing device 300 may be configured to communicate the coast start point to the operator of the vehicle. For example, in embodiments where the output device 306 includes a speaker, the processor 302 may send a signal to cause the speaker to produce an audible signal indicating to start coasting now (e.g., an audible "coast now" or a chime). In some embodiments where the output device 306 includes a display, the processor 302 may send a signal to cause the display to present a visual indicator (e.g., a written message such as "coast now" or an image of a foot being lifted off of an accelerator).

In some embodiments, the computing device 300 may be configured to receive vehicle position data. For example, the processor 302 may receive the vehicle position data may from GPS 316. In some embodiments, the processor 302 may receive the vehicle position data by way of the network interface 312.

The computing device 300 may be configured to receive planned route data. In some embodiments, the planned route data may be received from navigational software. For example, the processor 302 may receive the planned route data from a remote computing device, on which a planned route has been generated.

The computing device 300 may be configured to determine a projected route. In some embodiments, determining the projected route may be based at least in part on the planned route data. For example, determining the projected route may be as simple as receiving the planned route. In some embodiments, determining the projected route may be based at least in part on the vehicle position data. For example, if the vehicle 10 is on a highway with little of interest for at least 30 kilometers, the processor 302 may determine that the projected route is continuing on the highway for 30 kilometers. In some embodiments, determining the projected route may be based at least in part on historical analysis of user travel. For example, if a user has driven the same route at the same time of day on many occasions, the projected route may be determined based on the assumption that the user is taking the same route.

The computing device 300 may be configured to receive route characteristic data including at least route elevation data. For example, the processor 302 may receive the route characteristic data from the storage device 310. In some embodiments, the route elevation data may include the elevation at multiple points along the projected route. In some embodiments, the route characteristic data may further include road curvature data. In some embodiments, the route characteristic data may further include signage data. Examples of road curvature data may include one or more of curvature of the road along the length of the road and curvature of the road across the road (i.e., the extent to which the road is crowned or sloped). In some embodiments, the route characteristic data may further include road surface condition data. Examples of road surface condition data may include coefficients of friction, road rolling resistance contribution, existence of known potholes, and recent icy conditions. In some embodiments, the route characteristic data further includes weather data. Examples of weather data may include whether it rained recently, whether it snowed recently, and whether fog is impeding visual identification of other vehicles. In some embodiments, the route characteristic data further includes speed limit data. In some embodiments, the route characteristic data further includes traffic data.

The computing device 300 may be configured to receive vehicle characteristic data. For example, the processor 302 may receive vehicle characteristic data by way of the network interface 312 or from the storage device 310. In some embodiments, the vehicle characteristic data may include vehicle aerodynamics. In some embodiments, the vehicle characteristic data may include vehicle mass. In some embodiments, the vehicle characteristic data may include vehicle fuel consumption profiles. In some embodiments, the vehicle fuel consumption profiles may be based on Environmental Protection Agency (EPA) fuel economy test. In some embodiments, the vehicle fuel consumption profiles may be based off of a historical analysis of past vehicle fuel consumption.

The computing device 300 may be configured to determine a sampling resolution. For example, the processor 302 may determine the sampling resolution based on a value received from the storage device 310. In some embodiments, determining the sampling resolution may be based at least in part on the vehicle characteristic data.

The computing device 300 may be configured to sample the route elevation data at the sampling resolution to generate sampled route elevation data. For example, the processor 302 may sample the route elevation data every 100 m to produce the sampled route elevation data.

The computing device 300 may be configured to receive a fuel savings target. For example, the operator of the vehicle may enter a desired fuel savings target (e.g., 5%, 10%, etc.) via the user input device 304, which the processor 302 subsequently receives. In some embodiments, determining the fuel savings target may include retrieving a value (e.g., 100 m) from the storage device 310.

The computing device 300 may be configured to determine a start of uphill delay. In some embodiments, determining the start of uphill delay may be based at least in part on the vehicle characteristic data. In some embodiments, determining the start of uphill delay may include the processor 302 retrieving a value (e.g., 100 m) from the storage device 310.

The computing device 300 may be configured to determine a start of downhill delay. In some embodiments, determining the start of uphill delay may be based at least in part on the vehicle characteristic data. In some embodiments, the processor 302 may determine the start of downhill delay by retrieving a value (e.g., 100 m) from the storage device 310.

The computing device 300 may be configured to determine at least one start of uphill position and at least one start of downhill position based at least in part on the sampled route elevation data. In some embodiments, the at least one start of uphill position may be two start of uphill positions, three start of uphill positions, four start of uphill positions, five start of uphill positions, or more. In some embodiments, the at least one start of downhill position may be two start of downhill positions, three start of downhill positions, four start of downhill positions, five start of downhill positions, or more. For example, the processor 302 may determine the at least one start of uphill position and the at least one start of downhill position by analyzing the sampled route elevation data and comparing elevations of different points to determine local crests and valleys. In some embodiments, determining the at least one start of uphill position and the at least one start of downhill position is performed through automated pattern recognition. In some embodiments, the at least one start of start of uphill position may be adjusted forward along the projected route by a distance equal to the start of uphill delay (e.g., 100 m). In some embodiments, the at least one start of start of uphill positions may be adjusted forward along the projected route by a distance equal to the start of uphill delay (e.g., 100 m).

The computing device 300 may be configured to determine a minimum speed change distance. In some embodiments, determining the start of uphill delay may be based at least in part on the vehicle characteristic data. In some embodiments, determining the start of uphill delay may include the processor 302 receiving a value (e.g., 1000 m) from the storage device 310. In some embodiments, the minimum speed change distance may be based on vehicle characteristic data.

The computing device 300 may be configured to determine at least one cruise speed route segment based at least in part on the at least one start of uphill position and the at least one start of downhill position. In some embodiments, the at least one cruise speed route segment may be two cruise speed route segments, three cruise speed route segments, four cruise speed route segments, five cruise speed route segments, or more. For example, the processor 302 may determine the at least one cruise speed route segment by starting at one start of downhill position and ending at one start of uphill position. In some embodiments, determining the at least one cruise speed route segment may be further based on the minimum speed change distance. For example, the at least one cruise speed route segment may be limited to be at least 1000 m. Requiring the at least one cruise speed route segment to the minimum speed change distance may increase the likelihood of operator compliance and reduce fuel costs by avoiding regular acceleration.

The computing device 300 may be configured to determine a corresponding cruising speed for the at least one cruise speed route segment based at least in part on one or more of the route elevation data and the sampled route elevation data. In embodiments where there are more than one cruise speed route segments, more corresponding cruising speeds may be determined. For example, the processor 302 may determine that, for a generally downhill cruise speed route segment, the corresponding cruising speed is 65 miles per hour, while for a generally uphill cruise speed route segment, the corresponding cruising speed is 60 miles per hour. In some embodiments, determining the corresponding cruising speed for the at least one cruise speed route segment may be further based on the vehicle characteristic data. In some embodiments, determining the corresponding cruising speed for the at least one cruise speed route segment may be further based on the fuel savings target. For example, with a fuel savings target of 5%, the corresponding cruising speed for an exemplary cruise speed route segment may be 65 miles per hour, while with a fuel savings target of 10%, the corresponding cruising speed for the exemplary cruise speed route segment may be 60 miles per hour. In some embodiments, determining the corresponding cruising speed for the at least one cruise speed route segment may be further based on the road curvature data. For example, if there is a curve in a cruise speed route segment that would be unsafe to navigate at 70 miles per hour but safe to navigate at 65 miles per hour, and the corresponding cruising speed would otherwise be 70 miles per hour, the corresponding cruising speed could be set to 65 miles per hour. In some embodiments, determining the corresponding cruising speed for the at least one cruise speed route segment is further based on the road surface condition data. For example, if there is a set of potholes in a cruise speed route segment that would be unsafe to navigate at 70 miles per hour but safe to navigate at 60 miles per hour, and the corresponding cruising speed would otherwise be 70 miles per hour, the corresponding cruising speed could be set to 60 miles per hour. In some embodiments, determining the corresponding cruising speed for the at least one cruise speed route segment may be further based on the weather data. For example, if there is fog that limits visibility and the cruise speed route segment would be unsafe to navigate at 70 miles per hour but safe to navigate at 55 miles per hour, and the corresponding cruising speed would otherwise be 70 miles per hour, the corresponding cruising speed could be set to 55 miles per hour. In some embodiments, determining the corresponding cruising speed for the at least one cruise speed route segment may be further based on the speed limit data. For example, if the speed limit is 55 miles per hour and the corresponding cruising speed would otherwise be 65 miles per hour, the corresponding cruising speed could be set to 55 miles per hour. In some embodiments, determining the corresponding cruising speed for the at least one cruise speed route segment may be further based on the traffic data. For example, if traffic is moving at 65 miles per hour and the corresponding cruising speed would otherwise be 70 miles per hour, the corresponding cruising speed could be set to 65 miles per hour.

The computing device 300 may be configured to communicate the corresponding cruising speed for the at least one cruise speed route segment. For example, in embodiments where the output device 306 includes a speaker, the processor 302 may send a signal to cause the speaker to produce an audible signal suggesting that the operator change the cruise control to the corresponding cruising speed (e.g., an audible "coast at 67 miles per hour"). In embodiments where the computing device 300 includes a display, the processor 302 may send a signal to cause the display to present a visual indicator (e.g., a written message such as "coast at 67 miles per hour").

The computing device 300 may be configured to determining a current speed. In some embodiments, the processor 302 may receive the current speed from the GPS 316 or by way of the network interface 312. In some embodiments, the processor 302 may calculate the current speed based on the vehicle position data obtained by the GPS 316.

The computing device 300 may be configured to determine a corresponding energy efficient speed. In some embodiments, the corresponding energy efficient speed may be based at least in part on vehicle characteristics data (e.g., vehicle mass, fuel consumption profiles, etc.) In some embodiments, the corresponding energy efficient speed may be based at least in part on route characteristic data (elevation, road curvature, road surface information, weather, speed limit, etc.). For example, the processor 302 may receive vehicle characteristic data and route characteristic data and determine the corresponding energy efficient speed.

The computing device 300 may be configured to determine a higher corresponding less energy efficient speed. In some embodiments, the higher corresponding less energy efficient speed is determined based on the speed limit. For example, the processor 302 may receive speed limit information by way of the network interface 312 and determine that the higher corresponding less energy efficient speed is equal to the speed limit.

The computing device 300 may be configured to determine a first transition range between the corresponding energy efficient speed and the higher corresponding less energy efficient speed. The processor 302 may determine this by comparing the corresponding energy efficient speed and the higher corresponding less energy efficient speed.

The computing device 300 may be configured to display, on a display, a display zone. For example, the processor 302 may transmit a signal to a display of the output device to cause the display to show the display zone and its contents. In some embodiments, the display zone may include a first indicator corresponding to the current speed. In some embodiments, the first indicator is a vertical line. In some embodiments, the first indicator is at a fixed position within the display zone. In some embodiments, the fixed position is located centrally within the display zone. In some embodiments, the first indicator may be an arrow. In some embodiments, the display zone may include a first pattern corresponding to the corresponding energy efficient speed. In some embodiments, the first pattern is green. In some embodiments, the display zone may include a second pattern different from the first pattern and corresponding to the higher corresponding less energy efficient speed. In some embodiments, the second pattern is yellow. In some embodiments. In some embodiments, the display zone may include a first pattern range therebetween corresponding to the first transition range. In some embodiments, patterns of the first pattern range are in a range between the first pattern and the second pattern and the first pattern range provides no substantial discontinuities between the first pattern and the second pattern.

The computing device 300 may be configured to determine an impractically low speed range. In some embodiments, the processor 302 may determine the impractically low speed range based on speed limit information (e.g., a given percentage of the speed limit or flat speed value below the speed limit).

The computing device 300 may be configured to determine a second transition range between the impractically low speed and the corresponding energy efficient speed. The processor 302 may determine the second transition range by comparing the impractically low speed and the corresponding energy efficient speed.

The computing device 300 may be configured to present, in the display zone, a third pattern different from the first pattern and corresponding to the impractically low speed. In some embodiments, the third pattern is black. For example, the processor 302 may send a signal to the display to display the third pattern.

The computing device 300 may be configured to present, in the display zone a second pattern range disposed between the third pattern and the first pattern and corresponding to the second transition range. For example, the processor 302 may send a signal to the display to cause the display to display the second pattern range. In some embodiments, patterns of the second pattern range are in a range between the first pattern and the third pattern and the first pattern range provides no substantial discontinuities between the first pattern and the third pattern.

The computing device 300 may be configured to determine an upper speed limit. For example, the processor 302 may determine the upper speed limit. In some embodiments, the upper speed limit may be based on speed limit information (i.e., the speed limit for that part of the route is the upper speed limit).

The computing device 300 may be configured to present, in the display zone, a second indicator corresponding to the upper speed limit. For example, the processor 302 may send a signal to the display to display the second indicator. In some embodiments, the second indicator is a vertical line.

The system 100 may be configured to determine a lower speed limit. For example, the processor 302 may determine the lower speed limit. In some embodiments, the lower speed limit may be based on speed limit information. For example, many highways in the United States have a minimum speed limit of 45 miles per hour.

The computing device 300 may be configured to present, in the display zone, a third indicator corresponding to the lower speed limit. For example, the PAC 124 may send a signal to the display 122 to display the third indicator. In some embodiments, the third indicator is a vertical line.

The computing device 300 may be configured to determine an overspeed tolerance speed. For example, the processor 302 may determine the overspeed tolerance speed by multiplying the speed limit or the upper speed limit by a factor (e.g., multiplying the speed limit by 1.1) or adding a set value to the speed limit (e.g., 5 miles per hour).

The computing device 300 may be configured to determine a third transition range between the overspeed tolerance speed and the higher corresponding less energy efficient speed. For example, the processor 302 may determine the third transition range by comparing the overspeed tolerance speed and the higher corresponding less energy efficient speed.

The computing device 300 may be configured to present, in the display zone, a fourth pattern different from the second pattern and corresponding to the overspeed tolerance speed. For example, the processor 302 may send a signal to the display to display the fourth pattern. In some embodiments, the fourth pattern is red.

The computing device 300 may be configured to present, in the display zone, a third pattern range disposed between the second pattern and the fourth pattern and corresponding to the third transition range. For example, the processor may send a signal to the display to display the third pattern range. In some embodiments, the patterns of the third pattern range are in a range between the second pattern and the fourth pattern, and the third pattern range provides no substantial discontinuities between the second pattern and the fourth pattern.

Figure 7A:
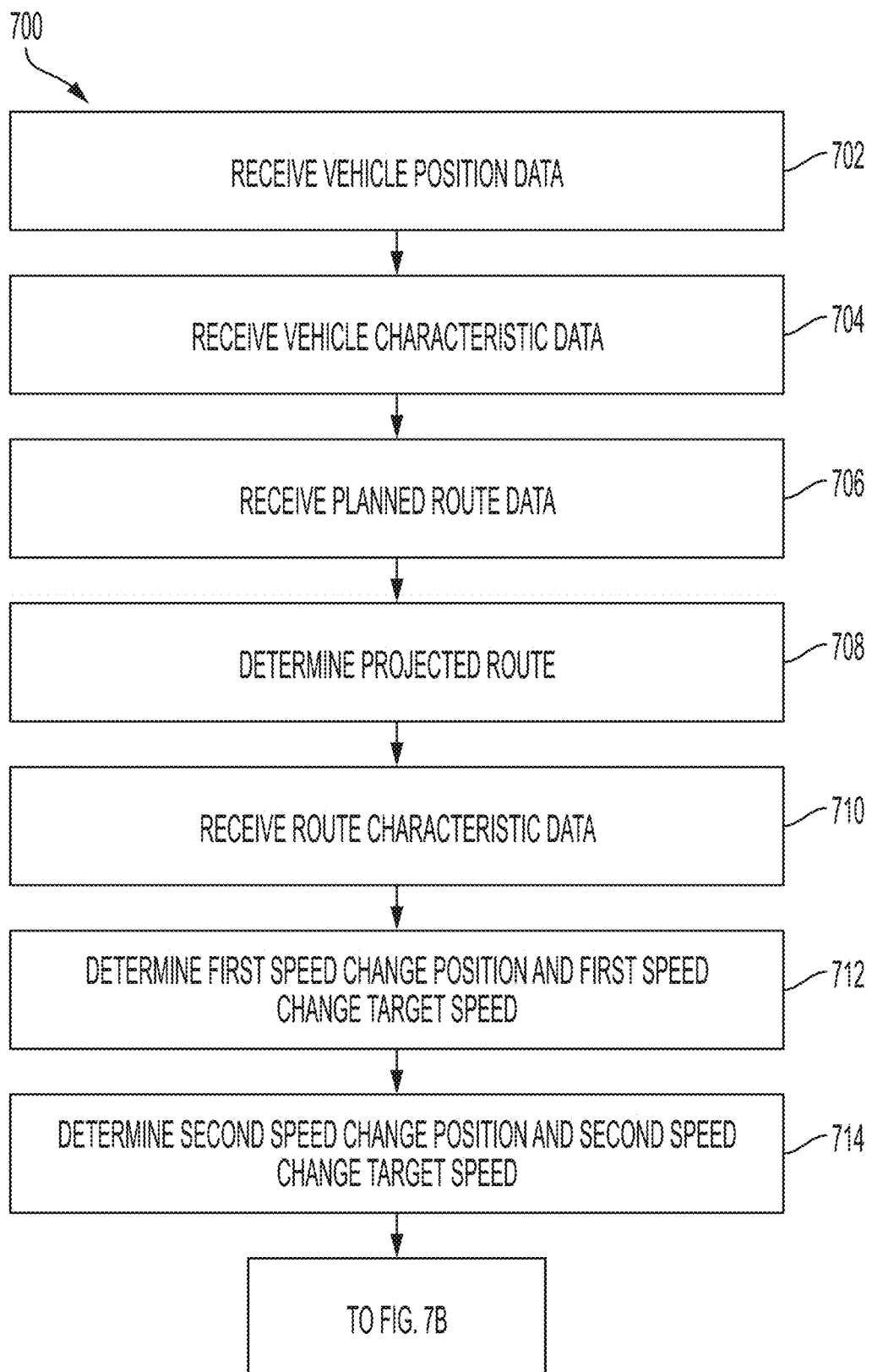
FIGS. 7A-7C generally illustrate a method for providing a coast recommendation for an operator of a vehicle.
Figure 7B:
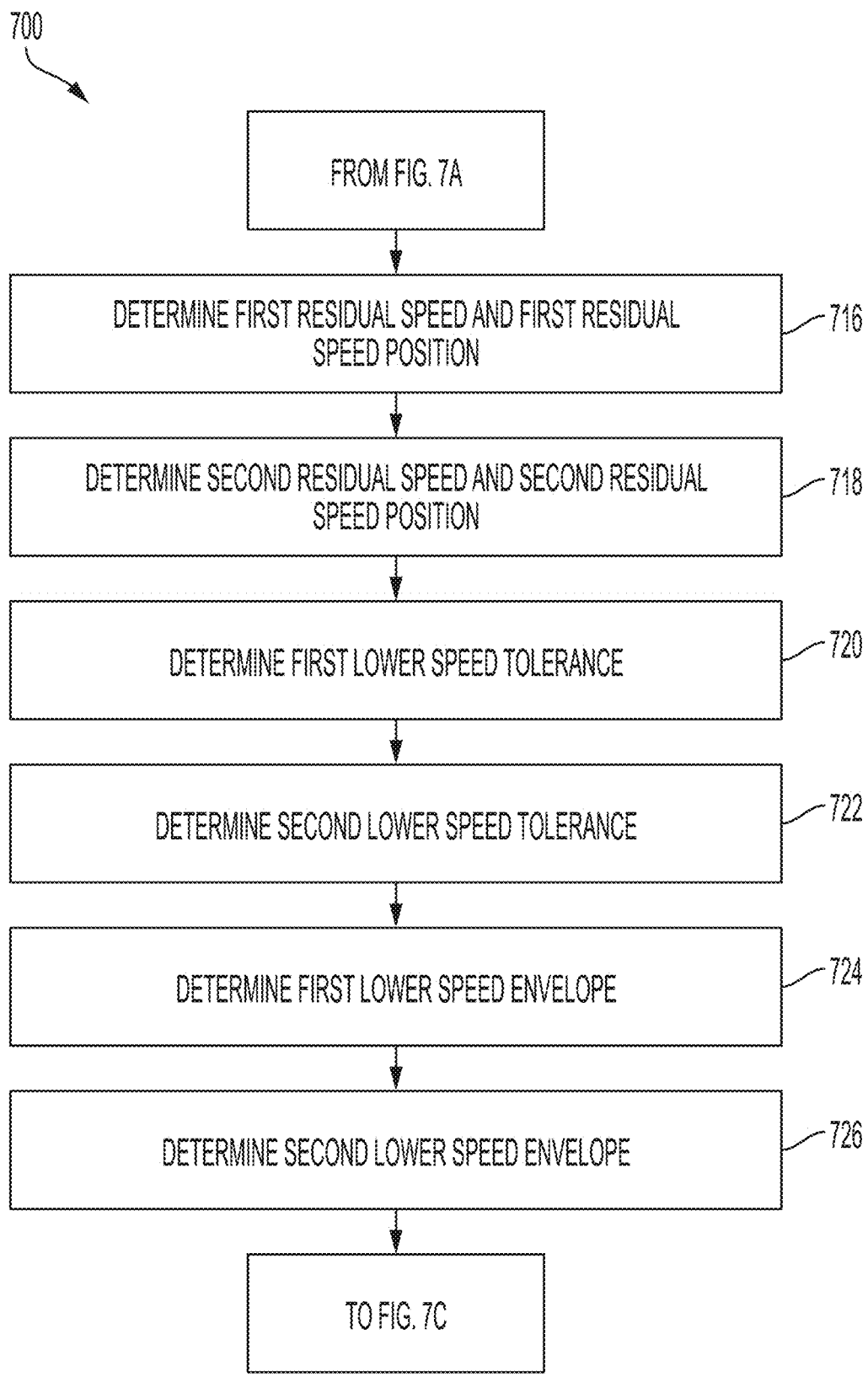
Figure 7C:
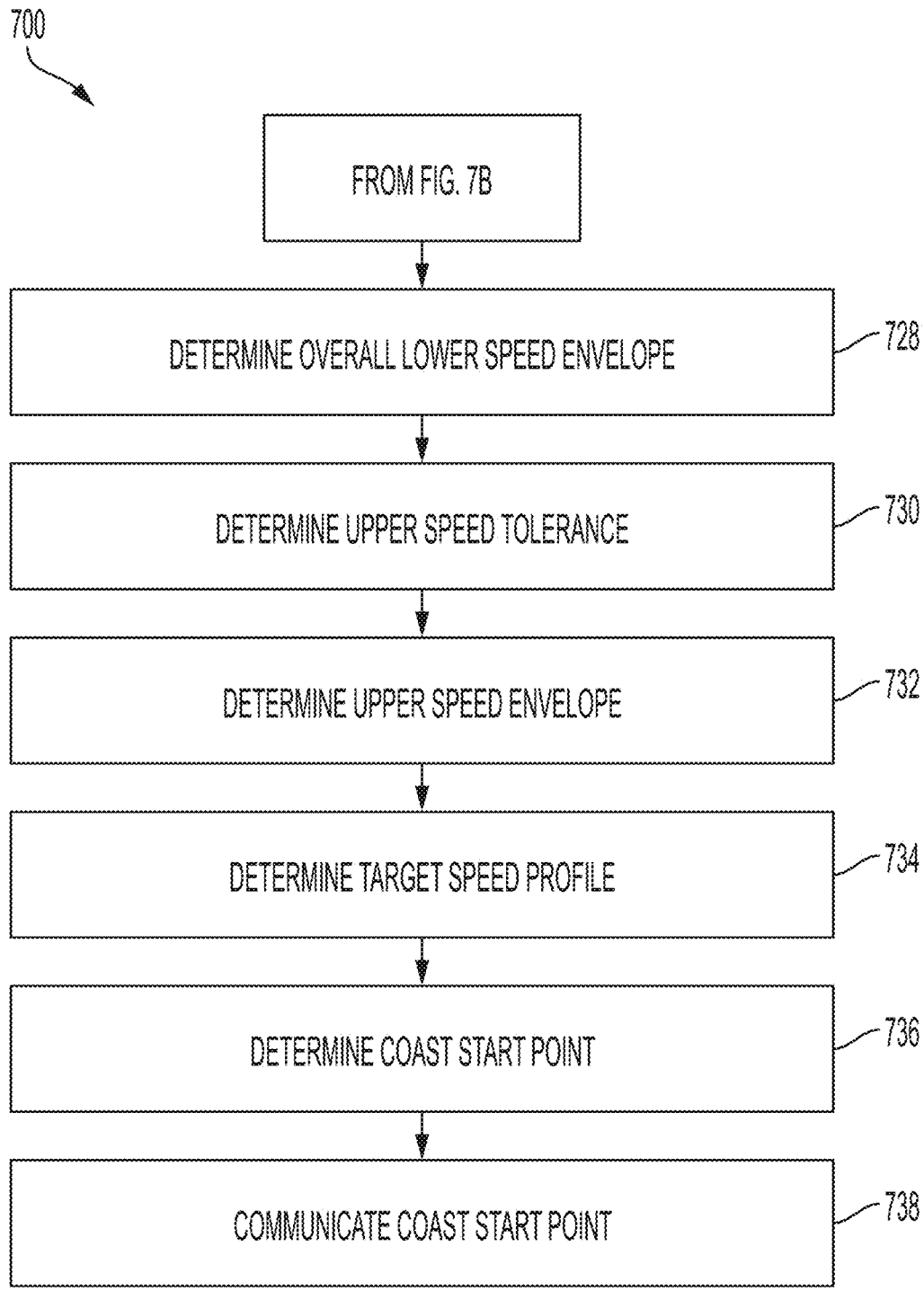

FIGS. 7A-7C generally illustrate a flow diagram of a method 700 for providing a coast recommendation to an operator of a vehicle, such as the vehicle 10, according to the principles of the present disclosure. In some embodiments, instructions are stored on a memory storage device that, when executed by a processor, cause the processor to perform the steps of the method 700.

At 702, the method 700 may include receiving vehicle position data.

At 704, the method 700 may include receiving vehicle characteristic data.

At 706, the method 700 may include receiving planned route data.

At 708, the method 700 may include determining a projected route based at least in part on the vehicle position data.

At 710, the method 700 may include receiving route characteristic data.

At 712, the method 700 may include determining a first speed change position and a first speed change target speed based at least in part on the projected route.

At 714, the method 700 may include determining a second speed change position and a second speed change target speed based at least in part on the projected route.

At 716, the method 700 may include determining a first residual speed and a first residual speed position based at least in part on the first speed change position and the first speed change target speed.

At 718, the method 700 may include determining a second residual speed and a second residual speed position based at least in part on the second speed change position and the second speed change target speed.

At 720, the method 700 may include determining a first lower speed tolerance.

At 722, the method 700 may include determining a second lower speed tolerance.

At 724, the method 700 may include determining a first lower speed envelope based at least in part on the first residual speed.

At 726, the method 700 may include determining a second lower speed envelope based at least in part on the second residual speed and a second lower speed tolerance.

At 728, the method 700 may include determining an overall lower speed envelope based at least in part on the first residual speed.

At, the method 700 may include determining an upper speed tolerance based at least in part on the speed limit information.

At 732, the method 700 may include determining an upper speed envelope.

At 734, the method 700 may include determining a target speed profile based at least in part on the first residual speed, the first residual speed position, the overall lower speed envelope, and the upper speed envelope.

At 736, the method 700 may include determining a coast start point based at least in part on the target speed profile.

At 738, the method 700 may include communicating the coast start point to the operator of the vehicle.

Figure 13A:
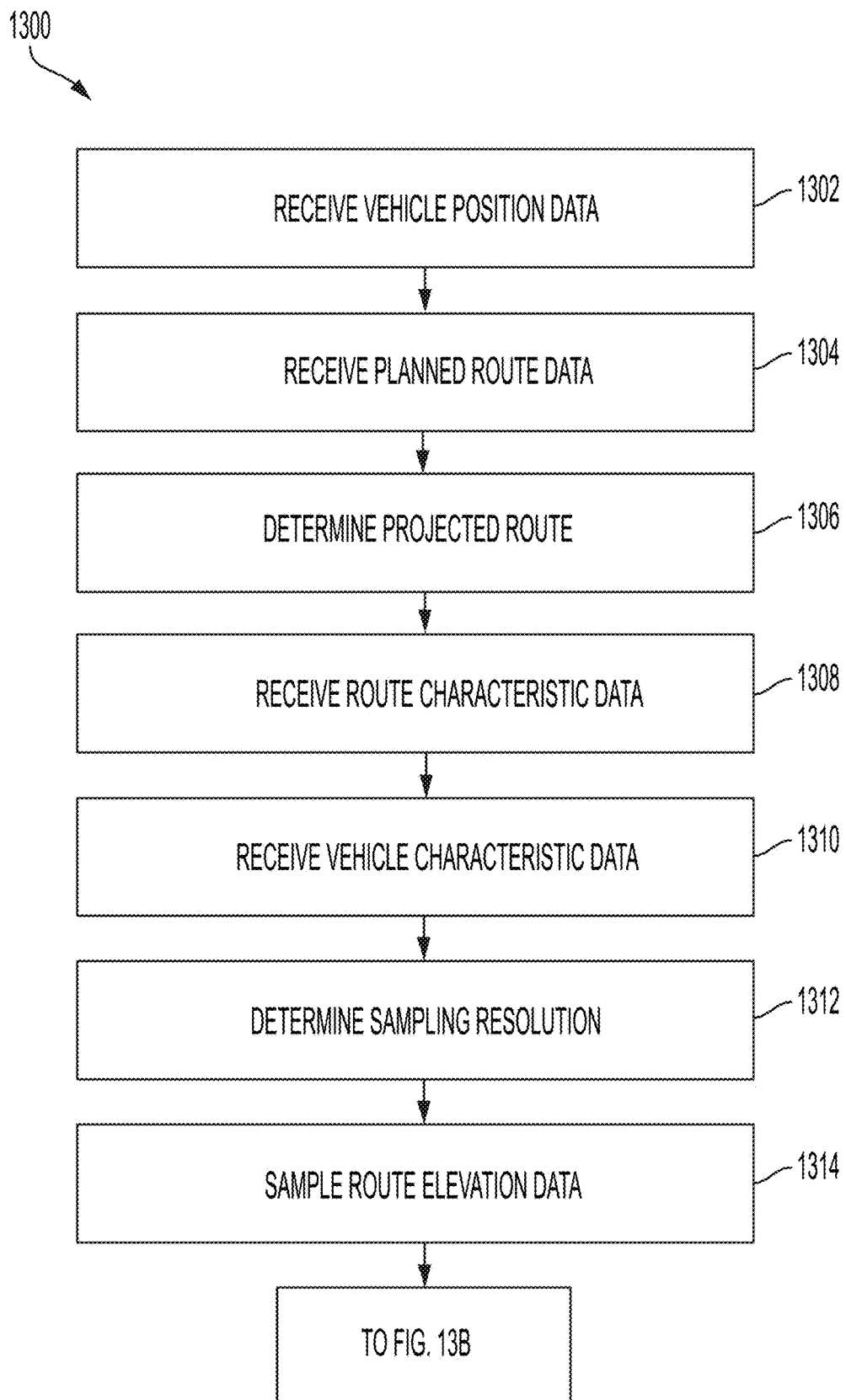
FIGS. 13A-13C generally illustrate a method for providing a cruise speed recommendation according to the principles of the present disclosure.
Figure 13B:
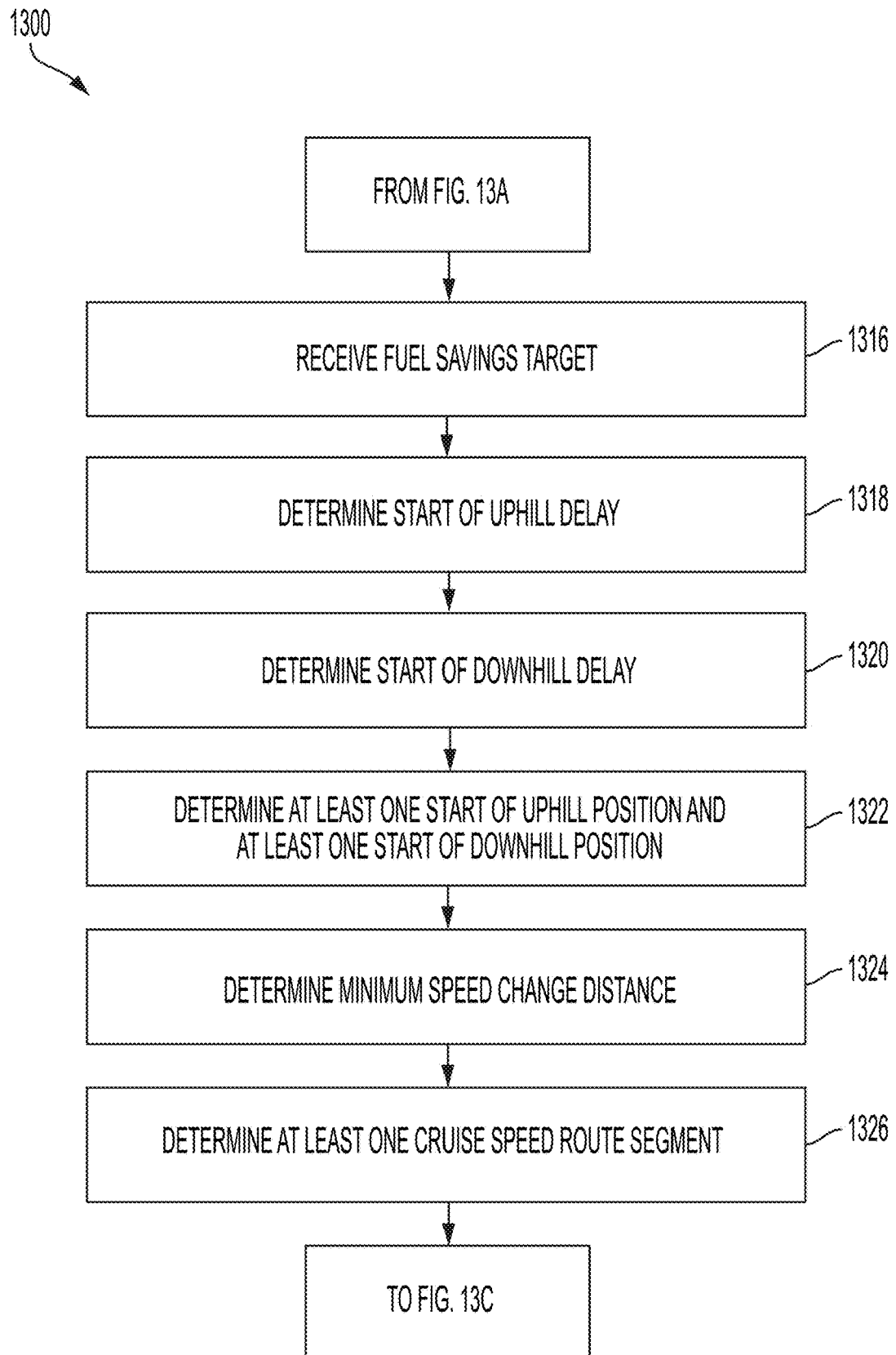
Figure 13C:
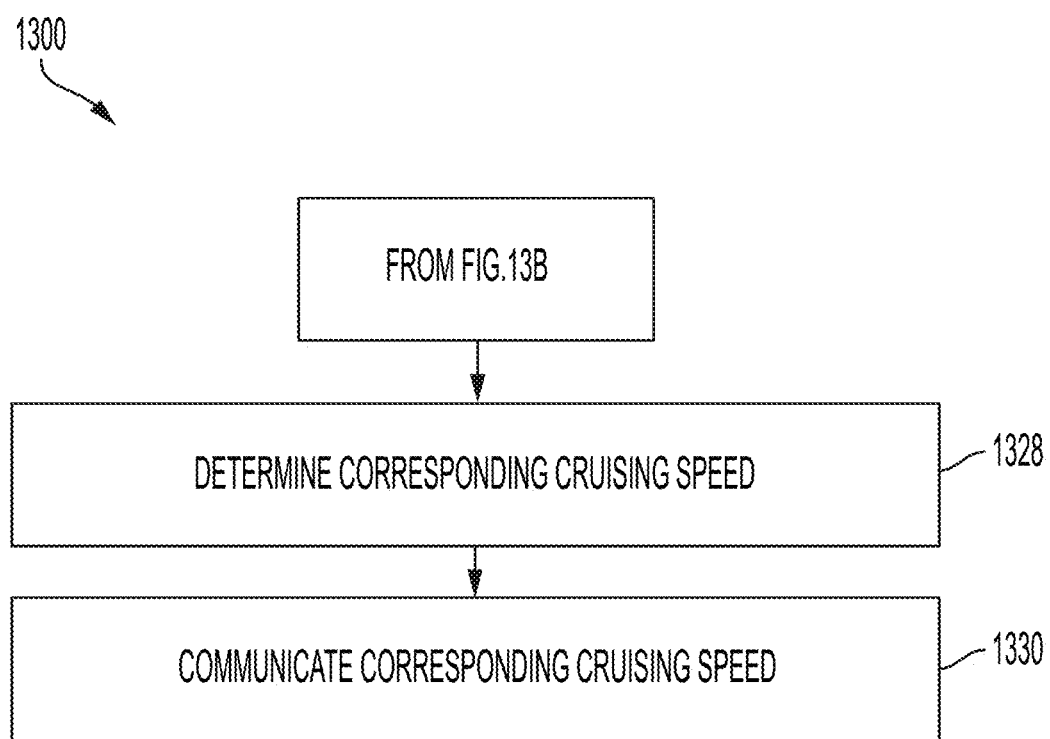

FIGS. 13A-13C generally illustrate a flow diagram of a method 1300 for providing a coast recommendation to an operator of a vehicle, such as the vehicle 10, according to the principles of the present disclosure. In some embodiments, instructions are stored on a memory storage device that, when executed by a processor, cause the processor to perform the steps of method 1300.

At 1302, the method 1300 may include receiving vehicle position data.

At 1304, the method 1300 may include receiving planned route data.

At 1306, the method 1300 may include determining a projected route.

At 1308, the method 1300 may include receiving route characteristic data including at least route elevation data.

At 1310, the method 1300 may include receiving vehicle characteristic data.

At 1312, the method 1300 may include determining a sampling resolution.

At 1314, the method 1300 may include sampling the route elevation data at the sampling resolution to generate sampled route elevation data.

At 1316, the method 1300 may include receiving a fuel savings target.

At 1318, the method 1300 may include determining a start of uphill delay.

At 1320, the method 1300 may include determining a start of downhill delay.

At 1322, the method 1300 may include determining at least one start of uphill position and at least one start of downhill position based at least in part on the sampled route elevation data.

At 1324, the method 1300 may include determining a minimum speed change distance.

At 1326, the method 1300 may include determining at least one cruise speed route segment based at least in part on the at least one start of uphill position and the at least one start of downhill position.

At 1328, the method 1300 may include determining a corresponding cruising speed for the at least one cruise speed route segment based at least in part on one or more of the route elevation data and the sampled route elevation data.

At 1330, the method 1300 may include communicating the corresponding cruising speed for the at least one cruise speed route segment. The method 1300 may include more or fewer steps than those described above, and the steps of method 1300 may be performed in any suitable order.

Figure 18A:
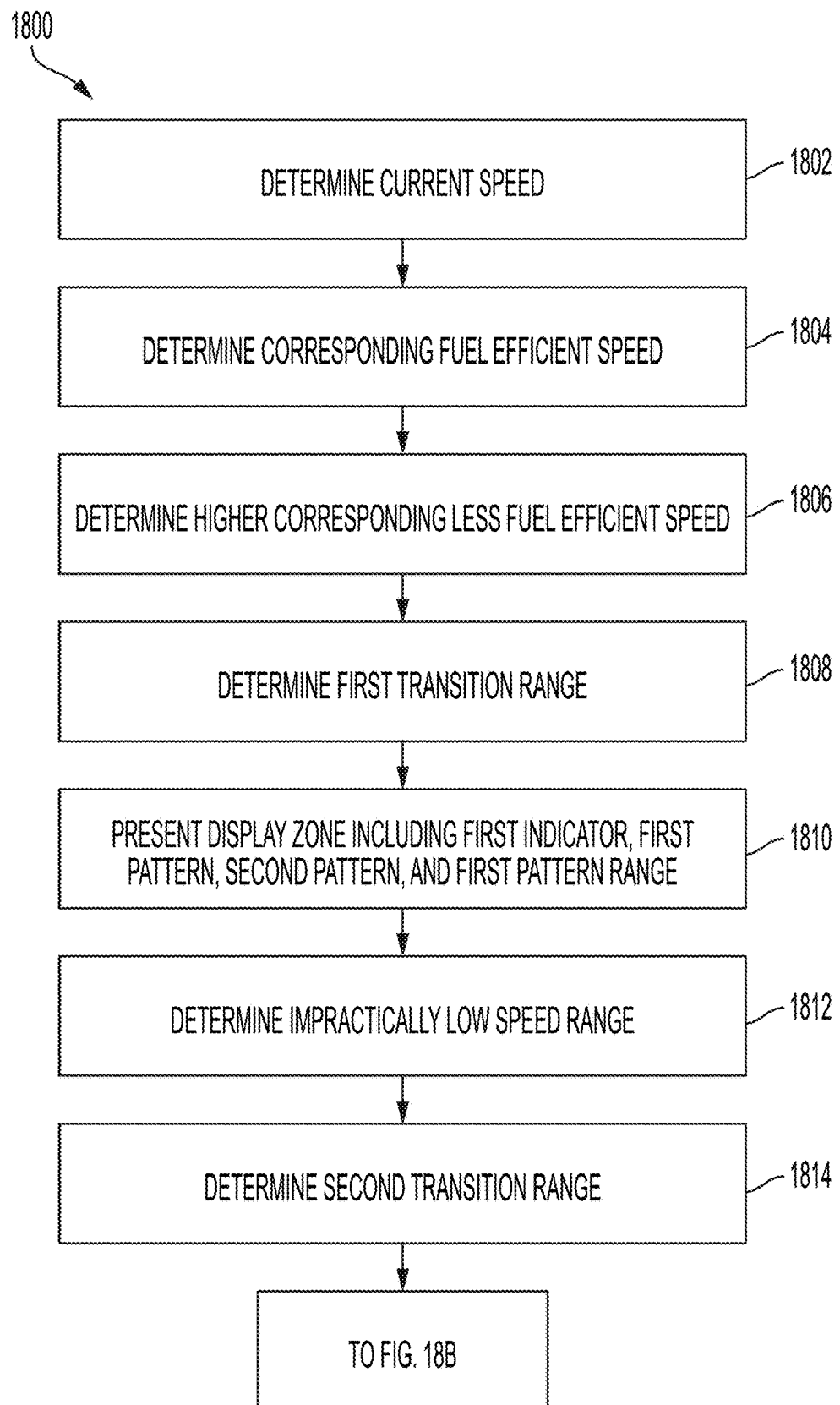
FIGS. 18A-18C generally illustrate a method for providing a driving speed recommendation according to the principles of the present disclosure.
Figure 18B:
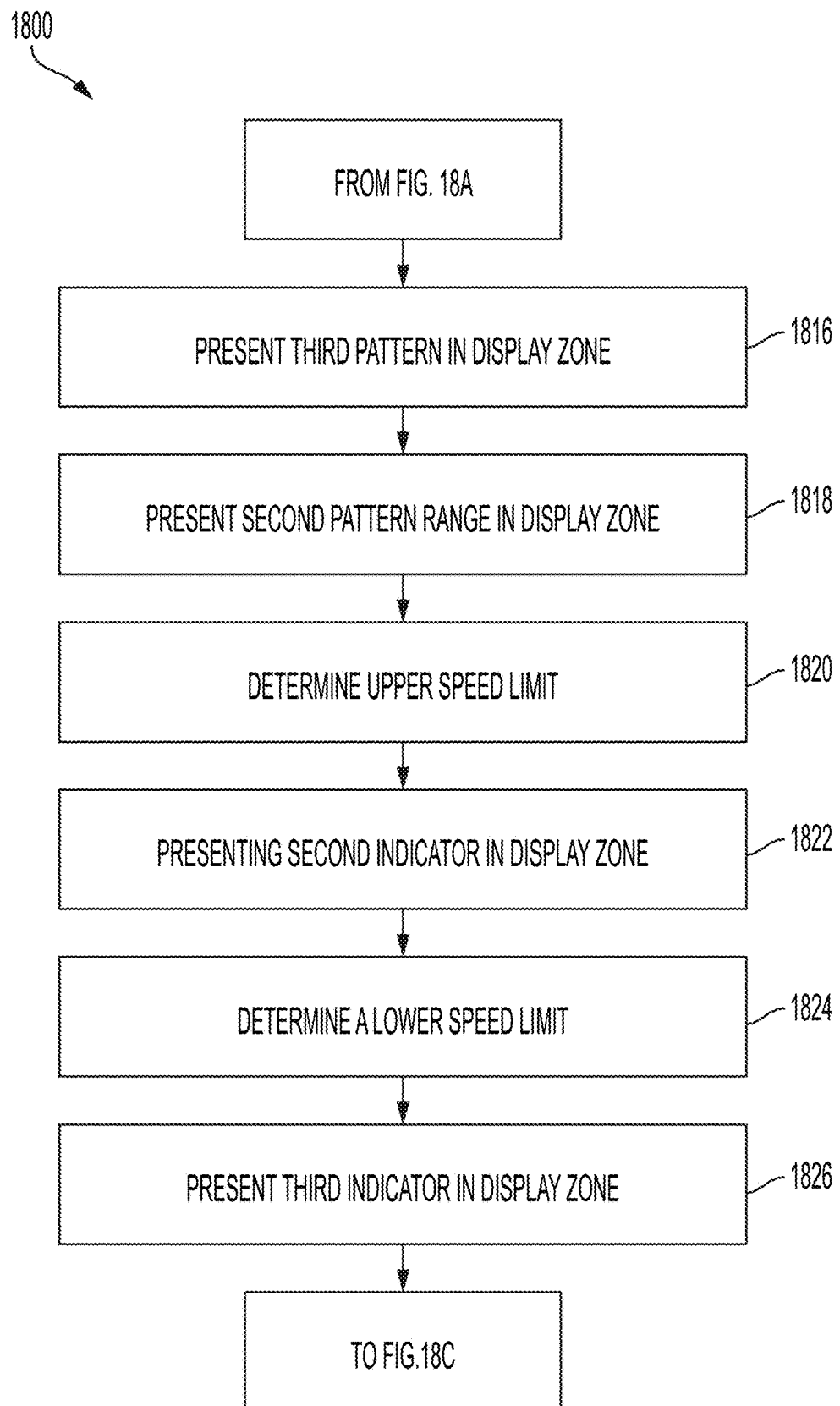
Figure 18C:
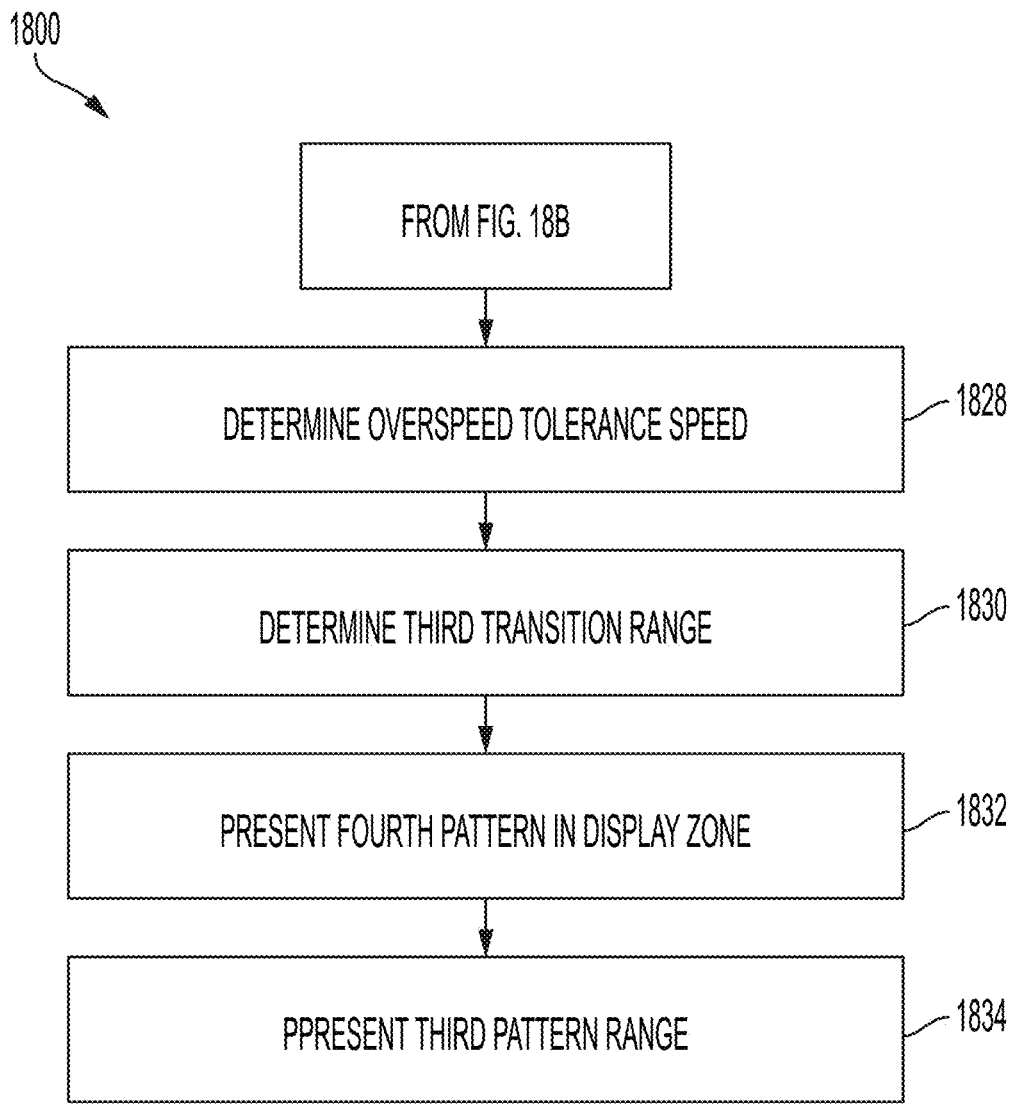

A method 1800 for providing a visual driving speed recommendation to an operator of a vehicle, such as vehicle 10, is disclosed and illustrated in FIGS. 18A-18C.

At 1802, the method 1800 may include determining a current speed.

At 1804, the method 1800 may include determining a corresponding energy efficient speed. In some embodiments, the corresponding energy efficient speed may be based at least in part on vehicle characteristics data (e.g., vehicle mass, fuel consumption profiles, etc.).

At 1806, the method 1800 may include determining a higher corresponding less energy efficient speed.

At 1808, the method 1800 may include determining a first transition range between the corresponding energy efficient speed and the higher corresponding less energy efficient speed.

At 1810, the method 1800 may include displaying, on a display, a display zone.

At 1812, the method 1800 may include determining an impractically low speed range. In some embodiments, the processor 302 may determine the impractically low speed range based on speed limit information (e.g., a given percentage of the speed limit or flat speed value below the speed limit).

At 1814, the method 1800 may include determining a second transition range between the impractically low speed and the corresponding energy efficient speed.

At 1816, the method 1800 may include presenting, in the display zone, a third pattern different from the first pattern and corresponding to the impractically low speed.

At 1818, the method 1800 may include presenting, in the display zone, a second pattern range disposed between the third pattern and the first pattern and corresponding to the second transition range.

At 1820, the method 1800 may include determining an upper speed limit. For example, the processor 302 may determine the upper speed limit.

At 1822, the method 1800 may include presenting, in the display zone, a second indicator corresponding to the upper speed limit.

At 1824, the method 1800 may include determining a lower speed limit. For example, the processor 302 may determine the lower speed limit.

At 1826, the method 1800 may include presenting, in the display zone, a third indicator corresponding to the lower speed limit.

At 1828, the method 1800 may include determining an overspeed tolerance speed.

At 1830, the method 1800 may include determining a third transition range between the overspeed tolerance speed and the higher corresponding less energy efficient speed.

At 1832, the method 1800 may include presenting, in the display zone, a fourth pattern different from the second pattern and corresponding to the overspeed tolerance speed.

At 1834, the method 1800 may include presenting, in the display zone, a third pattern range disposed between the second pattern and the fourth pattern and corresponding to the third transition range.

The method 1800 may include more or fewer steps than those described above, and the steps of method 1800 may be performed in any suitable order.

In some embodiments, a method for providing a coast recommendation for an operator of a vehicle is disclosed. The method may include receiving vehicle position data. The method may further include determining a projected route based at least in part on the vehicle position data. The method may further include determining a first speed change position and a first speed change target speed based at least in part on the projected route. The method may further include determining a first residual speed and a first residual speed position based at least in part on the first speed change position and the first speed change target speed. The method may further include determining a first lower speed envelope based at least in part on the first residual speed. The method may further include determining an overall lower speed envelope based at least in part on the first lower speed envelope. The method may further include determining an upper speed envelope. The method may further include determining a target speed profile based at least in part on the first residual speed, the first residual speed position, the first lower speed envelope, and the upper speed envelope. The method may further include determining a coast start point based at least in part on the target speed profile. The method may further include communicating the coast start point to the operator of the vehicle.

In some embodiments, the target speed profile may lie above the overall lower speed envelope and below the upper speed envelope. In some embodiments, the method may further include determining a first lower speed tolerance, and determining the first lower speed envelope may be further based on the first lower speed tolerance. In some embodiments, the method may further include receiving vehicle characteristic data, and determining the target speed profile may be further based on the vehicle characteristic data. In some embodiments, the method may further include receiving planned route data, and determining the projected route may be further based on the planned route data. In some embodiments, the method may further include receiving traffic data, and determining the first speed change position may be further based on the traffic data. In some embodiments, the method may further include receiving route characteristic data, and wherein determining the target speed profile is based at least in part on the route characteristic data. In some embodiments, the method may include receiving route characteristic data. In some embodiments, the route characteristic data may further include elevation data, and determining the target speed profile may be based at least in part on the elevation data. In some embodiments, the route characteristic data may include road surface data, and determining the target speed profile may be based at least in part on the road surface data. In some embodiments, the route characteristic data may include weather data, and determining the target speed profile may be based at least in part on the weather data. In some embodiments, the route characteristic data may include traffic data, and determining the target speed profile may be based at least in part on the traffic data. In some embodiments, the route characteristic data may include speed limit information, and determining the upper speed envelope may be further based on the speed limit information. In some embodiments, the route characteristic data may include speed limit information, the method may further include determining an upper speed tolerance based at least in part on the speed limit information, and the upper speed envelope may be further based on the upper speed tolerance. In some embodiments, the method may further include determining a second speed change position and a second speed change target speed based at least in part on the projected route. In some embodiments, the method may further include determining a second residual speed and a second residual speed position based at least in part on the second speed change position and the second speed change target speed. In some embodiments, the method may further include determining a second lower speed envelope based at least in part on the second residual speed. In some embodiments, the method may further include determining the overall lower speed envelope is further based on the second lower speed envelope such that the overall lower speed envelope is the lesser of the first lower speed envelope and the second lower speed envelope. In some embodiments, the method may further include determining a second lower speed tolerance, and determining the second lower speed envelope may be further based on the second lower speed tolerance. In some embodiments, an apparatus may include a processor and a memory including instructions that, when executed by the processor, cause the processor to perform the steps of the method. In some embodiments, a non-transitory computer-readable storage medium may include executable instructions that, when executed by a processor, facilitate performance of the steps of the method.

In some embodiments, a method for providing a cruising speed recommendation to an operator of a vehicle is disclosed. The method may include determining a projected route. The method may further include receiving route characteristic data including route elevation data. The method may also include determining a sampling resolution. The method may further include sampling the route elevation data at the sampling resolution to generate sampled route elevation data. The method may also include determining at least one start of uphill position and at least one start of downhill position based at least in part on the sampled route elevation data. The method may also include: determining at least one cruise speed route segment based at least in part on the at least one start of uphill position and the at least one start of downhill position. The method may also include determining a corresponding cruising speed for the at least one cruise speed route segment based at least in part on one or more of the route elevation data and the sampled route elevation data. The method may further include communicating the corresponding cruising speed for the at least one cruise speed route segment.

In some embodiments, the method may include receiving vehicle position data, and determining the projected route may be based at least in part on the vehicle position data. In some embodiments, the method may include determining a minimum speed change distance, wherein determining the cruise speed route segment may be further based on the minimum speed change distance. In some embodiments, the method may include determining a start of uphill delay, wherein the at least one start of uphill position may be adjusted forward along the projected route by a distance equal to the start of uphill delay. In some embodiments, the method may include receiving vehicle characteristic data, wherein determining the start of uphill delay may be based at least in part on the vehicle characteristic data. In some embodiments, the method may include determining a start of downhill delay, wherein the at least one start of downhill position may be adjusted forward along the projected route by a distance equal to the start of downhill delay. In some embodiments, the method may include receiving vehicle characteristic data, and determining the start of downhill delay may be based at least in part on the vehicle characteristic data. In some embodiments, the method may include receiving vehicle characteristic data, wherein determining the corresponding cruising speed for the at least one cruise speed route segment may be further based on the vehicle characteristic data. In some embodiments, the method may include receiving a fuel savings target, wherein determining the corresponding cruising speed for the at least one cruise speed route segment may be further based on the fuel savings target. In some embodiments, the method may include receiving planned route data, wherein determining the projected route may be based at least in part on the planned route data. In some embodiments, the method may include receiving vehicle position data, wherein determining the projected route may be based at least in part on the vehicle position data. In some embodiments, the method may include receiving signage data, wherein determining the projected route may be based at least in part on the signage data. In some embodiments, the route characteristic data may further include road curvature data, and determining the corresponding cruising speed for the at least one cruise speed route segment may be further based on the road curvature data. In some embodiments, the route characteristic data may further include road surface condition data, and determining the corresponding cruising speed for the at least one cruise speed route segment may be further based on the road surface condition data. In some embodiments, the route characteristic data may further include weather data, and determining the corresponding cruising speed for the at least one cruise speed route segment may be further based on the weather data. In some embodiments, the route characteristic data may further include speed limit data, and determining the corresponding cruising speed for the at least one cruise speed route segment may be further based on the speed limit data. In some embodiments, the route characteristic data may further traffic data, and determining the corresponding cruising speed for the at least one cruise speed route segment may be further based on the traffic data. In some embodiments, an apparatus may include a processor and a memory including instructions that, when executed by the processor, cause the processor to perform the steps of the method. In some embodiments, a non-transitory computer-readable storage medium may include executable instructions that, when executed by a processor, facilitate performance of the steps of the method.

In some embodiments, a method for providing a visual driving speed recommendation to an operator of a vehicle is disclosed. The method may include determining a current speed. The method may further include determining a corresponding energy efficient speed. The method may further include determining a higher corresponding less energy efficient speed. The method may further include determining a first transition range between the corresponding energy efficient speed and the higher corresponding less energy efficient speed. The method may further include displaying, on a display, a display zone. The display zone may include a first indicator corresponding to the current speed. The display zone may further include a first pattern corresponding to the corresponding energy efficient speed. The display zone may further include a second pattern different from the first pattern and corresponding to the higher corresponding less energy efficient speed. The display zone may further include a first pattern range therebetween corresponding to the first transition range.

In some embodiments, the first indicator may be a vertical line. In some embodiments, the first pattern may be green. In some embodiments, the second pattern may be yellow. In some embodiments, patterns of the first pattern range may be in a range between the first pattern and the second pattern and the first pattern range provides no substantial discontinuities between the first pattern and the second pattern. In some embodiments, the method may further include determining an impractically low speed range. In some embodiments, the method may further include determining a second transition range between the impractically low speed and the corresponding energy efficient speed. In some embodiments, the method may further include presenting, in the display zone: a third pattern different from the first pattern and corresponding to the impractically low speed; and a second pattern range disposed between the third pattern and the first pattern and corresponding to the second transition range. In some embodiments, the third pattern may be black. In some embodiments, the patterns of the second pattern range may be in a range between the first pattern and the third pattern and the first pattern range provides no substantial discontinuities between the first pattern and the third pattern. In some embodiments, the method may further include determining an upper speed limit. In some embodiments, the method may include presenting, in the display zone, a second indicator corresponding to the upper speed limit. In some embodiments, the second indicator may be a vertical line. In some embodiments, the method may further include determining a lower speed limit. In some embodiments, the method may further include presenting, in the display zone, a third indicator corresponding to the lower speed limit. In some embodiments, the third indicator may be a vertical line. In some embodiments, the method may further include determining an overspeed tolerance speed. In some embodiments, the method may further include determining a third transition range between the overspeed tolerance speed and the higher corresponding less energy efficient speed. In some embodiments, the method may further include presenting, in the display zone: a fourth pattern different from the second pattern and corresponding to the overspeed tolerance speed; and a third pattern range disposed between the second pattern and the fourth pattern and corresponding to the third transition range. In some embodiments, the fourth pattern may be red. In some embodiments, the patterns of the third pattern range may be in a range between the second pattern and the fourth pattern and the third pattern range provides no substantial discontinuities between the second pattern and the fourth pattern. In some embodiments, the first indicator may be at a fixed position within the display zone. In some embodiments, an apparatus may include a processor and a memory including instructions that, when executed by the processor, cause the processor to perform the steps of the method. In some embodiments, a non-transitory computer-readable storage medium may include executable instructions that, when executed by a processor, facilitate performance of the steps of the method.

Figure 19:
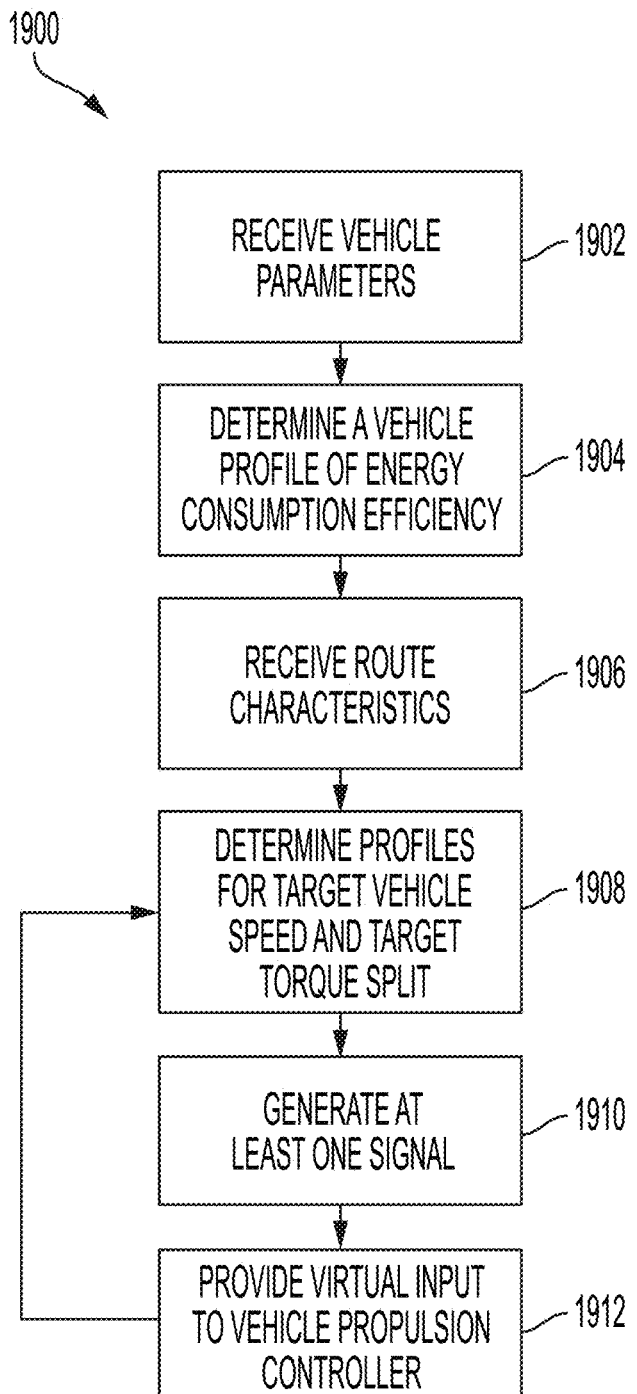
FIG. 19 is a flow diagram generally illustrating an energy consumption estimation method according to the principles of the present disclosure.

FIG. 19 is a flow diagram generally illustrating an energy consumption estimation method 1900 according to the principles of the present disclosure. At 1902, the method 1900 receives vehicle parameters. As described, the PAC 124 may receive various vehicle parameters of the vehicle 10 from any of the components described herein. At 1904, the method 1900 determines a vehicle profile of the energy consumption efficiency. As described, the PAC 124 determines the profile of the energy consumption efficiency for the vehicle 10 using the vehicle parameters and/or other route characteristics, such as historical route characteristics associated with routes previously traversed by the vehicle, route characteristics associated with routes previously traversed by similar vehicles (e.g., from the remote computing device 132 and/or the V2X communication module 130, other suitable route characteristics, or a combination thereof. In some embodiments, the V2X communication module 130 may receive standardized energy consumption data of at least one other vehicle, homologation data, a plurality of standardized energy consumption data reference points, a parabolic approximation of energy consumption, a saturation point of energy conservation corresponding to a speed above threshold wherein the energy efficiency diverges from the parabolic approximation, and a coefficient corresponding to modified energy consumption based on at least one characteristic of a gradient on a segment of the route, or combinations thereof, to generate the profile of the energy consumption efficiency. At 1906, the method 1900 receives route characteristics. As described, the PAC 124 receives various route characteristics (e.g., route characteristics for a route the vehicle 10 is either currently traversing or will traverse) and other information from any other components described herein. For example, the PAC 124 may receive information about varying gradients along segments of the route. In some embodiments, the method continues at 1908. In some embodiments, the method continues at 310. At 1908, the method 1900 determines profiles for the target vehicle speed, the target torque split, and the route characteristics as a function of energy consumption efficiency. As described, the PAC 124 determines profiles for a target vehicle speed and/or a target torque split based on the vehicle parameters, the route characteristics, the profile of the energy consumption efficiency of the vehicle 10, other information received, as described, from the various components described herein. The profiles of the target vehicle speed and/or target vehicle torque split correspond to a vehicle speed and/or a torque split that, when achieved by the vehicle 10, provide an optimum, or improved energy consumption efficiency of the vehicle 10.

At 1910, the method 1900 generates at least one signal. As described, the PAC 124 generates the at least one signal. The signal may include a HMI signal and/or a recommendation for improved energy consumption efficiency of the vehicle 10. The signal, when applied by the VPC 102, achieves the target vehicle speed, the target torque split, and route characteristics. For example, the PAC 124 may generate a recommendation to detour certain segments of a route. In some embodiments, the recommendation is provided to the operator. In some embodiments, the recommendation is an instruction received by VPC 102 to perform autonomously. At 1912, the method 1900 provides the signal to the vehicle propulsion controller. As described, the PAC 124 may substitute HMI signals communicated from the HMI controls 104 based on input from the driver of the vehicle 10 with the virtual HMI signals. Additionally, or alternatively, the PAC 124 may substitute vehicle sensor information provided by the vehicle sensors 108 to indicate the virtual lead vehicle to the VPC 102. As described, the VPC 102 may apply the virtual HMI signals and/or may follow the virtual lead vehicle in order to achieve the target vehicle speed and/or torque split. As described, the PAC 124 may continuously update the target vehicle speed and/or target torque split as the vehicle 10 continues to traverse the route and based on updated traffic information, vehicle information, route information, other information, or a combination thereof.

Figure 20:
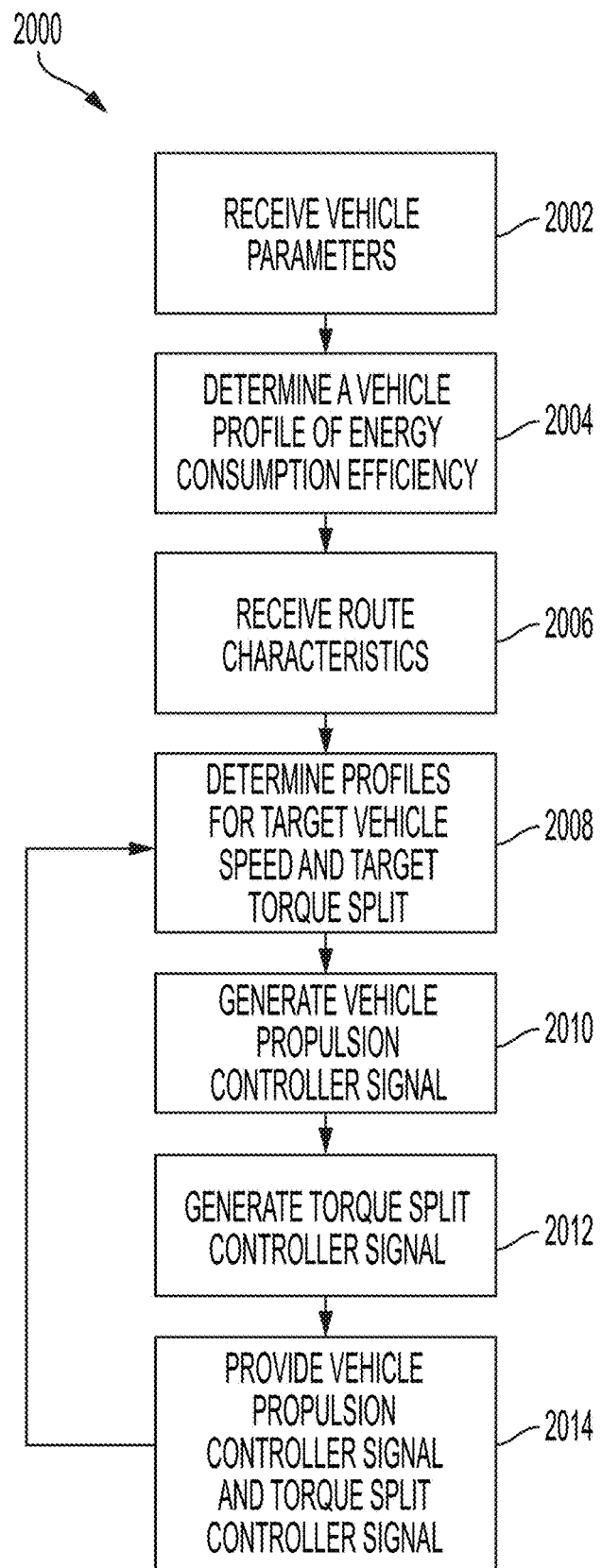
FIG. 20 is a flow diagram generally illustrating an alternative energy consumption estimation method according to the principles of the present disclosure.

FIG. 20 is a flow diagram generally illustrating an alternative energy consumption estimation method 2000 according to the principles of the present disclosure. At 2002, the method 2000 receives vehicle parameters. As described, the PAC 124 may receive various vehicle parameters of the vehicle 10 from any of the components described herein. At 2004, the method 2000 determines a vehicle profile of the energy consumption efficiency. As described, the PAC 124 determines the profile of the energy consumption efficiency for the vehicle 10 using the vehicle parameters and/or other route characteristics, such as historical route characteristics associated with routes previously traversed by the vehicle, route characteristics associated with routes previously traversed by similar vehicles (e.g., from the remote computing device 132 and/or the V2X communication module 130, other suitable route characteristics, or a combination thereof. In some embodiments, the PAC 124 determines the profile of the energy consumption efficiency for the vehicle 10 using the standardized energy consumption data of at least one other vehicle, homologation data, a plurality of standardized energy consumption data reference points, a parabolic approximation of energy consumption, a saturation point of energy conservation corresponding to a speed above threshold wherein the energy efficiency diverges from the parabolic approximation, and a coefficient corresponding to modified energy consumption based on at least one characteristic of a gradient on a segment of the route, or combinations thereof.

At 2006, the method 2000 receives route characteristics. As described, the PAC 124 receives various route characteristics (e.g., route characteristics for a route the vehicle 10 is either currently traversing or will traverse) and other information from any other components described herein. For example, the PAC 124 may receive information about segments of the route with varying gradients. In some embodiments, the method continues at 2008. In some embodiments, the method continues at 2010. At 2008, the method 2000 determines profiles for the target vehicle speed, the target torque split, and the route characteristics as a function of energy consumption efficiency. As described, the PAC 124 determines profiles for the target vehicle speed, the target torque split, and the route characteristics based on the vehicle parameters, the route characteristics, the profile of the energy consumption efficiency of the vehicle 10, other information received, as described, from the various components described herein. The profiles for the target vehicle speed and/or target vehicle torque split correspond to a vehicle speed and/or a torque split that, when achieved by the vehicle 10, provide an optimum, or improved energy consumption efficiency of the vehicle 10.

At 2010, the method 2000 generates a vehicle propulsion controller signal. As described, the PAC 124 is in direct communication with the VPC 102 and may provide signals as an input to the VPC 102. The PAC 124 generates the vehicle propulsion controller signal based on the target vehicle speed. The vehicle propulsion controller signal may be referred to as a recommended target vehicle speed. At 2012, the method 2000 generates a torque split controller signal. As described, the PAC 124 may be in direct communication with the torque split controller 116 and may provide signals as inputs to the torque split controller 116. The PAC 124 generates the torque split controller signal based on the target torque split. The torque split controller signal may be referred to as a recommended target torque split. At 2014, the method 2000 provides the vehicle propulsion controller signal and the torque split controller signal. As described, the PAC 124 may provide the vehicle propulsion controller signal to the VPC 102. The VPC 102 may determine whether to apply the target vehicle speed indicated by the vehicle propulsion controller signal, as described. The PAC 124 may provide the torque split controller signal to the torque split controller 116 or may provide the torque split controller signal to the VPC 102, which then may provide the torque split signal to the torque split controller 116. The torque split controller 116 may then determine whether to apply the torque split indicated by the torque split controller signal, as described. The vehicle propulsion controller signal and torque split controller signal correspond to a vehicle speed and/or a torque split that, when achieved by the vehicle 10, provide an optimum, or improved energy consumption efficiency of the vehicle 10. As described, the PAC 124 may continuously update the target vehicle speed, the target torque split, and the route characteristics as the vehicle 10 continues to traverse the route and based on updated traffic information, vehicle information, route information, other information, or a combination thereof.

Figure 21:
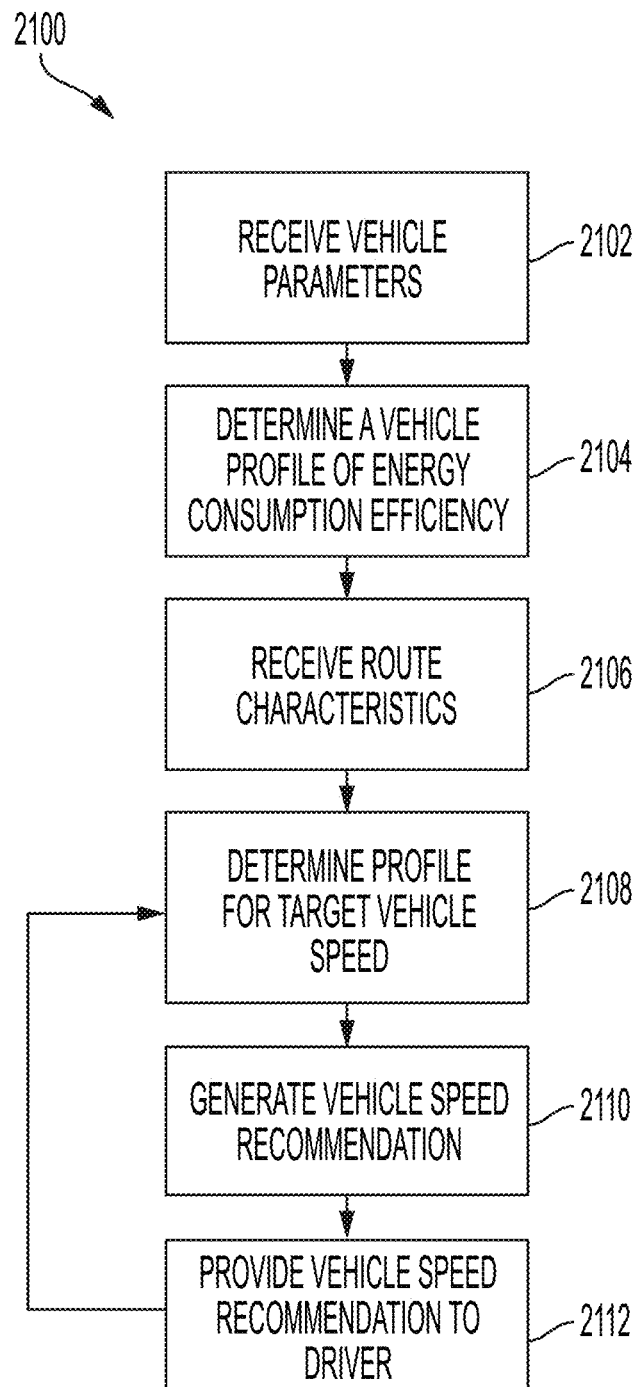
FIG. 21 is a flow diagram generally illustrating an alternative energy consumption estimation method according to the principles of the present disclosure.

FIG. 21 is a flow diagram generally illustrating an alternative energy consumption estimation method 2100 according to the principles of the present disclosure. At 2102, the method 2100 receives vehicle parameters. As described, the PAC 124 may receive various vehicle parameters of the vehicle 10 from any of the components described herein. At 2104, the method 2100 determines a vehicle profile of the energy consumption efficiency. As described, the PAC 124 determines the profile of the energy consumption efficiency for the vehicle 10 using the vehicle parameters and/or other route characteristics, such as historical route characteristics associated with routes previously traversed by the vehicle, route characteristics associated with routes previously traversed by similar vehicles (e.g., from the remote computing device 132 and/or the V2X communication module 130, other suitable route characteristics, or a combination thereof. In some embodiments, the PAC 124 determines the profile of the energy consumption efficiency for the vehicle 10 using standardized energy consumption data of at least one other vehicle, homologation data, a plurality of standardized energy consumption data reference points, a parabolic approximation of energy consumption, a saturation point of energy conservation corresponding to a speed above threshold wherein the energy efficiency diverges from the parabolic approximation, and a coefficient corresponding to modified energy consumption based on at least one characteristic of a gradient on a segment of the route, or combinations thereof.

At 2106, the method 2100 receives route characteristics. As described, the PAC 124 receives various route characteristics (e.g., route characteristics for a route the vehicle 10 is either currently traversing or will traverse) and other information from any other components described herein. In some embodiments, the route characteristics include segments having varying gradients. In some embodiments, the method continues at 2108. In some embodiments, the method continues at 2110. At 2108, the method 2100 determines profiles for a target vehicle speed. As described, the PAC 124 determines a profile for a target vehicle speed based on the vehicle parameters, the route characteristics, the profile of the energy consumption efficiency of the vehicle 10, other information received, as described, from the various components described herein. The profile for the target vehicle speed corresponds to a vehicle speed that, when achieved by the vehicle 10, provide an optimum or improved energy consumption efficiency of the vehicle 10.

At 2110, the method 2100 generates a vehicle speed recommendation. For example, the PAC 124 generates a vehicle speed recommendation based on the profile of the target vehicle speed. At 2112, the method 2100 provides the vehicle speed recommendation to the driver. As described, the PAC 124 may provide the vehicle speed recommendation to the driver of the vehicle 10 using the display 122, a mobile computing device, or other suitable devices or displays capable of providing the vehicle speed recommendation to the driver of the vehicle 10. As described, the driver of the vehicle 10 may honor the vehicle speed recommendation or ignore the vehicle speed recommendation. The vehicle speed recommendation corresponds to a vehicle speed, when achieved by the vehicle 10, provide an optimum, or improved energy consumption efficiency of the vehicle 10. As described, the PAC 124 may continuously update the profile of the target vehicle speed split as the vehicle 10 continues to traverse the route and based on updated traffic information, vehicle information, route information, other information, or a combination thereof.

Figure 22:
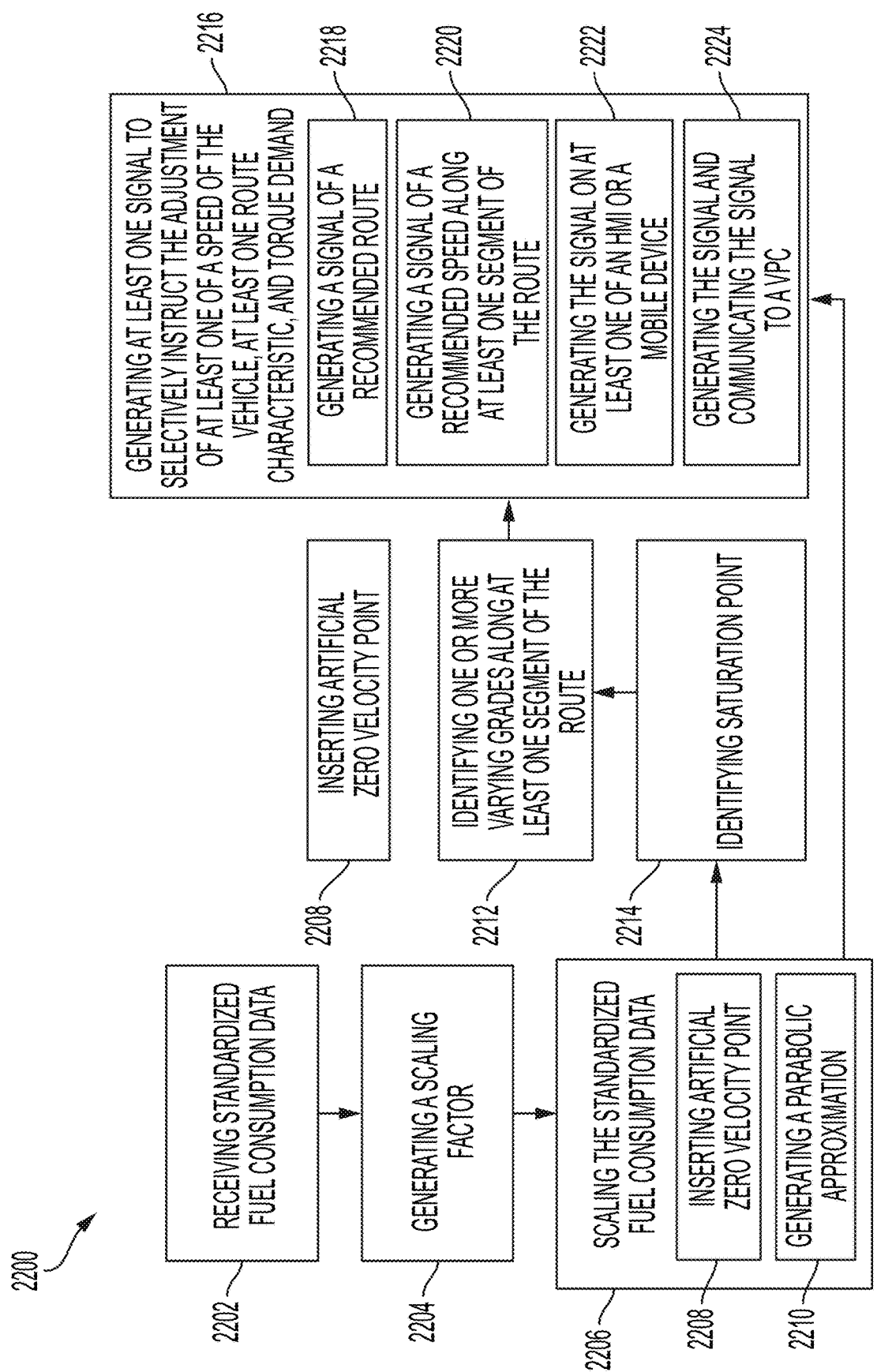
FIG. 22 is a flow diagram generally illustrating an alternative energy consumption estimation method according to the principles of the present disclosure.

FIG. 22 is a flow diagram generally illustrating an alternative energy consumption estimation method 2200 according to the principles of the present disclosure. At 2202, the method 2200 receives standardized energy consumption data. For example, the PAC 124 may receive, from a remotely located computing device, standardized energy consumption data corresponding to at least one other vehicle, the standardized energy consumption data corresponding to energy consumption of the at least one other vehicle as a function of speed. The data may be configured as homologated data. At 2204, the method 2200 generates a scaling factor of the standardized energy consumption data. For example, the PAC 124 may generate a scaling factor by comparing the energy consumption data corresponding to the energy consumption of the vehicle as a function of speed with the standardized energy consumption data. At 2206, the method 2200 includes scaling the standardized energy consumption data. For example, at 2207, the method 2200 may generate a profile of the energy consumption efficiency of the vehicle. At 2208, the method 2200 may include inserting an artificial zero velocity point to have three distinct standardized energy consumption data reference points. At 2210, the method 2200 may include generating a parabolic approximation of energy consumption using the three distinct standardized energy consumption data reference points. After step 2206, the method 2200 may continue at either step 2212 or 2216.

At 2212, the method 2200 may include identifying, with the energy consumption of the vehicle, a saturation point of energy conservation, the saturation point corresponding to a speed above threshold wherein the energy efficiency diverges from the parabolic approximation. At 2214, the method 2200 may include identifying at least one or more varying grades along at least one segment of a route and modifying the profile of the energy consumption efficiency by a coefficient of the at least one other vehicle. At 2216, the method 2200 may include generating a signal to selectively instruct the adjustment of at least one of a speed of the vehicle, at least one route characteristic of a portion of a route being traversed by the vehicle, and a torque demand of the vehicle. The signal may be generated in the form of a recommendation to an operator and/or instructions to the VPC 102. At 2218, the method 2200 may include generating signal corresponding to a recommended route on a mobile computing device. At 2220, the method 2200 may include generating a signal corresponding to a recommended speed along the at least one segment of a route. For example, at 2220, the recommended speed may be achieved a signal for a torque split controller signal and/or a target speed profile. In some embodiments, at 2220, the method includes adjusting a vehicle speed control input based on the at least one segment of a route with a varying grade and communicating the vehicle speed control input to a vehicle propulsion controller. At 2222, the method 2200 may include generating the signal on at least one of an HMI 104 or mobile device. At 2224 the method 2200 may include generating the signal and communicating the signal directly to the VPC 102.

In some embodiments, a method for estimating energy consumption of a vehicle includes receiving from a remotely located computing device standardized energy consumption data corresponding to at least one other vehicle, the standardized energy consumption data corresponding to energy consumption of the at least one other vehicle as a function of speed. The method further includes generating a scaling factor by comparing the energy consumption data corresponding to the energy consumption of the vehicle as a function of speed with the standardized energy consumption data. The method further includes scaling the standardized energy consumption data to generate a profile of the energy consumption efficiency of the vehicle. The method further includes generating a signal to selectively instruct the adjustment of at least one of a speed of the vehicle, at least one route characteristic of a portion of a route being traversed by the vehicle, and a torque demand of the vehicle.

In some embodiments, scaling the standardized energy consumption data includes inserting an artificial zero velocity point to have three distinct standardized energy consumption data reference points. In some embodiments, generating the profile of the energy consumption efficiency of the vehicle includes generating a parabolic approximation of energy consumption using the three distinct standardized energy consumption data reference points. In some embodiments, generating the profile of the energy consumption efficiency of the vehicle includes identifying, with the energy consumption of the vehicle, a saturation point of energy conservation, the saturation point corresponding to a speed above threshold wherein the energy efficiency diverges from the parabolic approximation.

In some embodiments, generating the profile of the energy consumption efficiency of the vehicle includes identifying at least one or more varying grades along at least one segment of a route and modifying the profile of the energy consumption efficiency by a coefficient of the at least one other vehicle. In some embodiments, generating a signal to selectively instruct the adjustment of the at least one route characteristic of a portion of a route being traversed by the vehicle includes generating signal corresponding to a recommended route on a mobile computing device. In some embodiments, generating a signal to selectively instruct the adjustment of the at least one route characteristic of a portion of a route being traversed by the vehicle includes generating a signal corresponding to a recommended speed along the at least one segment of a route. In some embodiments, generating a signal corresponding to a recommended speed along the at least one segment of a route includes adjusting a vehicle speed control input based on the at least one segment of a route with a varying grade and communicating the vehicle speed control input to a vehicle propulsion controller. In some embodiments, generating a signal to selectively instruct the adjustment of the speed of the vehicle includes generating a signal corresponding the speed of the vehicle to at least one segment of the route being traversed by the vehicle on a mobile computing device.

In some embodiments, an apparatus for estimating energy consumption of a vehicle includes a memory and a processor. The memory includes instructions executable by the processor to: receive from a remotely located computing device standardized energy consumption data corresponding to at least one other vehicle, the standardized energy consumption data corresponding to energy consumption of the at least one other vehicle as a function of speed; generate a scaling factor by comparing the energy consumption data corresponding to the energy consumption of the vehicle as a function of speed with the standardized energy consumption data; scale the standardized energy consumption data to generate a profile of the energy consumption efficiency of the vehicle; and generate a signal to selectively instruct the adjustment of at least one of a speed of the vehicle, at least one route characteristic of a portion of a route being traversed by the vehicle, and a torque demand of the vehicle.

In some embodiments, generating the profile of the energy consumption efficiency of the vehicle includes identifying at least one or more varying grades along at least one segment of a route and modifying the profile of the energy consumption efficiency by a coefficient of the at least one other vehicle. In some embodiments, generating a signal to selectively instruct the adjustment of the at least one route characteristic of a portion of a route being traversed by the vehicle includes generating signal corresponding to a recommended route on a mobile computing device. In some embodiments, generating a signal to selectively instruct the adjustment of the at least one route characteristic of a portion of a route being traversed by the vehicle includes generating a signal corresponding to a recommended speed along the at least one segment of a route. In some embodiments, generating a signal corresponding to a recommended speed along the at least one segment of a route includes adjusting a vehicle speed control input based on the at least one segment of a route with a varying grade and communicating the vehicle speed control input to a vehicle propulsion controller. In some embodiments, generating a signal to selectively instruct the adjustment of the speed of the vehicle includes generating a signal corresponding the speed of the vehicle to at least one segment of the route being traversed by the vehicle on a mobile computing device.

In some embodiments, a non-transitory computer-readable storage medium includes executable instructions that, when executed by a processor, facilitate performance of operations, comprising: receiving from a remotely located computing device standardized energy consumption data corresponding to at least one other vehicle, the standardized energy consumption data corresponding to energy consumption of the at least one other vehicle as a function of speed; generating a scaling factor by comparing the energy consumption data corresponding to the energy consumption of the vehicle as a function of speed with the standardized energy consumption data; scaling the standardized energy consumption data to generate a profile of the energy consumption efficiency of the vehicle; and generating a signal to selectively instruct the adjustment of at least one of a speed of the vehicle, at least one route characteristic of a portion of a route being traversed by the vehicle, and a torque demand of the vehicle.

In some embodiments, the standardized energy consumption data corresponding to at least one other vehicle includes homologation data corresponding to a plurality of vehicles.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations the systems, algorithms, methods, instructions, etc., described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module can include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module can include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module can include memory that stores instructions executable by a controller to implement a feature of the module.

Further, in one aspect, for example, systems described herein can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations, and aspects have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method for providing a cruising speed recommendation to an operator of a vehicle, the method comprising:
   receiving route characteristic data including route elevation data that includes a plurality of starts of uphill positions and a plurality of starts of downhill positions;
   receiving, from the operator of the vehicle via a human machine interface, a fuel savings target wherein the human machine interface is disposed on one of a portion of the vehicle and a mobile computing device;
   determining at least one start of uphill position and at least one start of downhill position based on (i) the route elevation data, (ii) an elevation differential between the at least one start of uphill position and the at least one start of downhill position, and (iii) a predetermined minimum speed change distance;
   determining at least one cruise speed route segment based on the at least one start of uphill position and the at least one start of downhill position, wherein a length of the at least one cruise speed route segment is at least the predetermined minimum speed change distance;
   determining a corresponding cruising speed for the at least one cruise speed route segment based on the fuel savings target and at least the route elevation data; and
   generating, for the at least one cruise speed route segment, a vehicle propulsion controller signal to control a speed of the vehicle based on the corresponding cruising speed.

2. The method of claim 1, wherein determining the corresponding cruising speed includes removing, from the route elevation data, selected ones of the plurality of starts of uphill positions and the plurality of starts of downhill positions located between the at least one start of uphill position and the at least one start of downhill position.

3. The method of claim 1, further comprising receiving vehicle position data; and
   determining a projected route based on the vehicle position data.

4. The method of claim 3, further comprising determining a start of uphill delay, wherein the at least one start of uphill position is adjusted forward along the projected route by a distance equal to the start of uphill delay.

5. The method of claim 4, further comprising receiving vehicle characteristic data, wherein determining the start of uphill delay is based on the vehicle characteristic data.

6. The method of claim 3, further comprising determining a start of downhill delay, wherein the at least one start of downhill position is adjusted forward along the projected route by a distance equal to the start of downhill delay.

7. The method of claim 6, further comprising receiving vehicle characteristic data, wherein determining the start of downhill delay is based on the vehicle characteristic data.

8. The method of claim 3, further comprising receiving planned route data, wherein determining the projected route is based on the planned route data.

9. The method of claim 3, further comprising receiving signage data, wherein determining the projected route is based on the signage data.

10. The method of claim 1, further comprising receiving vehicle characteristic data, wherein determining the corresponding cruising speed for the at least one cruise speed route segment is further based on the vehicle characteristic data.

11. The method of claim 1, wherein the route characteristic data further includes road curvature data, and wherein determining the corresponding cruising speed for the at least one cruise speed route segment is further based on the road curvature data.

12. The method of claim 1, wherein the route characteristic data further includes road surface condition data, and wherein determining the corresponding cruising speed for the at least one cruise speed route segment is further based on the road surface condition data.

13. The method of claim 1, wherein the route characteristic data further includes weather data, wherein determining the corresponding cruising speed for the at least one cruise speed route segment is further based on the weather data.

14. The method of claim 1, wherein the route characteristic data further includes speed limit data, and wherein determining the corresponding cruising speed for the at least one cruise speed route segment is further based on the speed limit data.

15. The method of claim 1, wherein the route characteristic data further includes traffic data, and wherein determining the corresponding cruising speed for the at least one cruise speed route segment is further based on the traffic data.

16. An apparatus for providing a cruising speed recommendation to an operator of a vehicle, the apparatus comprising:
a processor; and
a memory including instructions that, when executed by the processor, cause the processor to:
receive route characteristic data including route elevation data that includes a plurality of starts of uphill positions and a plurality of starts of downhill positions;
receive, from the operator of the vehicle via a human machine interface, a fuel savings target, wherein the human machine interface is disposed on one of a portion of the vehicle and a mobile computing device;
determine at least one start of uphill position and at least one start of downhill position based on (i) the route elevation data, (ii) an elevation differential between the at least one start of uphill position and the at least one start of downhill position, and (iii) a predetermined minimum speed change distance;
determine at least one cruise speed route segment based on the at least one start of uphill position and the at least one start of downhill position, wherein a length of the at least one cruise speed route segment is at least the predetermined minimum speed change distance;
determine a corresponding cruising speed for the at least one cruise speed route segment based on the fuel savings target and at least one the route elevation data; and
generate, for the at least one cruise speed route segment, a vehicle propulsion controller signal to control a speed of the vehicle based on the corresponding cruising speed.

17. The apparatus of claim 16, wherein the instructions further cause the processor to determine the corresponding cruising speed by removing, from the route elevation data, selected ones of the plurality of starts of uphill positions and the plurality of starts of downhill positions located between the at least one start of uphill position and the at least one start of downhill position.

18. A non-transitory computer-readable storage medium comprising executable instructions that, when executed by a processor, facilitate performance of operations, comprising:
receiving route characteristic data including route elevation data that includes a plurality of starts of uphill positions and a plurality of starts of downhill positions;
receiving, from an operator of a vehicle via a human machine interface, a fuel savings target, wherein the human machine interface is disposed on one of a portion of the vehicle and a mobile computing device;
determining at least one start of uphill position and at least one start of downhill position based on (i) the route elevation data, (ii) an elevation differential between the at least one start of uphill position and the at least one start of downhill position, and (iii) a predetermined minimum speed change distance;
determining at least one cruise speed route segment based on the at least one start of uphill position and the at least one start of downhill position, wherein a length of the at least one cruise speed route segment is at least the predetermined minimum speed change distance;
determining a corresponding cruising speed for the at least one cruise speed route segment based on the fuel savings target and at least one the route elevation data; and
generating, for the at least one cruise speed route segment, a vehicle propulsion controller signal to control a speed of the vehicle based on the corresponding cruising speed.

* * * * *